(12) United States Patent
Kasahara et al.

(10) Patent No.: US 9,823,739 B2
(45) Date of Patent: Nov. 21, 2017

(54) IMAGE PROCESSING DEVICE, IMAGE PROCESSING METHOD, AND PROGRAM

(71) Applicant: SONY CORPORATION, Tokyo (JP)

(72) Inventors: Shunichi Kasahara, Kanagawa (JP); Junichi Rekimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 77 days.

(21) Appl. No.: 14/779,452

(22) PCT Filed: Mar. 14, 2014

(86) PCT No.: PCT/JP2014/056984
§ 371 (c)(1),
(2) Date: Sep. 23, 2015

(87) PCT Pub. No.: WO2014/162852
PCT Pub. Date: Oct. 9, 2014

(65) Prior Publication Data
US 2016/0054793 A1    Feb. 25, 2016

(30) Foreign Application Priority Data

Apr. 4, 2013 (JP) ................. 2013-078894
Jan. 9, 2014 (JP) ................. 2014-002758

(51) Int. Cl.
*G06F 3/01* (2006.01)
*G06F 3/041* (2006.01)
(Continued)

(52) U.S. Cl.
CPC ............ *G06F 3/011* (2013.01); *G06F 3/0412* (2013.01); *G06F 3/0488* (2013.01); *G06F 3/04815* (2013.01); *G06F 3/04845* (2013.01); *G06T 5/50* (2013.01); *G06T 11/60* (2013.01); *G06T 19/006* (2013.01)

(58) Field of Classification Search
None
See application file for complete search history.

(56) References Cited

U.S. PATENT DOCUMENTS 7,161,616 B1 * 1/2007 Okamoto ................. B60R 1/00
348/148
2002/0159637 A1 * 10/2002 Echigo .............. G06F 17/30905
382/190
(Continued)

FOREIGN PATENT DOCUMENTS

JP     05-191902     7/1993
JP     11-122638     4/1999
(Continued)

*Primary Examiner* — Saptarshi Mazumder
(74) *Attorney, Agent, or Firm* — Paratus Law Group, PLLC

(57) ABSTRACT

Provided is an image processing device including: an image processing unit configured to generate an output image using a first image obtained by imaging a real space from a first viewpoint as an input image. Based on a position and a posture of the first viewpoint in the real space, the image processing unit generates, as the output image, a second image obtained by virtually imaging the real space from a second viewpoint having a position and a posture different from the position and the posture of the first viewpoint in the real space.

19 Claims, 51 Drawing Sheets

(51) Int. Cl.
     *G06T 11/60*      (2006.01)
     *G06T 19/00*      (2011.01)
     *G06F 3/0488*     (2013.01)
     *G06F 3/0481*     (2013.01)
     *G06F 3/0484*     (2013.01)
     *G06T 5/50*       (2006.01)

(56) References Cited

U.S. PATENT DOCUMENTS

| | | | |
|---|---|---|---|
| 2004/0051709 A1* | 3/2004 | Ogawa | G06T 15/20 345/418 |
| 2007/0018975 A1* | 1/2007 | Chuanggui | A61B 90/36 345/419 |
| 2010/0245574 A1* | 9/2010 | Imanishi | B60R 1/00 348/148 |
| 2011/0043613 A1* | 2/2011 | Rohaly | G06T 17/00 348/50 |

FOREIGN PATENT DOCUMENTS

| | | |
|---|---|---|
| JP | 2006-053694 | 2/2006 |
| JP | 2009-301350 | 12/2009 |
| JP | 2011-130323 | 6/2011 |
| JP | 2011-227613 | 11/2011 |
| JP | 2012-212345 | 11/2012 |

\* cited by examiner

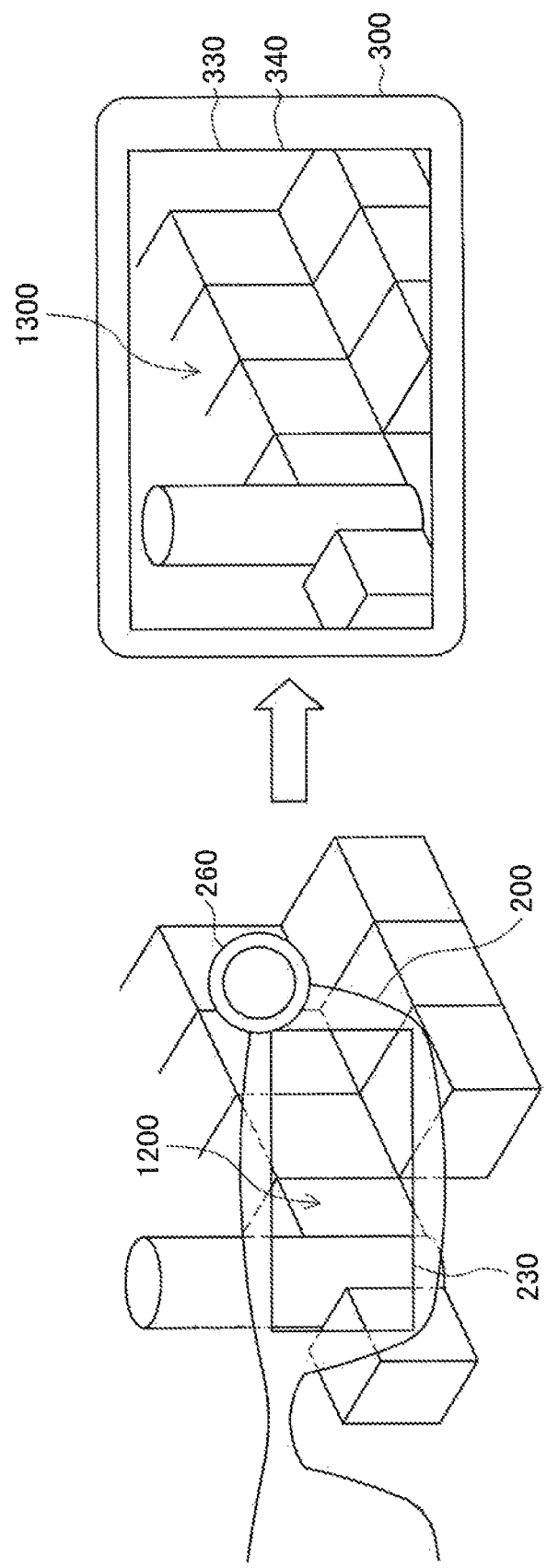

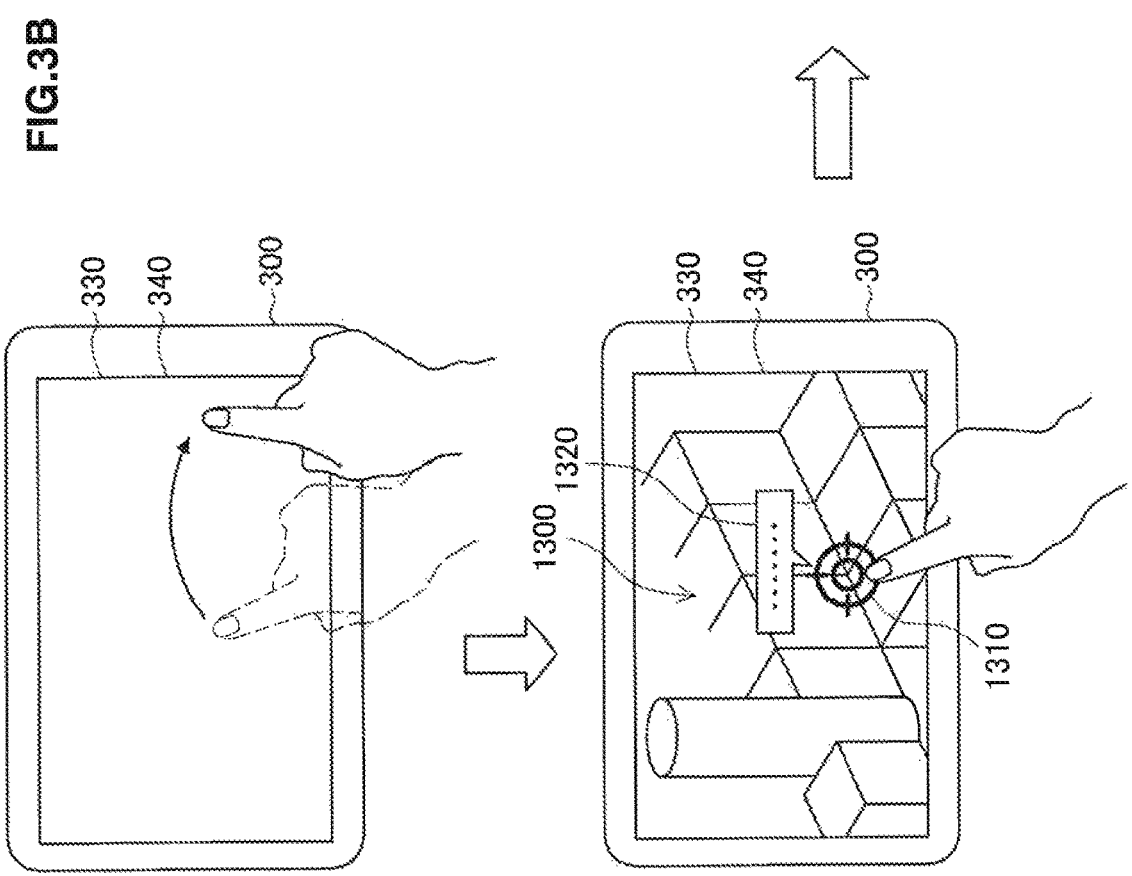

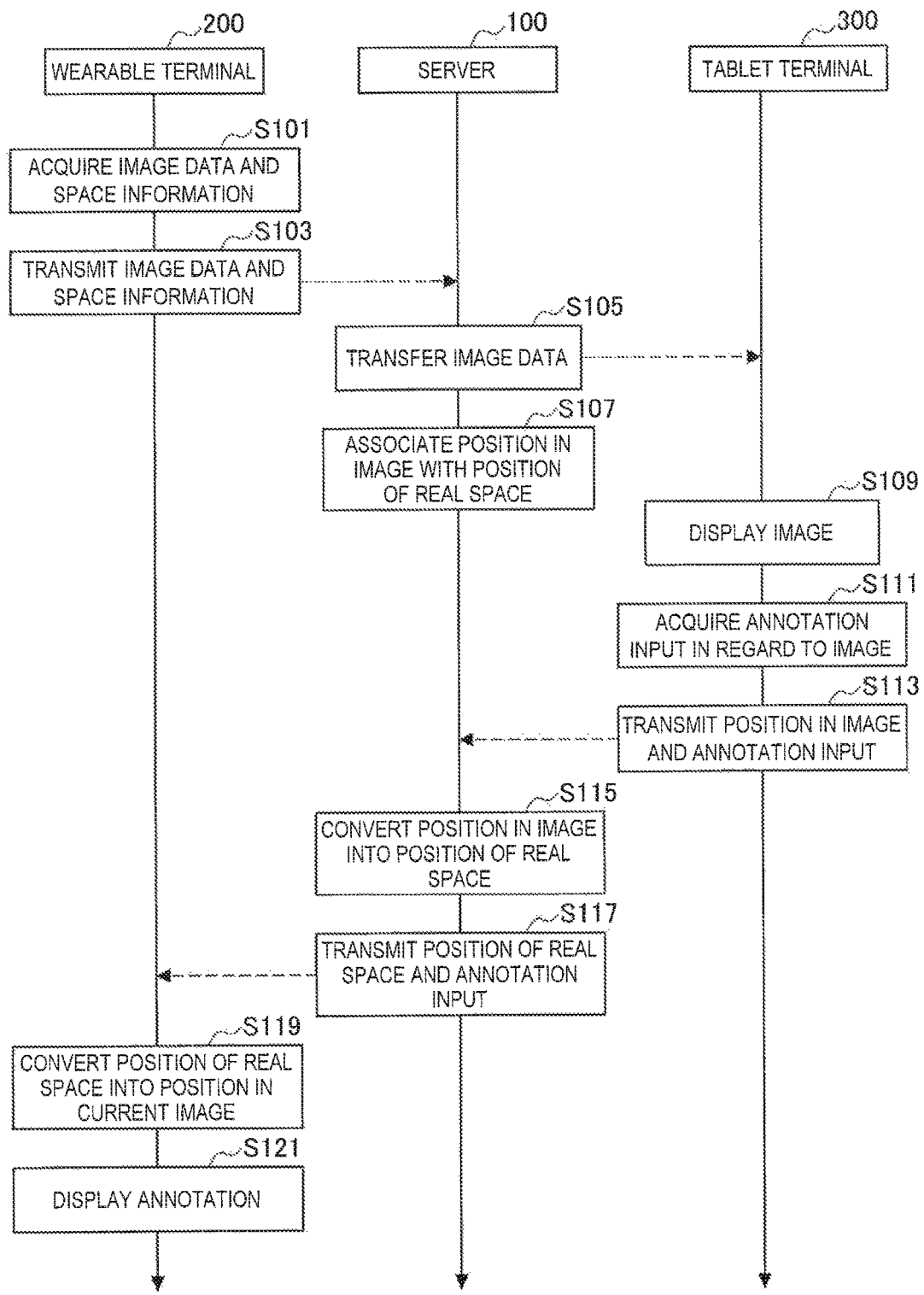

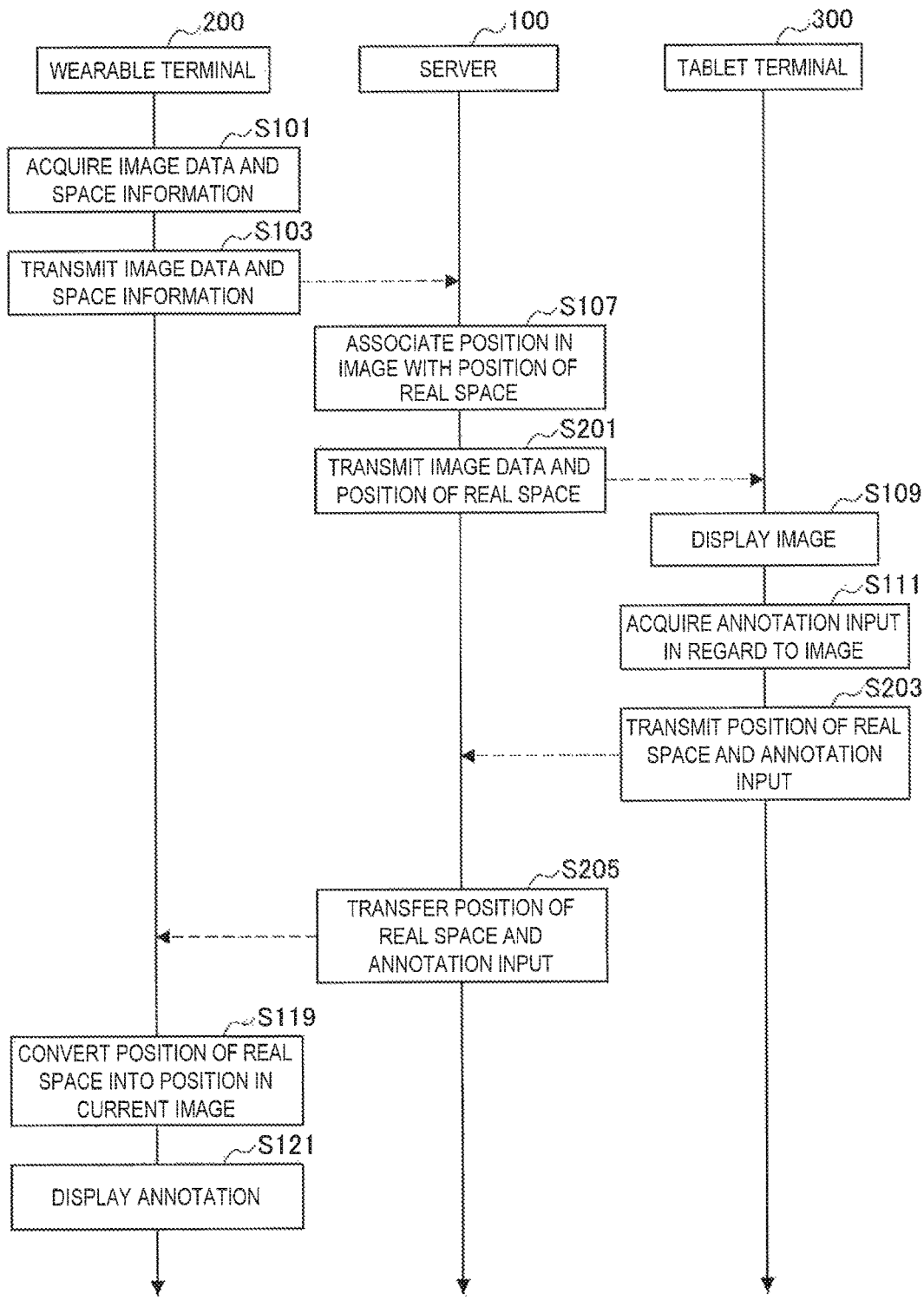

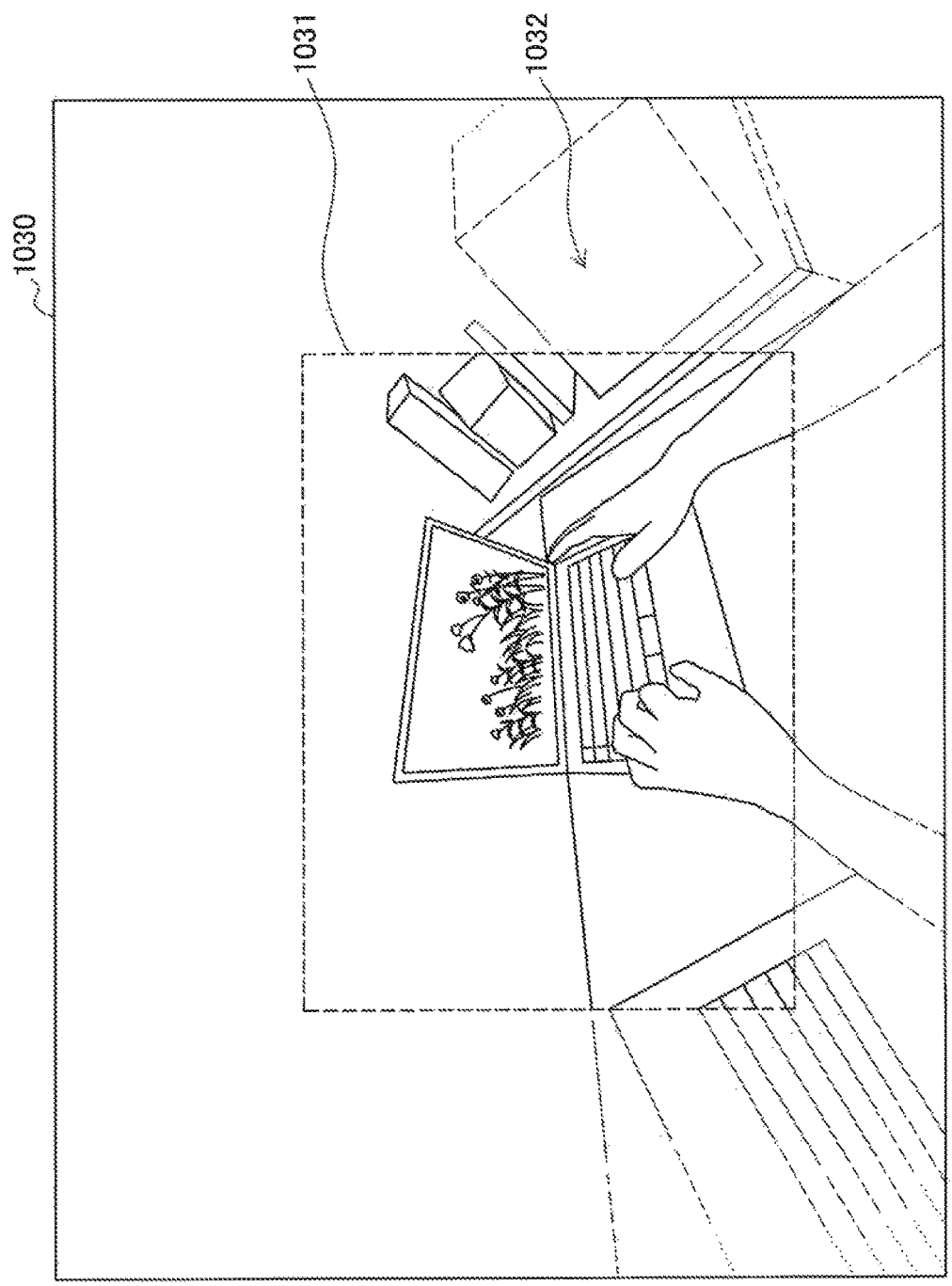

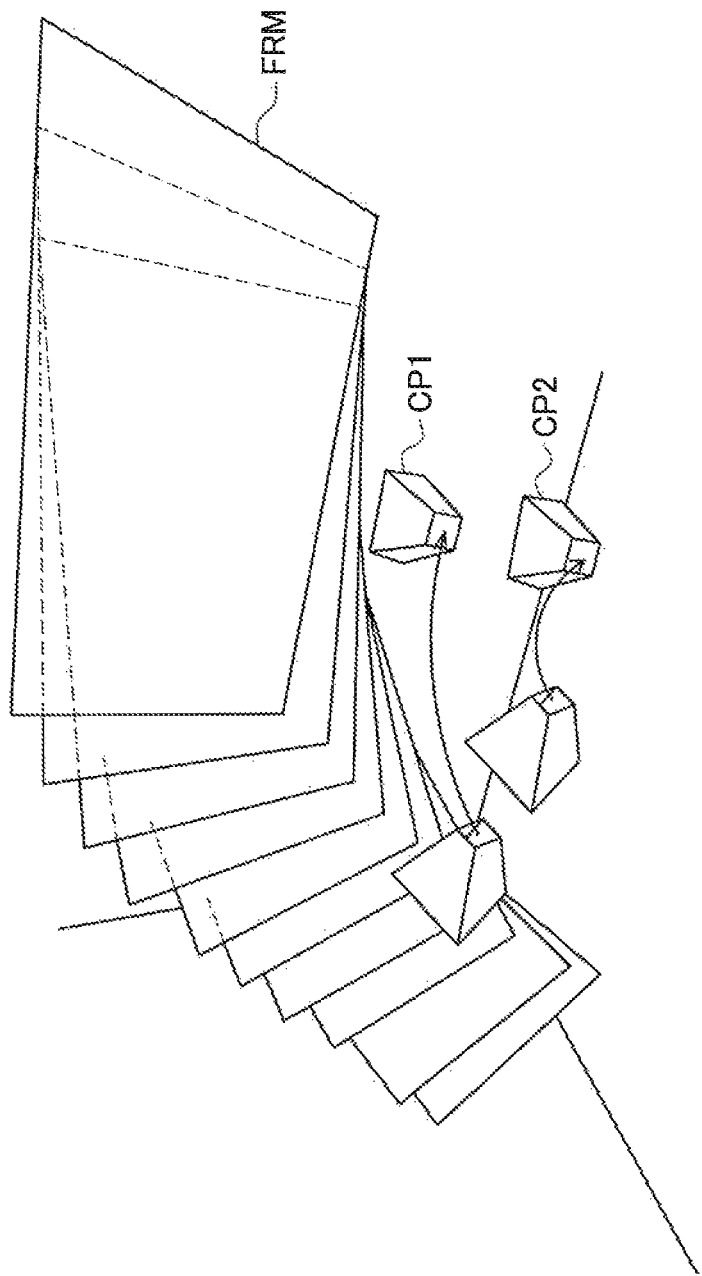

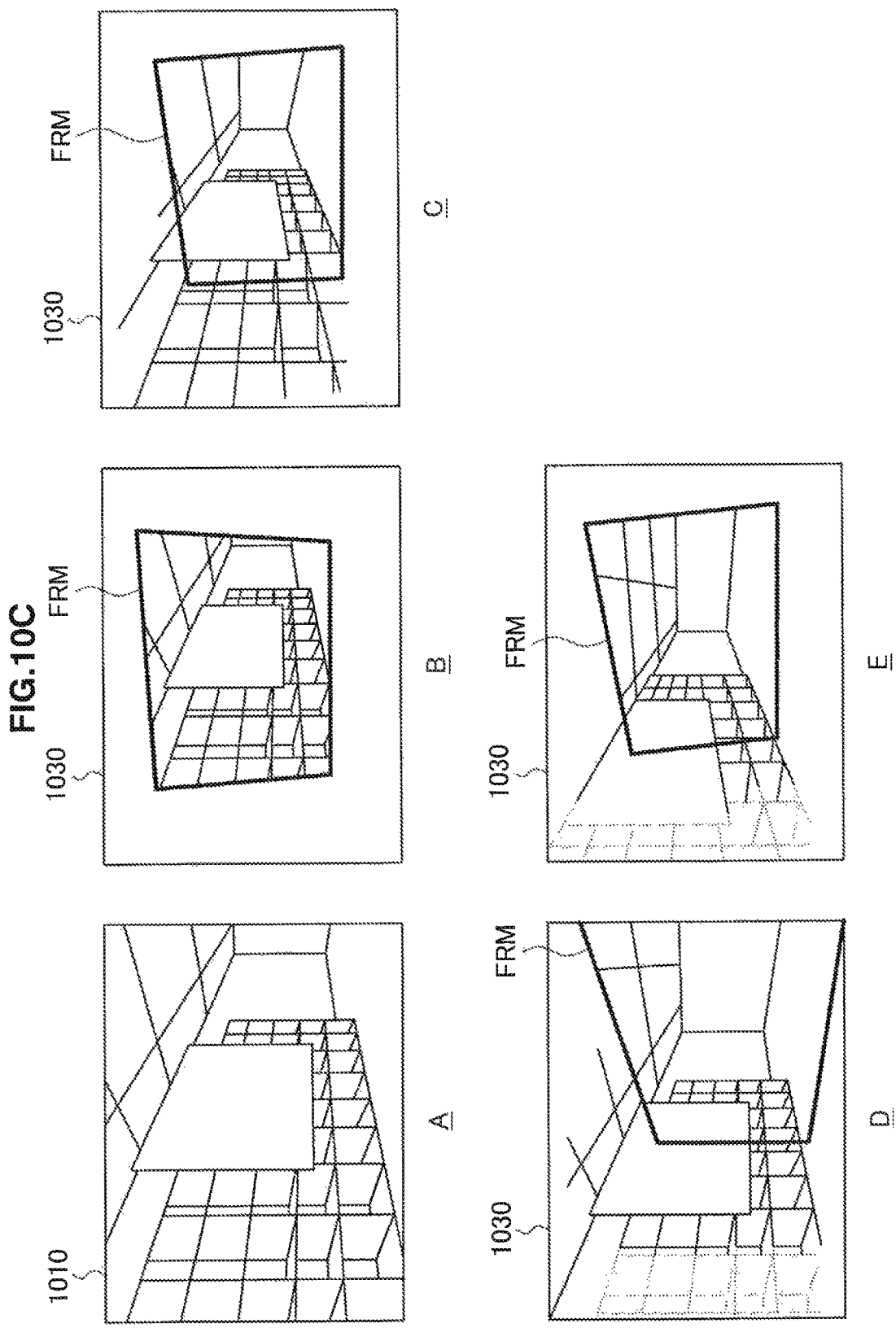

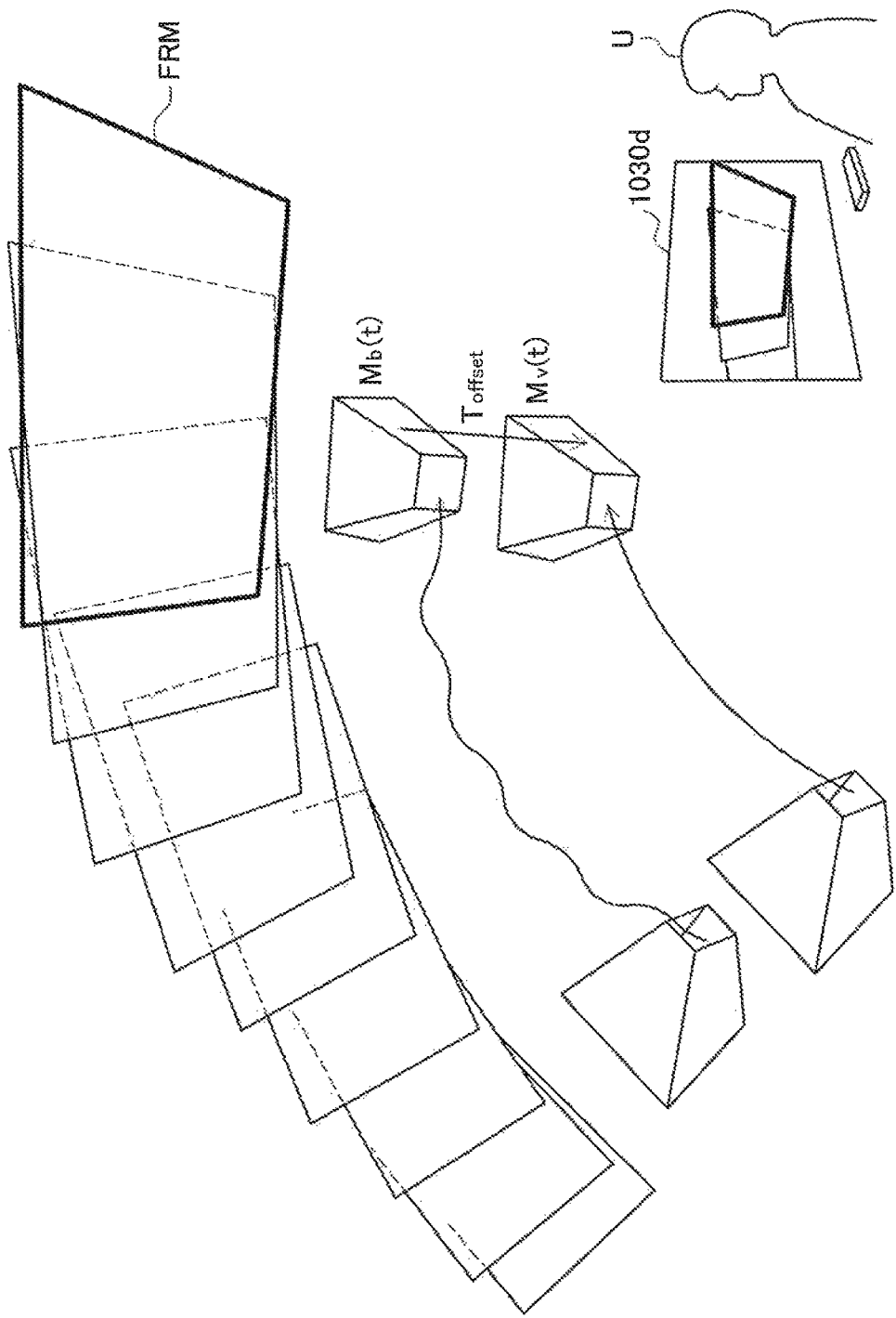

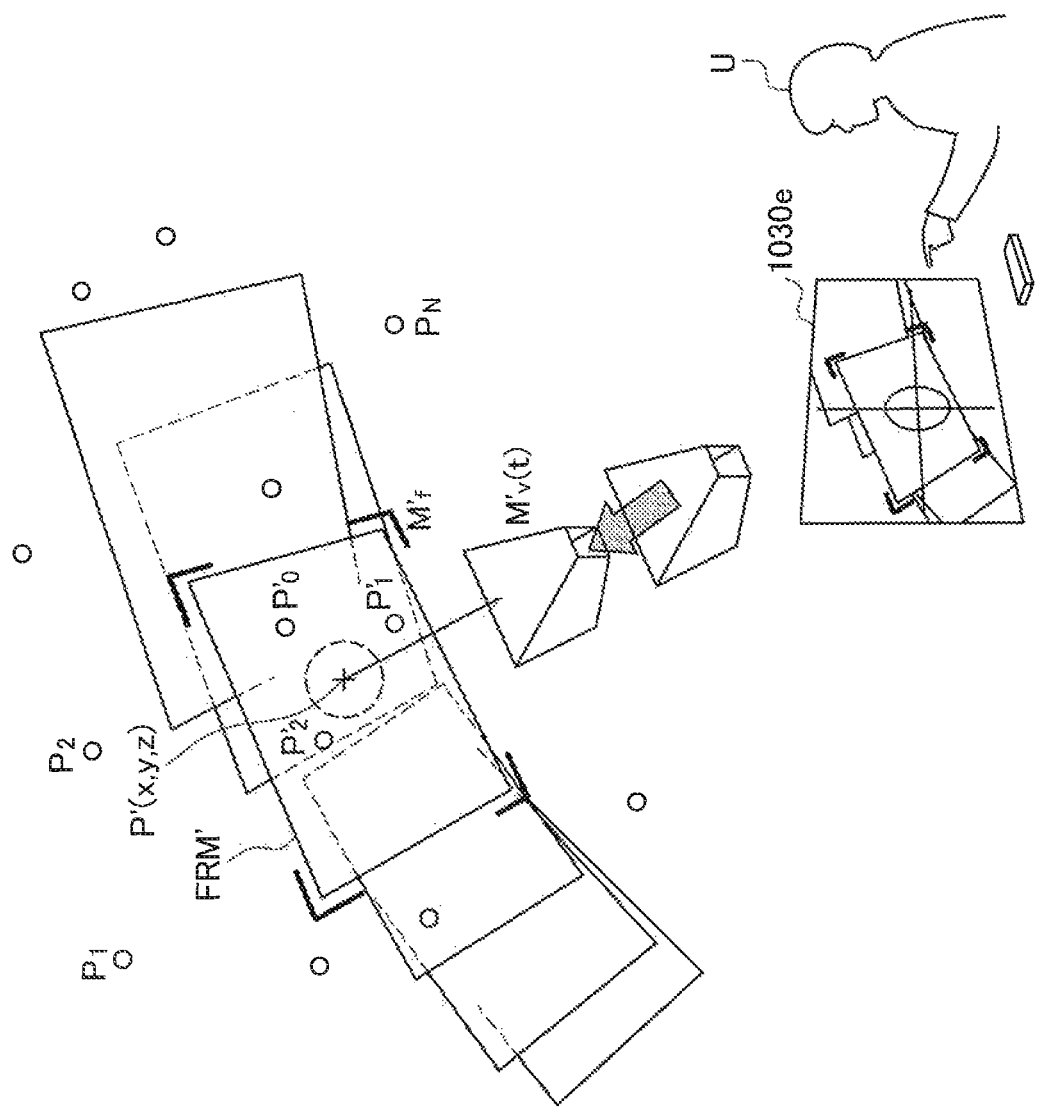

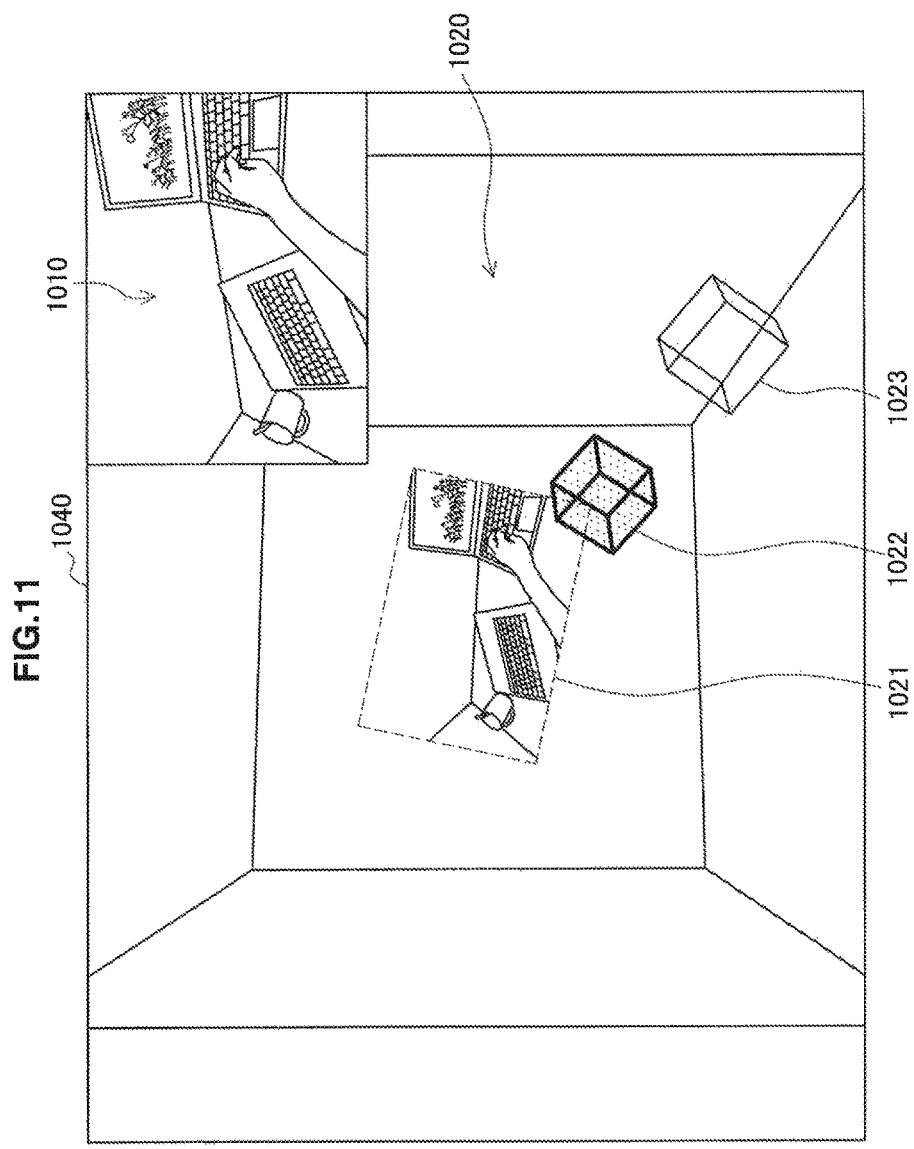

IMAGE PROCESSING DEVICE, IMAGE PROCESSING METHOD, AND PROGRAM

CROSS REFERENCE TO PRIOR APPLICATION

This application is a National Stage Patent Application of PCT International Patent Application No. PCT/JP2014/056984 (filed on Mar. 14, 2014) under 35 U.S.C. §371, which claims priority to Japanese Patent Application Nos. 2014-002758 (filed on Jan. 9, 2014) and 2013-078894 (filed on Apr. 4, 2013), which are all hereby incorporated by reference in their entirety.

TECHNICAL FIELD

The present disclosure relates to an image processing device, an image processing method, and a program.

BACKGROUND ART

In recent years, technology known as augmented reality (AR) through which users are presented with additional information that is superimposed on the real world has been noticed. Information presented to users in AR technology, which is also called annotation, can be visualized using virtual objects of various forms such as text, icons, animation, and the like. For example, Patent Literature 1 discloses a technology for realizing manipulation of virtual objects of such AR without impairing immersion of users in an AR space.

CITATION LIST

Patent Literature

Patent Literature 1: JP 2012-212345A

SUMMARY OF INVENTION

Technical Problem

The AR technology proposed in Patent Literature 1 and the like was developed recently and it is difficult to say that the technologies for utilizing AR in various phases have been proposed sufficiently. For example, the number of technologies for facilitating interaction between users using AR technologies that have been proposed is still only one, and therefore insufficient.

It is desirable to provide a novel and improved image processing device, a novel and improved image processing method, and a novel and improved program capable of further facilitating interaction between users using AR technologies.

Solution to Problem

According to the present disclosure, there is provided an image processing device including: an image processing unit configured to generate an output image using a first image obtained by imaging a real space from a first viewpoint as an input image. Based on a position and a posture of the first viewpoint in the real space, the image processing unit generates, as the output image, a second image obtained by virtually imaging the real space from a second viewpoint having a position and a posture different from the position and the posture of the first viewpoint in the real space.

According to the present disclosure, there is provided an image processing method including: generating, by a processor configured to generate an output image using a first image obtained by imaging a real space from a first viewpoint as an input image, based on a position and a posture of the first viewpoint in the real space, a second image obtained by virtually imaging the real space from a second viewpoint having a position and a posture different from the position and the posture of the first viewpoint in the real space as the output image.

According to the present disclosure, there is provided a program causing a computer configured to generate an output image using a first image obtained by imaging a real space from a first viewpoint as an input image to realize: a function of generating, based on a position and a posture of the first viewpoint in the real space, a second image obtained by virtually imaging the real space from a second viewpoint having a position and a posture different from the position and the posture of the first viewpoint in the real space as the output image.

Advantageous Effects of Invention

According to an embodiment of the present disclosure described above, it is possible to further facilitate interaction between users using AR technologies.

BRIEF DESCRIPTION OF DRAWINGS

FIG. 3A is a diagram illustrating an example in which captured images are shared according to the embodiment of the present disclosure.

FIG. 3B is a diagram illustrating an example of an annotation input according to the embodiment of the present disclosure.

FIG. 5A is a flowchart illustrating an example of a process of a technology usable according to the embodiment of the present disclosure.

FIG. 5B is a flowchart illustrating another example of a process of a technology that can be used according to the embodiment of the present disclosure.

FIG. 10A is a diagram illustrating a display example of a 1.3rd-person image according to the embodiment of the present disclosure.

FIG. 10B is a diagram for describing the 1.3rd-person image according to the embodiment of the present disclosure.

FIG. 10C is a diagram for describing the 1.3rd-person image according to the embodiment of the present disclosure.

FIG. 10D is a diagram for describing examples of the 1.3rd-person image and the 3rd-person image according to the embodiment of the present disclosure.

FIG. 10F is a diagram for describing examples of the 1.3rd-person image and the 3rd-person image according to the embodiment of the present disclosure.

FIG. 11 is a diagram illustrating an example in which images of different viewpoints are simultaneously displayed according to the embodiment of the present disclosure.

DESCRIPTION OF EMBODIMENTS

Figure 1:
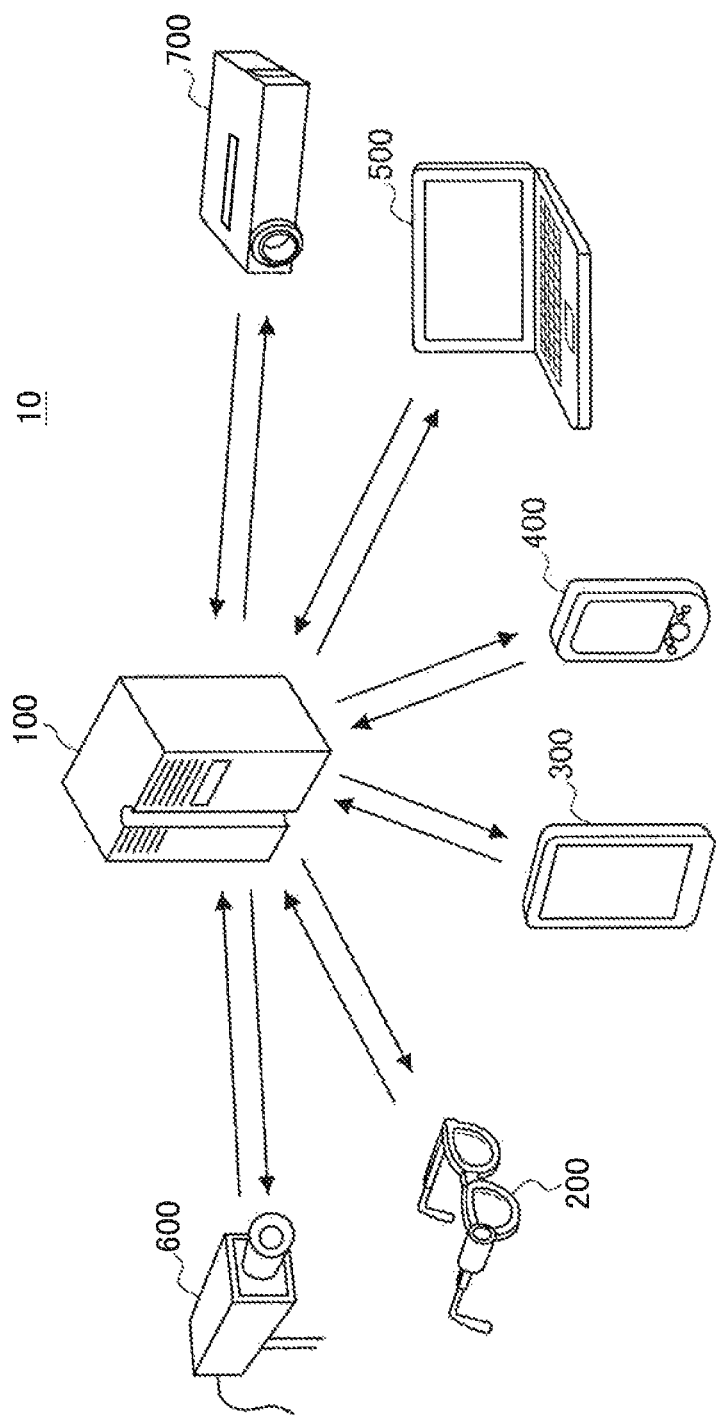
FIG. 1 is a diagram illustrating a schematic configuration of a system according to an embodiment of the present disclosure.

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

The description will be made in the following order.
1. Configurations of system and device
1-1. Configuration of system
1-2. Configuration of device
2. Sharing and interaction of real space images
2-1. Concept of interaction
2-2. Usable technologies 3. Examples of display of variable viewpoint images
4. Display annotation in real space
4-1. Display example
4-2. Annotation arrangement
5. Annotation indication outside of visible range
6. Other display examples
7. Examples of applications
8. Supplement (1. Configurations of System and Device)
(1-1. Configuration of System)

FIG. 1 is a diagram illustrating a schematic configuration of a system according to an embodiment of the present disclosure. Referring to FIG. 1, a system 10 includes a server 100 and clients 200 to 700.

The server 100 is a single server device or an aggregate of functions realized by a plurality of server devices connected by various wired or wireless networks for cooperation. The server 100 supplies services to the clients 200 to 700.

The clients 200 to 700 are terminal devices that are connected to the server 100 by various wired or wireless networks. The clients 200 to 700 realize at least one function of the following (1) to (3) in the system 10.

(1) A device that includes an imaging unit such as a camera and supplies images of a real space to the server 100.

(2) A device that includes a display unit such as a display and a manipulation unit such as a touch panel, and that acquires an image supplied from the device (1) from the server 100, supplies the image to a user for the user to view the image, and receives an annotation input to an image by the user.

(3) A device that includes a display unit such as a display and indirectly or directly displays an annotation of which an input is received by the device (2) in the real space.

The client 200 (hereinafter also simply referred to as a wearable terminal 200) is a wearable terminal. The wearable terminal 200 includes one or both of, for example, an imaging unit and a display unit and functions as one or both of the devices (1) to (3). In the illustrated example, the wearable terminal 200 is of a glasses type, but an embodiment of the present disclosure is not limited to this example as long as the wearable terminal has a form in which it can be worn on the body of a user. When the wearable terminal 200 functions as the device (1), the wearable terminal 200 includes, for example, a camera installed in a frame of glasses as the imaging unit. The wearable terminal 200 can acquire an image of a real space from a position close to the viewpoint of the user by the camera. The acquired image is transmitted to the server 100. When the wearable terminal 200 functions as the device (3), the wearable terminal 200 includes, for example, a display installed in a part or the whole of a lens portion of the glasses as a display unit. The wearable terminal 200 displays an image captured by the camera on the display and displays an annotation input by the device (2) so that the annotation is superimposed on the image. Alternatively, when the display is of a transparent type, the wearable terminal 200 may display the annotation so that the annotation is transparently superimposed on an image of the real world directly viewed by the user.

The client 300 (hereinafter also simply referred to as the tablet terminal 300) is a tablet terminal. The tablet terminal 300 includes at least a display unit and a manipulation unit and can function as, for example, the device (2). The tablet terminal 300 may further include an imaging unit and function as one or both of the devices (1) to (3). That is, the tablet terminal 300 can function as any of the devices (1) to (3). When the tablet terminal 300 functions as the device (2), the tablet terminal 300 includes, for example, a display as the display unit, includes, for example, a touch sensor on the display as the manipulation unit, displays an image supplied from the device (1) via the server 100, and receives an annotation input by the user with respect to the image. The received annotation input is supplied to the device (3) via the server 100. When the tablet terminal 300 functions as the device (1), the tablet terminal 300 includes, for example, a camera as the imaging unit as in the wearable terminal 200 and can acquire an image of a real space along a line extending from the user's line of sight when the user holds the tablet terminal 300 in the real space. The acquired image is transmitted to the server 100. When the tablet terminal 300 functions as the device (3), the tablet terminal 300 displays an image captured by the camera on the display and displays the annotation input by the device (2) (for example, another tablet terminal) so that the annotation is superimposed on the image. Alternatively, when the display is a transparent type, the tablet terminal 300 may display the annotation by transparently superimposing the annotation on an image of the real world directly viewed by the user.

The client 400 (hereinafter also simply referred to as the mobile phone 400) is a mobile phone (smartphone). Since the function of the mobile phone 400 in the system 10 is the same as that of the tablet terminal 300, the detailed description thereof will be omitted. Although not illustrated, for example, when a device such as a portable game device or a digital camera also includes a communication unit, a display unit, and a manipulation unit or an imaging unit, the device can function similarly to the tablet terminal 300 or the mobile phone 400 in the system 10.

The client 500 (hereinafter also simply referred to as the laptop PC 500) is a laptop personal computer (PC). The laptop PC 500 includes a display unit and a manipulation unit and functions as the device (2). In the illustrated example, since the laptop PC 500 is used basically in a fixed manner, the laptop PC 500 is treated as an example of a device that does not function as the device (1). Although not illustrated, for example, a desktop PC or a television can also function as the laptop PC 500. The laptop PC 500 includes a display as the display unit, includes a mouse or a keyboard as the manipulation unit, displays an image supplied from the device (1) via the server 100, and receives an annotation input by the user with respect to the image. The received annotation input is supplied to the device (3) via the server 100. The laptop PC 500 can also function as the device (3). In this case, the laptop PC 500 does not display the annotation by superimposing the annotation on an image of the real space that it has captured itself, but displays an annotation which becomes a part of the real space as in an example to be described below. The annotation can also be displayed by the tablet terminal 300, the mobile phone 400, or the like.

The client 600 (hereinafter also simply referred to as a fixed camera 600) is a fixed camera. The fixed camera 600 includes an imaging unit and functions as the device (1). In the illustrated example, since the fixed camera 600 is used fixed and does not include a display unit, the fixed camera 600 is treated as an example of a device that does not function as the devices (2) and (3). Although not illustrated, for example, when a camera projecting the front of the screen of a desktop PC is installed or a television or a movable device such as a digital camera is temporarily fixed on a tripod or the like, the camera or the movable device can also function as the fixed camera 600. The fixed camera 600 includes a camera as an imaging unit and can acquire an image of a real space from a fixed viewpoint (also including a case in which the camera swings automatically or in response to a manipulation of the user browsing captured images). The acquired image is transmitted to the server 100. Alternatively, the client 600 may be a camera mounted on a moving object. The moving object may be, for example, a vehicle or an animal and may be moved by a passenger or according to the intentions of the passenger. The moving object mounted on the client 600 may be a device (robot camera) that performs imaging while the device flies or runs under the control of the user using wireless communication or the like or the device flies or runs automatically according to a program.

The client 700 (hereinafter also simply referred to as a projector 700) is a projector. The projector 700 includes a projection device as a display unit and functions as the device (3). In the illustrated example, since the projector 700 does not include an imaging unit or a manipulation unit receiving an input with respect to a displayed (projected) image, the projector 700 is treated as an example of a device that does not function as the devices (1) and (2). The projector 700 displays an annotation in the real space by projecting an image on a screen or the surface of an object using a projection device. The projector 700 is illustrated as a fixed type of projector, but may be a handheld projector.

The system according to the embodiment of the present disclosure has been described above. As illustrated in FIG. 1, the system 10 according to the embodiment can include a device (the wearable terminal 200, the tablet terminal 300, the mobile phone 400, or the fixed camera 600) that can acquire an image of a real space, a device (the tablet terminal 300, the mobile phone 400, or the laptop PC 500) that can supply an image of the real space to the user for the user to view the image and receive an annotation input to an image by the user, and a device (the wearable terminal 200, the tablet terminal 300, the mobile phone 400, the laptop PC 500, or the projector 700) that indirectly or directly displays an annotation in the real space.

The server 100 realizes a function of acquiring an image of the real space by cooperating with each of the foregoing devices and supplying the image to the user for the user (for example, a user not located in the real space) to view the image, receiving an annotation input to an image by the user, and directly or indirectly displaying the input annotation in the real space. For example, the function enables interaction between users using an AR technology so that a second user can view an image of the real space in which a first user is located and an annotation in which the second user is added to the image is directly or indirectly displayed in the real space to be viewed by the first user.

A specific example of an AR image (for example, an image in which an annotation is displayed in the real space) displayed in the foregoing system 10 will be described. In the system 10 in the illustrated example, image processing of forming an AR image is performed mainly by the server 100. However, in another example, some or all of the image processing may be performed by, for example, the device (3) displaying an annotation in the real space and the device (2) displaying an image of the real space and receiving an annotation input. In the present specification, the devices performing such image processing are collectively referred to as an "image processing device."

(1-2. Configuration of Device)

Figure 2:
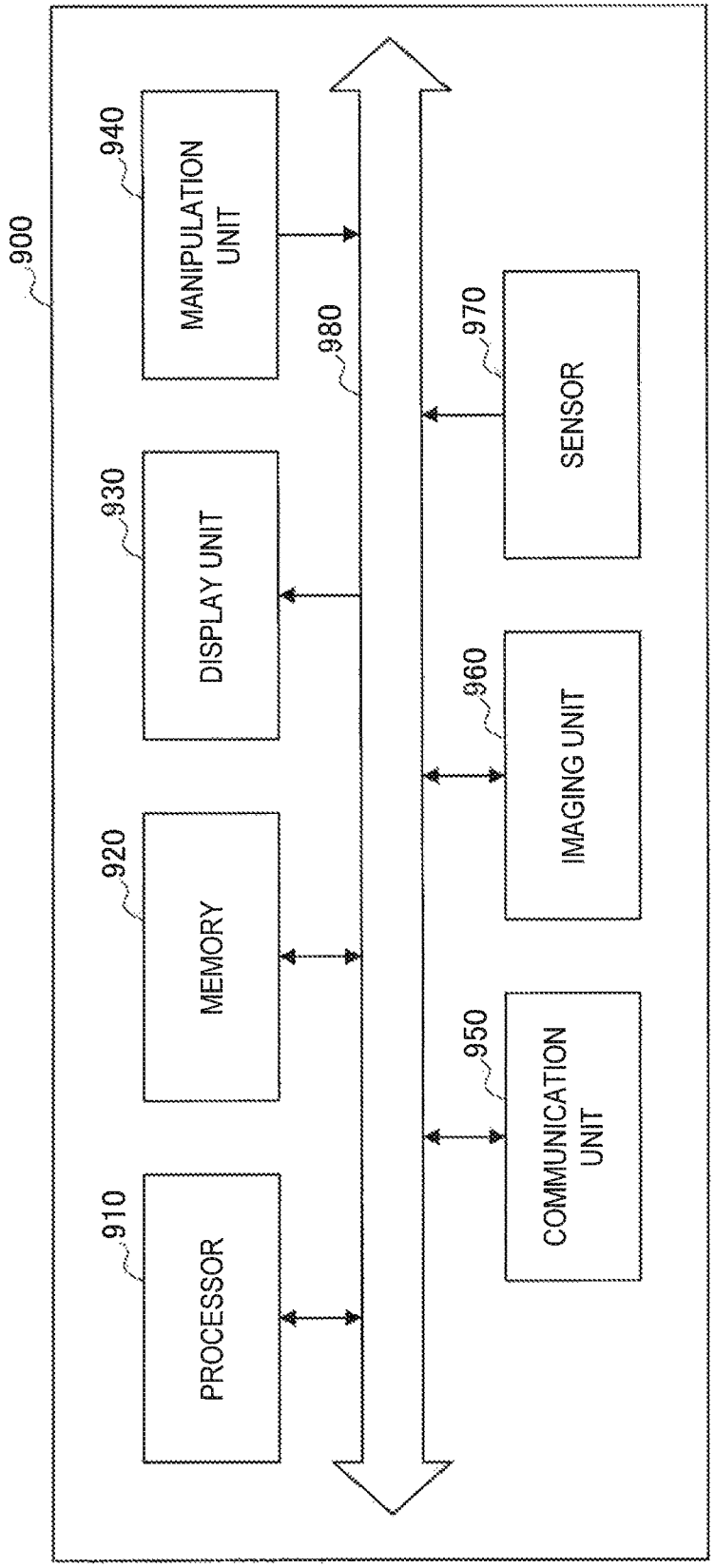
FIG. 2 is a diagram illustrating a schematic configuration of a device according to the embodiment of the present disclosure.

FIG. 2 is a diagram illustrating a schematic configuration of the device according to the embodiment of the present disclosure. Referring to FIG. 2, a device 900 includes a processor 910 and a memory 920. The device 900 can further include a display unit 930, a manipulation unit 940, a communication unit 950, an imaging unit 960, or a sensor 970. These constituent elements are connected to each other by a bus 980. For example, the device 900 can realize a server device configuring the server 100 and any of the clients 200 to 700 described above.

The processor 910 is, for example, any of the various processors such as a central processing unit (CPU) and a digital signal processor (DSP) and realizes, for example, various functions by performing an operation such as arithmetic calculation and control according to programs stored in the memory 920. For example, the processor 910 realizes a control function of controlling all of the devices, the server 100 and the clients 200 to 700 described above. For example, in the server 100, the processor 910 performs image processing to realize display of an AR image to be described below. For example, the processor 910 performs display control to realize display of an AR image of an example to be described below in the server 100, the wearable terminal 200, the tablet terminal 300, the mobile phone 400, the laptop PC 500, or the projector 700.

The memory 920 is configured as a storage medium such as a semiconductor memory or a hard disk and stores programs and data with which the device 900 performs a process. The memory 920 may store, for example, captured image data acquired by the imaging unit 960 or sensor data acquired by the sensor 970. Some of the programs and the data described in the present specification may be acquired from an external data source (for example, a data server, a network storage, or an externally attached memory) without being stored in the memory 920.

For example, the display unit 930 is provided in a client that includes the above-described display unit. The display unit 930 may be, for example, a display that corresponds to the shape of the device 900. For example, of the above-described examples, the wearable terminal 200 can include, for example, a display with a shape corresponding to a lens portion of glasses. The tablet terminal 300, the mobile phone 400, or the laptop PC 500 can include a flat type display provided in each casing. Alternatively, the display unit 930 may be a projection device that projects an image on an object. In the foregoing example, the projector 700 can include a projection device as the display unit.

For example, the manipulation unit 940 is provided in a client that includes the above-described manipulation unit. The manipulation unit 940 is configured in a touch sensor (forming a touch panel along with a display) provided on a display or a pointing device such as a touch pad or a mouse in combination with a keyboard, a button, a switch, or the like, as necessary. For example, the manipulation unit 940 specifies a position in an image displayed on the display unit 930 by a pointing device and receives a manipulation from a user inputting any information at this position using a keyboard, a button, a switch, or the like. Alternatively, the manipulation unit 940 may specify a position in an image displayed on the display unit 930 by a pointing device and further receive a manipulation of a user inputting any information at this position using the pointing device. The manipulation unit 940 may specify the position in the image based on a gesture of the user or may acquire a manipulation of inputting certain information at the position, instead of the pointing device or together with the pointing device. For example, the gesture of the user is specified by analyzing an image acquired by a camera module (which may be the same as or different from the imaging unit 960) and recognizing a motion of a manipulation body such as a part of the body of the user. For example, the gesture of the user may be acquired based on a detection result of a device different from a device including a display, for example, a motion sensor installed in a wearable device mounted on a finger, a wrist, or the like of the user facing the display. In this case, for example, the gesture of the user is specified based on an acceleration or an angular velocity of the finger, the wrist, or the like of the user detected by the motion sensor.

The communication unit 950 is a communication interface that mediates communication by the device 900 with another device. The communication unit 950 supports any wireless communication protocol or any wired communication protocol and establishes communication connection with another device. In the foregoing example, the communication unit 950 is used to transmit an image of a real space captured by a client or input annotation information to the server 100 and transmit an image of the real space or annotation information from the server 100 to a client.

The imaging unit 960 is a camera module that captures an image. The imaging unit 960 images a real space using an image sensor such as a charge coupled device (CCD) or a complementary metal oxide semiconductor (CMOS) and generates a captured image. A series of captured images generated by the imaging unit 960 forms a video. The imaging unit 960 may not necessarily be in a part of the device 900. For example, an imaging device connected to the device 900 in a wired or wireless manner may be treated as the imaging unit 960. The imaging unit 960 may include a depth sensor that measures a distance between the imaging unit 960 and a subject for each pixel. Depth data output from the depth sensor can be used to recognize an environment in an image obtained by imaging the real space, as will be described below.

The sensor 970 can include various sensors such as a positioning sensor, an acceleration sensor, and a gyro sensor. A measurement result obtained from the sensor 970 may be used for various uses such as support of recognition of the environment in the image obtained by imaging the real space, acquisition of data specific to a geographic position, and detection of a user input. The sensor 970 can be provided in a device including the imaging unit 960, such as the wearable terminal 200, the tablet terminal 300, the mobile phone 400, or the fixed camera 600 in the foregoing example.

(2. Sharing and Interaction of Real Space Images)

Figure 4:
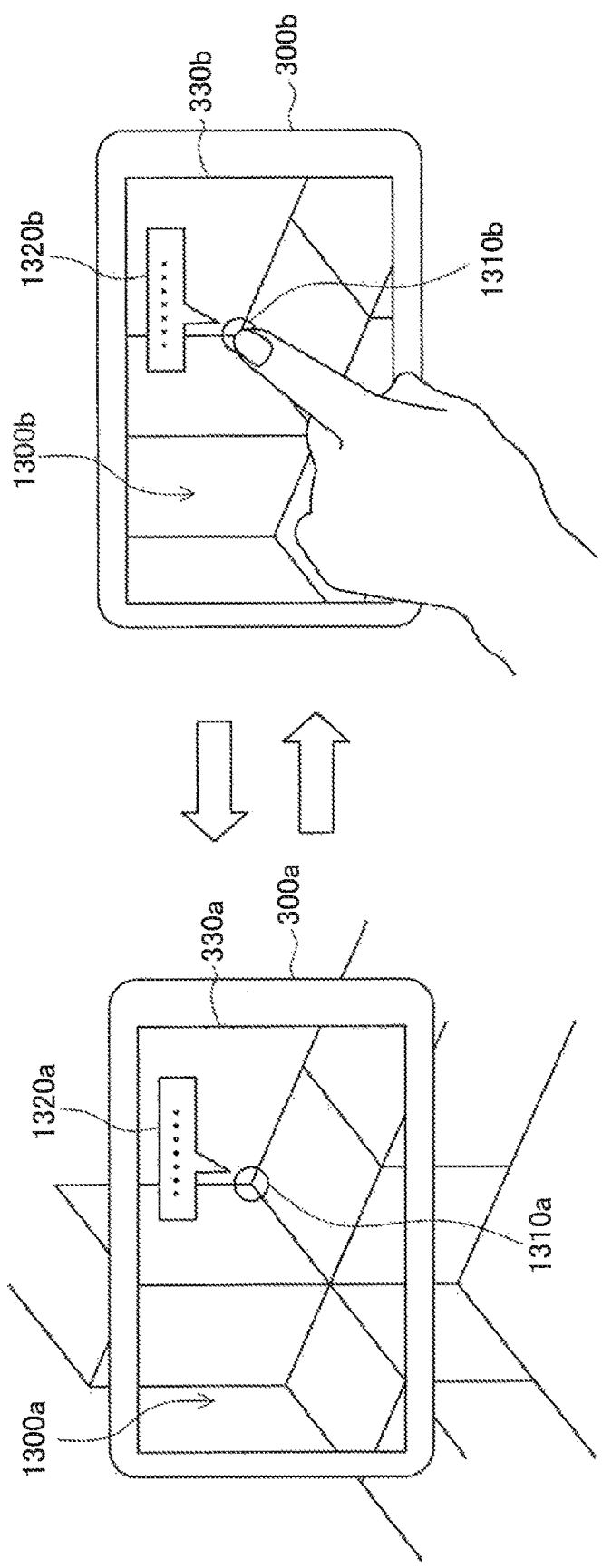
FIG. 4 is a diagram illustrating another example in which captured images are shared according to the embodiment of the present disclosure.

Next, a basic concept of the interaction according to the embodiment of the present disclosure will be described with reference to FIGS. 3A to 4.

(2-1. Concept of Interaction)

FIG. 3A is a diagram illustrating an example in which captured images are shared according to the embodiment of the present disclosure. In the illustrated example, an image of the real space captured by the camera 260 (imaging unit) of the wearable terminal 200 is delivered to the tablet terminal 300 via the server 100 in a streaming manner and is displayed as an image 1300 on the display 330 (display unit). At this time, in the wearable terminal 200, the captured image of the real space is displayed on the display 230 (display unit) or the image of the real space is transmitted through the display 230 to be directly viewed. The image (including a transmitted and viewed background) displayed on the display 230 in this instance is referred to as an image 1200 below.

FIG. 3B is a diagram illustrating an example of an annotation input according to the embodiment of the present disclosure. In the tablet terminal 300, a touch sensor 340 is provided on the display 330 (manipulation unit), and thus a touch input of the user on the image 1300 displayed on the display 330 can be acquired. In the illustrated example, the touch input of the user pointing to a certain position in the image 1300 is acquired by the touch sensor 340, and thus a pointer 1310 is displayed at this position. For example, text input using a separately displayed screen keyboard or the like is displayed as a comment 1320 in the image 1300. The pointer 1310 and the comment 1320 are transmitted as annotations to the wearable terminal 200 via the server 100.

In the wearable terminal 200, annotations input with the tablet terminal 300 are displayed as a pointer 1210 and a comment 1220 in the image 1200. Positions at which these annotations are displayed in the image 1200 correspond to positions of the real space in the image 1300 displayed with the tablet terminal 300. Thus, interaction is established between the wearable terminal 200 which is a transmission side (streaming side) device and the tablet terminal 300 which is a reception side (viewer side) device. A technology which can be used in this example to cause display positions of annotations to correspond to each other between devices or to continuously display the annotations will be described below.

FIG. 3B is a diagram illustrating another example in which captured images are shared according to the embodiment of the present disclosure. In the illustrated example, an image of the real space captured by a camera (an imaging unit which is not illustrated since the imaging unit is located on the rear surface side) of a tablet terminal 300a is delivered to a tablet terminal 300b in a streaming manner and is displayed as an image 1300b on a display 330b (display unit). At this time, in the tablet terminal 300a, the captured image of the real space is displayed on the display 330a or the image of the real space is transmitted through the display 330a to be directly viewed. At this time, the image (including a transmitted and viewed background) displayed on the display 330a is referred to as an image 1300a below. Even in the illustrated example, annotations input for the image 1300b with the tablet terminal 300b are displayed in the image 1300a, and thus interaction is established between the tablet terminal 300a which is a transmission side (streaming side) device and the tablet terminal 300b which is a reception side (viewer side) device.

The sharing of the image of the real space and the interaction between users based on the sharing of the image according to the embodiment are not limited to the foregoing examples related to the wearable terminal 200 and the tablet terminal 300, but can be established using any devices as a transmission side (streaming side) device and a reception side (viewer side) device as long as functions (for example, the functions of the above-described devices (1) to (3)) of the mobile phone 400, the laptop PC 500, the fixed camera 600, or the projector 700 described above are realized.

(2-2. Usable Technologies)

In the embodiment, several technologies are used to realize the interaction and the sharing of the image of the real space described above. First, in the embodiment, space information is added to transmitted image data of the real space in the transmission side device. The space information is information that enables movement of the imaging unit (the camera 260 of the wearable terminal 200 in the example of FIGS. 3A and 3B and the camera of the tablet terminal 300a in the example of FIG. 4) of the transmission side device in the real space to be estimated.

For example, the space information can be an environment recognition matrix recognized by a known image recognition technology such as a structure form motion (SfM) method or a simultaneous localization and mapping (SLAM) method. For example, the environment recognition matrix indicates a relative position and posture of a coordinate system of a criterion environment (real space) with respect to a coordinate system unique to the transmission side device. For example, when the SLAM method is used, a processor of the transmission side device updates the position, posture, speed, and angular velocity of the device and a state variable including the position of at least one feature point included in a captured image, for each frame of the captured image based on the principle of an extended Kalman filter. Thus, the position and posture of the criterion environment for which the position and posture of the device is used as a criterion can be recognized using an input image from a single-lens camera. SLAM is described in detail in, for example, "Real-Time Simultaneous Localization and Mapping with a Single Camera" (Andrew J. Davison, Proceedings of the 9th IEEE International Conference on Computer Vision Volume 2, 2003, pp. 1403-1410).

Further, any information that indicates a relative position and posture in the real space of the imaging unit may be used as the space information. For example, the environment recognition matrix may be recognized based on depth data from a depth sensor provided in the imaging unit. The environment recognition matrix may also be recognized based on output data from an environment recognition system such as an infrared ranging system or a motion capture system. An example of such a technology is described in, for example, Real-time 3D Reconstruction and Interaction Using a Moving Depth Camera by S. Izadi, et al, KinectFusion in ACM Symposium on User Interface Software and Technology, 2011. An embodiment of the present disclosure is not limited thereto, but any of the known various technologies can be used to generate the space information.

Alternatively, the space information may be generated by specifying a relative positional relation between image frames through stitching analysis of a series of frame images obtained by imaging the real space. In this case, the stitching analysis can be 2-dimensional stitching analysis in which each frame image is posted to a base plane or 3-dimensional stitching analysis in which each frame image is posted to any position in a space.

Hereinafter, examples of processes of a transmission side device, a reception side device, and a server related to the foregoing technology will be described using the example of FIGS. 3A and 3B with reference to the flowchart of FIG. 5A. The foregoing technology can be applied to a combination of any devices in the system 10 described above, regardless of the example of FIGS. 3A and 3B.

First, in the wearable terminal 200 (the transmission side device), the imaging unit acquires the image data of the real space and the information acquired by the imaging unit or the sensor is processed by the processor as necessary to generate space information (step S101). The image data and the space information can be associated with each other and are transmitted from the communication unit of the wearable terminal 200 to the server 100 (step S103). In the server 100, the communication unit receives the image data and the space information from the wearable terminal 200 and transfers the image data to the tablet terminal 300 (the reception side device) (step S105). In the server 100, the processor uses the space information to associate a position in the received image with a position of the real space in which the wearable terminal 200 is located (step S107).

In the tablet terminal 300, the communication unit receives the image data from the server 100 and the processor displays the image 1300 on the display 330 based on the received image data (step S109). Here, when an annotation input of the user in regard to the image 1300 is acquired by the touch sensor 340 (step S111), the processor transmits the annotation input from the communication unit to the server 100 in association with the position (for example, the position of the pointer 1310) in the image 1300 (step S113).

In the server 100, when the communication unit receives the information regarding the annotation input and the position in the image transmitted from the tablet terminal 300, the processor converts the position in the image included in the received information into a position of the real space (step S115). The annotation input associated with the position of the real space after the conversion is transmitted from the communication unit to the wearable terminal 200 (step S117).

In the wearable terminal 200, the communication unit receives the information regarding the annotation input and the position of the real space from the server 100, and the processor converts the position of the real space associated with the annotation information into a position in the image 1200 currently displayed on the display 230 using the space information (step S19) and displays an annotation (for example, the pointer 1210 or the comment 1220) at the position (step S121).

Another example of the foregoing process is illustrated in FIG. 5B. In this example, the processor of the server 100 associates a position in the image with a position of the real space, and then the communication unit transmits information regarding the position of the real space included in the image along with the image data to the tablet terminal 300 (step S201). In the tablet terminal 300, the image is displayed on the display 330 (step S109), as in the foregoing example of FIG. 5A. However, the annotation input is transmitted in association with the position of the real space received in step S201 rather than the position in the image (step S203). Accordingly, in the server 100, the communication unit may transfer information regarding the annotation input associated with the position of the real space to the wearable terminal 200 (step S205).

(First Advantageous Effect)

In the above-described technology, there are several advantageous effects. For example, an image of the real space is acquired by the wearable terminal 200, and then an annotation for the image is input by the tablet terminal 300. Further, a time difference occurs until the annotation is transmitted to the wearable terminal 200 in many cases.

Accordingly, when an annotation is transmitted and received using a position in the image as a criterion, a display range of the image 1200 displayed with the wearable terminal 200 is changed due to movement of a user or the device during the foregoing time difference. Therefore, the annotation transmitted from the tablet terminal 300 is displayed at a different position from a position intended by the user of the tablet terminal 300 viewing the image 1300 in the wearable terminal 200.

However, when the foregoing technology is applied, an annotation can be associated with a position of a real space. Therefore, irrespective of a change in the display range of the image 1200, an annotation can be displayed at a position (for example, a position corresponding to a specific object in the real space) intended by the user of the wearable terminal 300 viewing the image 1300 even in the wearable terminal 200.

(Second Advantageous Effect)

For example, when the image 1200 of the real space displayed with the wearable terminal 200 is coordinated with the image of the real space transmitted through the display 230 and viewed directly or viewed outside the display 230 and is displayed on the display 230, the range of the image 1200 can be narrower than the range of the image of the real space imaged by the camera 260 of the wearable terminal 200 (that is, the range of a captured image is broader than a range viewed by the user of the wearable terminal 200) in some cases.

In such cases, the range of the image 1300 displayed on the display 330 of the tablet terminal 300 becomes broader than the range of the image 1200 of the wearable terminal 200, so that the user of the tablet terminal 300 can input an annotation outside of the image 1200, that is, in a range which is not viewed by the user of the wearable terminal 200. Accordingly, when the annotation is transmitted and received using a position in the image as a criterion, an input is possible in the tablet terminal 300, but an annotation not displayed in the image 1200 of the wearable terminal 200 may be generated.

In contrast, when the foregoing technology is applied, an annotation can be associated with a position of the real space. Therefore, even for an annotation at a position which is not in the display range of the image 1200 at a time point of reception in the server 100 or the wearable terminal 200, the image 1200 can be displayed, for example, when the display range of the image 1200 is subsequently changed and include the position of the annotation.

In the foregoing technology, the advantageous effects are not limited to the above-described advantageous effects, but other advantageous effects can be obtained according to use situations. Such advantageous effects can be expressed clearly or suggested in the following description.

(3. Examples of Display of Variable Viewpoint Images)

Next, display of a variable viewpoint image according to the embodiment will be described with reference to FIGS. 6 to 12. In the embodiment, as described above, the transmission side device adds space information to the image data of a real space to transmit the space information. The space information is, for example, information indicating a position and a posture in the real space of the imaging unit of the transmission side device. When this information is used, as will be described below, an image in which the real space is observed can be generated at a free viewpoint regardless of a viewpoint of a 1st-person image (which is an image of the real space captured by the imaging unit) to be supplied to the reception side device.

In the following description, operations of the transmission side device, the reception side device, and the server will be described using the example illustrated in FIGS. 3A and 3B. The same configuration can be realized by combining any device of the system 10 described above without limitation to the example of FIGS. 3A and 3B.

(1st-Person Image)

Figure 6:
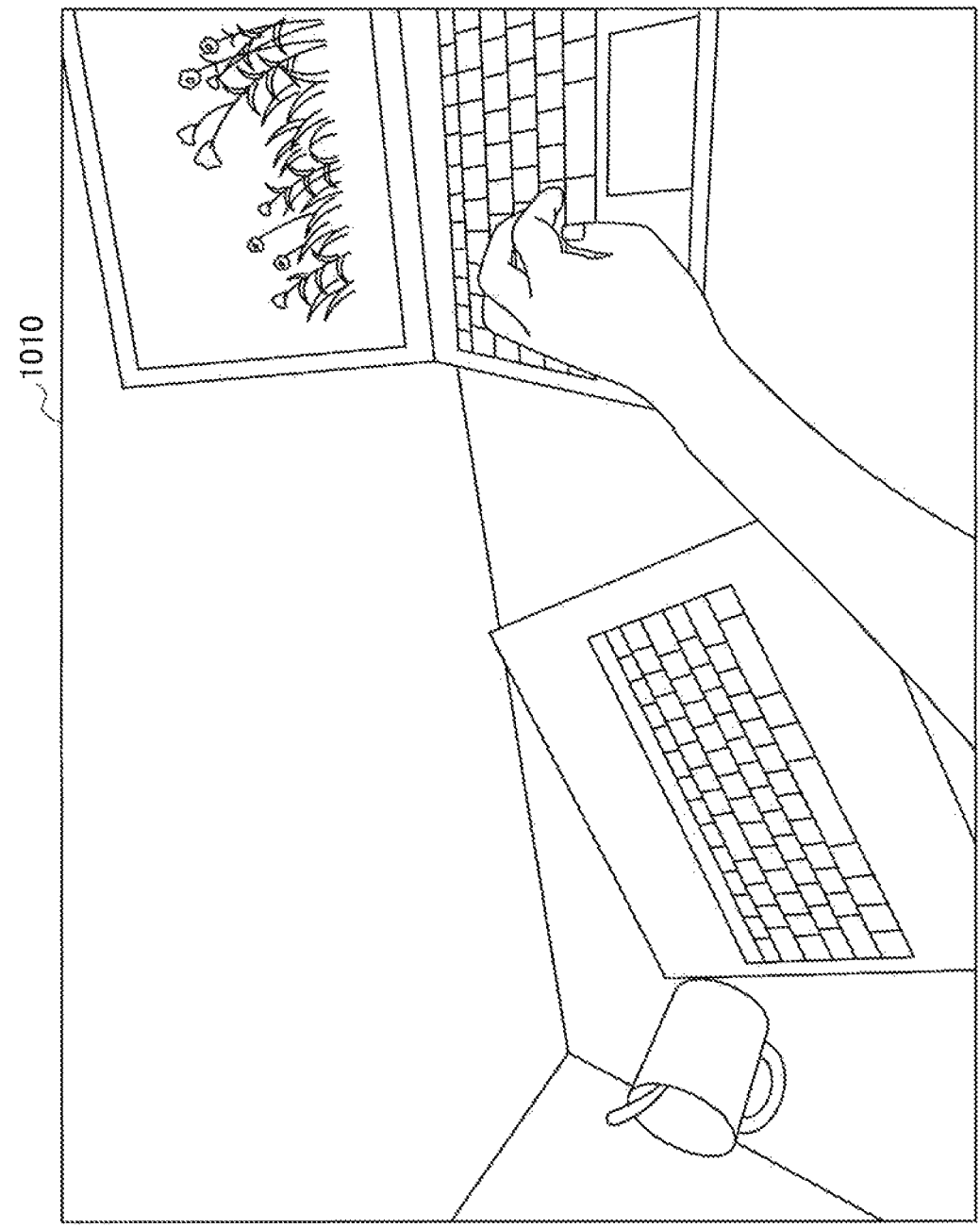
FIG. 6 is a diagram illustrating a display example of a 1st-person image according to the embodiment of the present disclosure.

FIG. 6 is a diagram illustrating a display example of a 1st-person image according to the embodiment of the present disclosure. In FIG. 6, a 1st-person image 1010 is illustrated. The 1st-person image 1010 is an image that is captured by the camera 260 of the wearable terminal 200 (the transmission side device). Since the 1st-person image 1010 can be the same as the image 1200 displayed on the display 230 with the wearable terminal 200, the 1st-person image 1010 is referred to as a "1st-person image" in the present specification. Since the 1st-person image 1010 is a streaming frame, that is, a series of frame images captured by the camera 260, the display range changes every moment, for example, with a motion of the user wearing the wearable terminal 200.

(3rd-Person Image)

Figure 7:
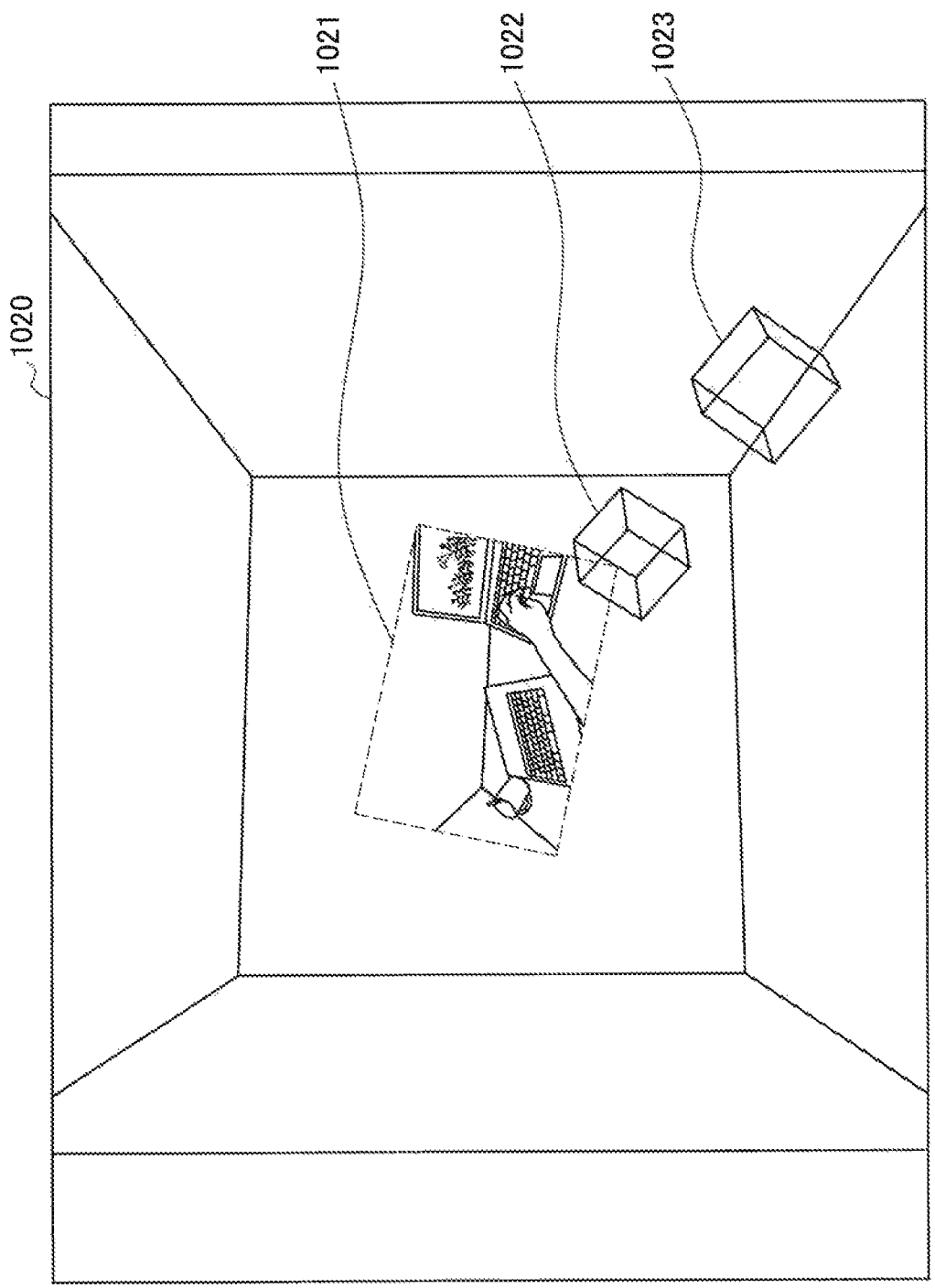
FIG. 7 is a diagram illustrating a display example of a 3rd-person image according to the embodiment of the present disclosure.
Figure 8:
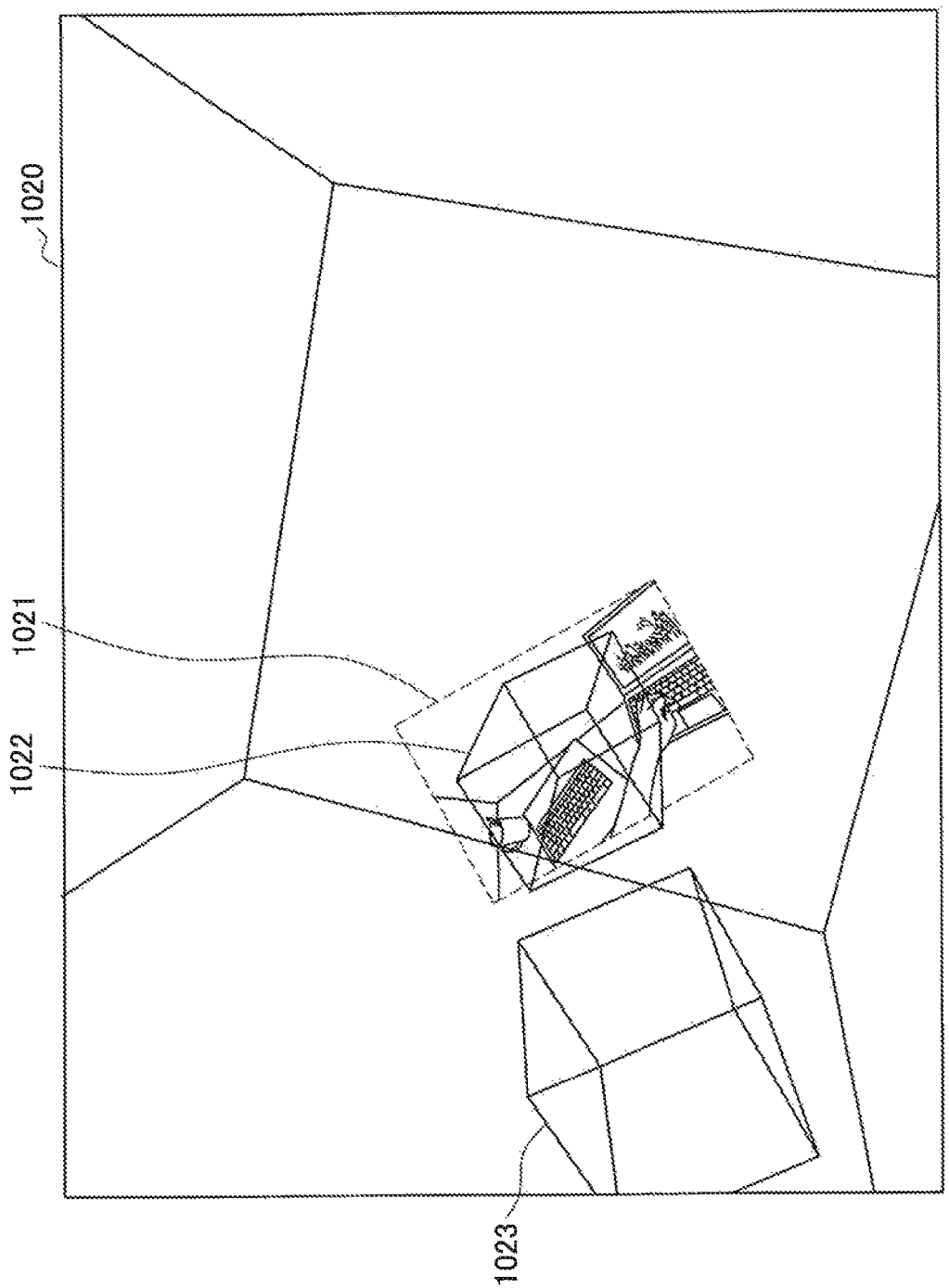
FIG. 8 is a diagram illustrating a display example of a 3rd-person image according to the embodiment of the present disclosure.
Figure 9:
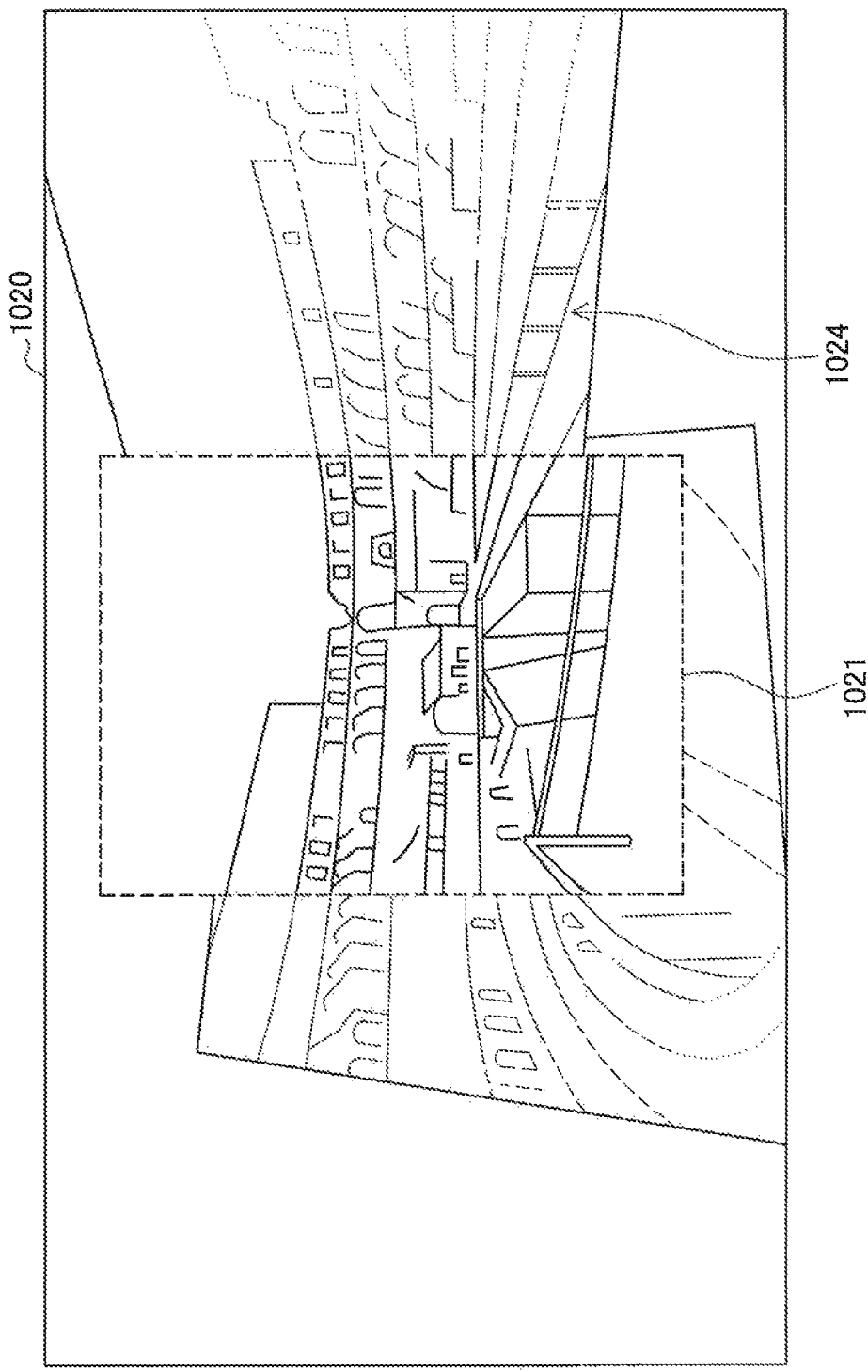
FIG. 9 is a diagram illustrating a display example of a 3rd-person image according to the embodiment of the present disclosure.

FIGS. 7 to 9 are diagrams illustrating a display example of a 3rd-person image according to the embodiment of the present disclosure. A 3rd-person image 1020 illustrated in FIGS. 7 to 9 is an image that is obtained by virtually imaging a real space in which the camera 260 of the wearable terminal 200 is located from a different viewpoint from a 1st-person image based on the space information supplied along with data of a captured image. Since the 3rd-person image 1020 is generated at a position in the real space of the camera 260 of the wearable terminal 200, that is, a viewpoint set freely irrespective of the viewpoint of the transmission side device, unlike the 1st-person image 1010, the 3rd-person image 1020 is referred to as a "3rd-person image" in the present specification. For example, the 3rd-person image 1020 can be generated when the processor of the server 100 processes an image of the real space acquired by the camera 260 of the wearable terminal 200 based on the space information supplied from the wearable terminal 200, and then the communication unit can transmit the 3rd-person image 1020 to the tablet terminal 300.

In the 3rd-person image 1020, an image captured by the camera 260 can be displayed as a streaming frame 1021. The streaming frame 1021 is, for example, the same image as the foregoing 1st-person image 1010 and is disposed in a rectangular region corresponding to a screen of the streaming frame 1021 in the displayed real space according to the space information. For example, the shape of this region can be deformed into, for example, a trapezoid shape or a trapezium shape according to an inclination of the viewpoint of the 3rd-person image 1020 with respect to the streaming frame 1021.

When a completely free viewpoint can be set with the 3rd-person image 1020, for example, a viewpoint can be set such that the streaming frame 1021 is outside of the display range of the 3rd-person image 1020 or a viewpoint can be set on the rear surface side of the streaming frame 1021. In such a case, the streaming frame 1021 may not be displayed in the 3rd-person image 1020. In this case, a link of the 3rd-person image 1020 and the wearable terminal 200 including the camera 260 supplying a streaming frame may be released and the 3rd-person image 1020 may secede temporarily from the transmission side device. In this case, when the viewpoint of the 3rd-person image 1020 can be further moved based on a cache of the space information at the time of the secession and, for example, the streaming frame 1021 or a streaming frame supplied from another transmission side device enters the display range of the 3rd-person image 1020 again, a link of the 3rd-person image 1020 and the transmission side device can resume. Further, when the viewpoint of the 3rd-person image 1020 is set on the rear surface side of the streaming frame 1021, only the rim of the streaming frame 1021 may continue to be displayed. Alternatively, the setting of the viewpoint in the 3rd-person image 1020 may be restricted such that a normally undisplayed range of the streaming frame 1021 is excluded, as described above.

Even when a portion outside of the streaming frame 1021 in the 3rd-person image 1020 is recognized through the space information, an image in real time is not supplied. Therefore, for example, this portion can be schematically displayed using a wire frame or the like as in the illustrated example. The illustrated wire frame indicates a square room. However, the real space may not necessarily be such a room and may be displayed, for example, to recognize the upper and lower sides in a broad real space. As in the example illustrated in FIG. 9, a previously supplied stream frame 1024 may be pasted to the streaming frame 1021 to be displayed, for example, using a stitching analysis result. Alternatively, the same peripheral region image as a 1.3rd-person image to be described below may be displayed in the periphery of the streaming frame 1021.

As illustrated in FIGS. 7 and 8, a viewpoint object 1022 of a 1st-person image and a viewpoint object 1023 of a 1.3rd-person image may be displayed in the 3rd-person image 1020. The viewpoint object 1022 of the 1st-person image indicates a viewpoint of the 1st-person image, that is, a viewpoint of the streaming frame 1021. Further, the viewpoint object 1023 of the 1.3rd-person image indicates a virtually set viewpoint when a 1.3rd-person image to be described below is generated. The positions of both viewpoints can be specified based on the space information. In the 3rd-person image 1020, conversion into an image corresponding to each viewpoint, that is, the 1st-person image 1010 or the 1.3rd-person image to be described below, may be possible, for example, by selecting the viewpoint object 1022 or the viewpoint object 1023. In the 3rd-person image 1020, a viewpoint may be set to be changed automatically so that an object recognized in the real space is confronted directly and/or expanded using the object as a criterion.

To realize such display, the display range of the 3rd-person image 1020 may not be affected by a change of the display range of the streaming frame 1021 because of, for example, movement of the camera 260 of the wearable terminal 200. For example, when the camera 260 is moved, the display region and display content of the streaming frame 1021 are changed and the viewpoint object 1022 of the 1st-person image can be moved. However, the display range of the 3rd-person image 1020 can be maintained. The viewpoint object 1023 of the 1.3rd-person image can also be moved with movement of the camera 260. The display range of the 3rd-person image 1020 can be changed, for example, when an instruction to change a viewpoint is acquired from a user viewing the 3rd-person image 1020 with the tablet terminal 300.

The 3rd-person image 1020 may not necessarily be generated based on the image of the real space acquired by a single transmission side device, for example, the camera 260 of the wearable terminal 200. For example, the 3rd-person image 1020 may be generated by further combining an image of the real space acquired by another device (for example, the fixed camera 600) in the same real space (for example, the same room) as, for example, the wearable terminal 200. In this case, the fixed camera 600 also adds the space information to the image data of the real space to supply the space information to the server 100. The server 100 can generate the 3rd-person image 1020 combined with a plurality of pieces of image data of the real space based on the space information supplied from each device. In this case, the plurality of streaming frames 1021 may be displayed in the 3rd-person image 1020.

(1.3rd-Person Image)

FIG. 10A is a diagram illustrating a display example of a 1.3rd-person image according to the embodiment of the present disclosure. In FIG. 10A, a 1.3rd-person image 1030 is illustrated. The 1.3rd-person image 1030 is an image that is obtained by virtually imaging a real space from a viewpoint on the rear surface side of the camera 260 based on an image captured by the camera 260 of the wearable terminal 200. A viewpoint of the 1.3rd-person image 1030 can be set separately from the viewpoint of the 1st-person image 1010, but is not set freely like the viewpoint of the 3rd-person image 1020. Therefore, in the present specification, "1.3rd-person image" is used as a term meaning an image having an intermediate nature between a 1st-person image and a 3rd-person image. A relation between a viewpoint of the 1.3rd-person image 1030 and a viewpoint of the 1st-person image 1010 can be understood easily with reference to, for example, a relation between the viewpoint object 1022 and the viewpoint object 1023 displayed in the 3rd-person image 1020 illustrated in FIGS. 7 and 8.

In the 1.3rd-person image 1030, for example, an image captured by the camera 260 is displayed as a streaming frame 1031. The streaming frame 1031 can be, for example, the same image as the foregoing 1st-person image 1010. Here, since a viewpoint of the 1.3rd-person image 1030 is set on the rear surface side of the camera 260, the position of the streaming frame 1031 is typically near the center of the 1.3rd-person image 1030 and the shape of the streaming frame 1031 is typically rectangular.

Here, when the camera 260 is moved, the display range of the 1.3rd-person image 1030 can also be changed to track the streaming frame 1031. At this time, for example, the processor of the server 100 may process displacement of the camera 260 calculated based on the space information using a noise filter, a lowpass filter, or the like, and then may reflect the displacement in displacement of the viewpoint of the 1.3rd-person image 1030. Thus, for example, even when blur occurs in the streaming frame 1031 due to minute motion of the camera 260, blur of the 1.3rd-person image 1030 can be suppressed. For example, even when the user of the wearable terminal 200 looks back and the position or posture of the camera 260 is abruptly changed, the display range of the 1.3rd-person image 1030 is smoothly tracked so that the user viewing the 1.3rd-person image 1030 can easily recognize how the viewpoint is changed. Thus, when the change in the display range of the 1.3rd-person image 1030 is adjusted with respect to the change in the display range of the streaming frame 103, the streaming frame 1031 may be displayed temporarily at a position other than the center of the 1.3rd-person image 1030 or may not be displayed in the 1.3rd-person image 1030.

In the 1.3rd-person image 1030, a peripheral region image 1032 can be displayed in the periphery of the streaming frame 1031. The peripheral region image 1032 can be generated by posting a previously supplied streaming frame to the periphery of the streaming frame 1031 using a result of stitching analysis or the like, as in the example described with reference to FIG. 9 in the 3rd-person image 1020. Alternatively, a space model in the periphery of the streaming frame 1031 generated using feature points detected by an SLAM method or the like or 3-dimensional data or the like of dense mapping may be displayed as the peripheral region image 1032. At this time, an image extracted from a previous streaming frame may be attached as texture to a surface included in the space model. For example, since the number of images accumulated as the previous streaming frames 1031 is small in a marginal portion or the like of the 1.3rd-person image 1030 distant from the streaming frame 1031 and a time has passed after deviation from the display range of the streaming frame 1031, there is a possibility of a situation of the real space having changed or there is a possibility of accuracy of the space model being lowered. In this case, a part of the peripheral region image 1032 may not be displayed or may be vignetted and displayed, as illustrated.

FIGS. 10B and 10C are diagrams for describing the 1.3rd-person image according to the embodiment of the present disclosure. Referring to the drawings, the above-described 1.3rd-person image will be further described from a different point of view. As illustrated in FIG. 10B, a viewpoint CP2 of a 1.3rd-person image is set at a position at which a viewpoint CP1 of a 1st-person image is moved virtually backward in, for example, a coordinate system of a real space acquired by an SLAM method or the like.

Here, for example, the processor of the server 100 can set a predetermined upper limit to a movement speed (hereinafter also referred to as a tracking speed of the viewpoint CP2) when the viewpoint CP2 tracks the viewpoint CP1 or multiply a movement speed of the viewpoint CP1 by a gain smaller than 1 to set a tracking speed of the viewpoint CP2. Therefore, the viewpoint CP2 can be smoothly tracked even when the viewpoint CP1 is moved abruptly. Thus, the user viewing the 1.3rd-person image can easily recognize how the viewpoint is changed.

However, when a frame FRM acquired from the viewpoint CP1, that is, a latest frame of the 1st-person image, is deviated from the range of the 1.3rd-person image, it is difficult to maintain the context of a space displayed in the 1.3rd-person image. Accordingly, for example, even when the tracking speed of the viewpoint CP2 is suppressed by setting the upper limit or the gain, as described above, the movement speed of the viewpoint CP1 is high. Therefore, when a region with a proportion equal to or greater than a predetermined proportion of the frame FRM is deviated from the range of the 1.3rd-person image, control may be added such that the frame FRM within the range of the 1.3rd-person image is maintained, for example, by enlarging the value of the upper limit or the gain to raise the tracking speed of the viewpoint CP2.

FIG. 10C illustrates an example of an image displayed when the above-described control is performed. In A, the 1st-person image 1010 is displayed. In B, the 1.3rd-person image 1030 starts to be displayed by moving the viewpoint of the 1st-person image 1010 virtually backward. In the illustrated example, since previous frame images at this time are not yet accumulated, nothing is displayed in a portion outside of the frame FRM of the 1.3rd-person image 1030.

In C, the viewpoint CP1 is moved in the state in which the 1.3rd-person image 1030 is displayed and the viewpoint CP2 of the 1.3rd-person image tracks the viewpoint CP1 to be moved. However, since the tracking speed of the viewpoint CP2 is suppressed in the foregoing example, the movement of the display range of the 1.3rd-person image 1030 is slightly later than the movement of the frame FRM. Accordingly, the frame FRM is located at a position slightly deviated from the center of the 1.3rd-person image 1030. On the other hand, at this time, an object is displayed even in a portion outside of the latest frame FRM, for example, using the image of the previous frame FRM displayed in B or the like.

In D, since the movement speed of the viewpoint CP1 is high, the viewpoint CP2 does not completely track the viewpoint CP1 at the suppressed tracking speed and a part of the frame FRM is deviated from the display range of the 1.3rd-person image 1030. At this time, for example, the processor of the server 100 further increases the value of the upper limit or the gain to raise the tracking speed of the viewpoint CP2. As a result, in E, the entire frame FRM enters the display range of the 1.3rd-person image 1030 again.

In addition to the control of the tracking speed of the viewpoint CP2 according to the movement speed of the viewpoint CP1 and the display state of the frame FRM, as described above, for example, the processor of the server 100 may fix the display range of the 1.3rd-person image 1030 by suppressing the movement of the viewpoint CP2 when a manipulation on the 1.3rd-person image 1030 is acquired via a touch panel or the like in a device such as the tablet terminal 300 acquiring a manipulation (for example, an annotation input) on the 1.3rd-person image 1030. Thus, for example, the user easily performs a manipulation at a specific position displayed in the 1.3rd-person image 1030.

For example, the following configuration can be realized in conversion of display of the 1st-person image 1010 and the 1.3rd-person image 1030. For example, the processor of the server 100 first displays the 1st-person image 1010 when the position of a viewpoint of a camera is not recognized (during search). Here, for example, when the position of the viewpoint is recognized and tracking by an SLAM method or the like starts, the processor may switch a displayed image to the 1.3rd-person image 1030. Thereafter, for example, the tracking by the SLAM method or the like fails and search for the position of the viewpoint resumes, the processor may return the displayed image to the 1st-person image 1010. In this example, both of transition from the 1st-person image 1010 to the 1.3rd-person image 1030 and transition from the 1.3rd-person image 1030 to the 1st-person image 1010 may be displayed with an animation.

In the embodiment, as described above, an image in which the real space is displayed beyond a range imaged by the imaging unit of the transmission side device (in the foregoing example, the wearable terminal 200) can be supplied in the reception side device (in the foregoing example, the tablet terminal 300). Thus, the user of the reception side device can share the image of the real space at a free viewpoint regardless of a viewpoint of the user of the transmission side device.

Application Example 1

Examples of the 1.3rd-person image and the 3rd-person image according to the embodiment of the present disclosure will be described with reference to FIGS. 10D to 10F. In the description of this section, the 1.3rd-person image and the 3rd-person image are collectively referred to as out-of-body secession viewpoint images.

The out-of-body secession viewpoint images are generated by rendering a virtual space in which a previous frame (a frame of a 1st-person image) and a frame of real time (latest frame FRM) are disposed as a video from a virtual camera viewpoint $M_v$ controlled by the user viewing an image. In the rendering of the frames disposed in the space, to reduce visual mismatch caused due to a stitching error, each frame is displayed with transmittance decided based on a posture difference between the posture of a virtual camera and the posture of the disposed frame.

When the space recognition fails, the previous frame gradually disappears and only the frame of the real time is drawn and updated while $M_v$ is maintained for a predetermined time. When the space recognition reverts within a predetermined time, the drawing of the previous frame reverts. Conversely, when the space recognition does not revert within the predetermined time, the space recognition is initialized and construction of an out-of-body secession viewpoint starts again.

Here, in this example, three modes are broadly set for the out-of-body secession viewpoint images. In the following description, the three modes are referred to as a tracking mode, a viewpoint movement mode, and a pointing mode, but these modes are named only for convenience. For example, the processor of the server 100 controls switching or the like of the modes through a manipulation of a user browsing images.

(Tracking Mode)

The tracking mode illustrated in FIG. 10D is a mode that is set when a user U (hereinafter also referred to as a browsing user) browsing images views an out-of-body secession viewpoint image without performing a special manipulation. When the position and posture of a virtual camera is decided as illustrated, an image 1030d of the tracking mode is displayed. For example, a camera posture $M'_{bc}(t)$ smoothed by the following expression 1 can be obtained from $T'_{bc}(t)$ and $R'_{bc}(t)$ smoothed using a parallel movement component $T_{bc}(t)$ and a rotation component $R'_{bc}(t)$ obtained from the posture and position $M_{bc}(t)$ of the camera 260 of the wearable terminal 200 (the transmission side device) estimated by an SLAM method or the like as coefficients of $k_T$ and $k_R$.

[Math 1]

$$T'_{bc}(t+1)=k_T T_{bc}(t)+(1-k_T)T'_{bc}(t)$$

$$R'_{bc}(t+1)=k_R T_{bc}(t)+(1-k_R)R'_{bc}(t) \quad \text{Expression 1}$$

As illustrated in FIG. 10D, the position and posture $M_v(t)$ of the virtual camera is controlled such that the position and posture $M_v(t)$ is closer at each time to a position moved from the posture $M'_{bc}(t)$ of the camera smoothed in a time series manner to the rear side virtually by a predetermined offset amount $T_{offset}$ a to view a broader range. Here, a coefficient $k_v$ is set for control of tracking to a viewpoint of the camera 260 to some extent. In this example, when the frame (FRM) of the real time enters the range of an image, the coefficient $k_v$ is set to a smaller value (the virtual camera hardly moves and an image localized in a space is supplied). When the frame (FRM) of the real time does not enter the range of an image, the coefficient $k_v$ is set to a larger value (the virtual camera tracks a frame of the real time). For example, the control using the coefficient $k_v$ is expressed as in the following expression 2.

[Math 2]

$$M_v(t+1)=k_v M'_{bc}(t)T_{offset}+(1-k_v)M_v(t) \quad \text{Expression 2}$$

Thus, the browsing user can simultaneously view the frame of the real time and the previous frame in a spatially localized and stitched state with a motion smoothed based on a motion of the camera 260. Accordingly, the browsing user can look around the space more broadly than (the user wearing) the camera 260 and can recognize the position of (the user wearing) the camera 260 in the space of a current visual field. In the tracking mode, a relation between the visual fields is updated automatically without intervention from the user. Therefore, for example, it is not necessary to control the setting of the visual fields of both the browsing user and the user wearing the camera 260.

(Viewpoint Movement Mode)

Figure 10E:
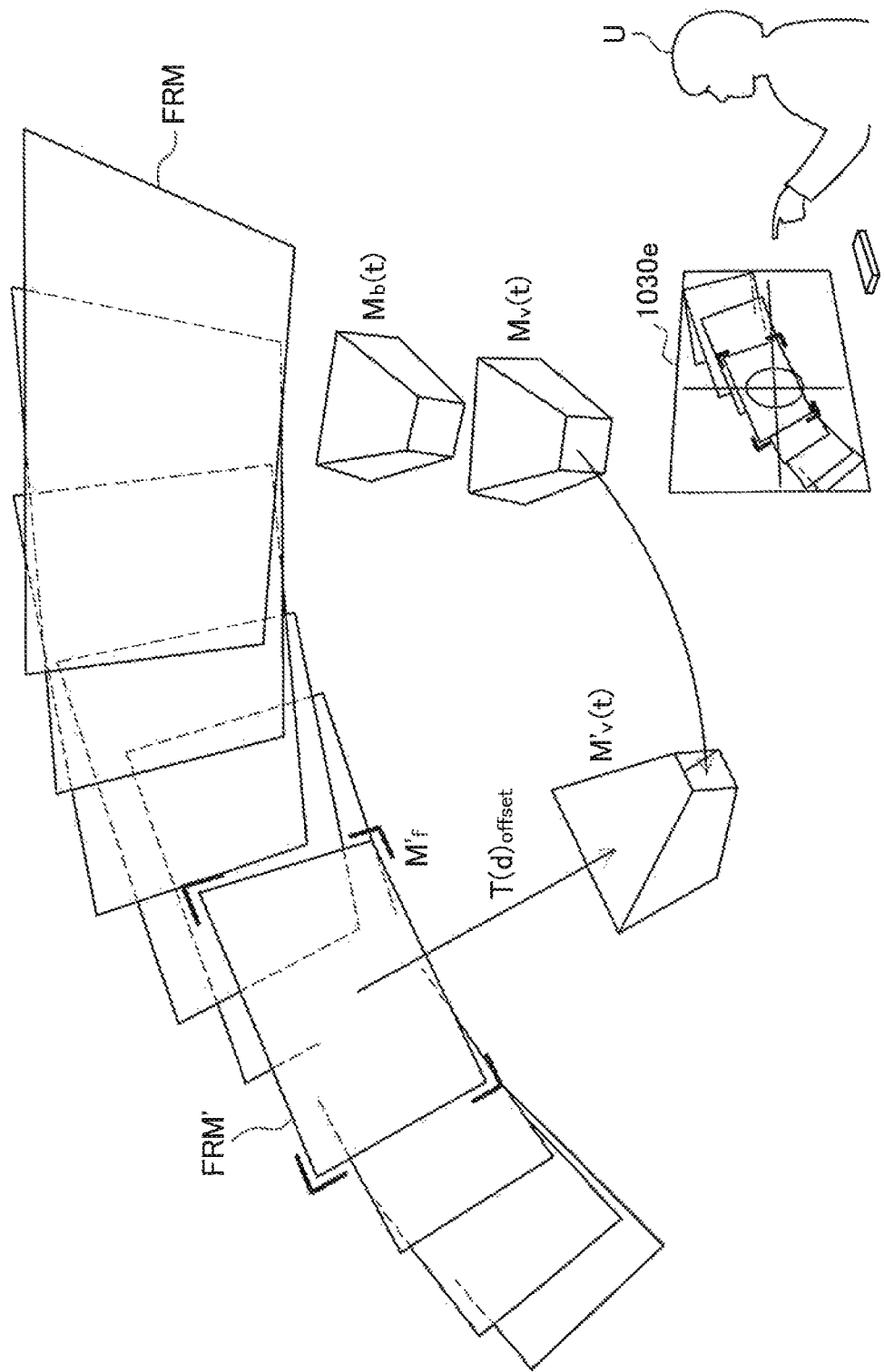
FIG. 10E is a diagram for describing examples of the 1.3rd-person image and the 3rd-person image according to the embodiment of the present disclosure.

The viewpoint movement mode illustrated in FIG. 10E is, for example, a mode that is set when a user U (hereinafter also referred to as a browsing user) browsing images performs a pointing manipulation at a position that is a predetermined distance or more from a display (in the illustrated example, a pointing manipulation is performed through a gesture, but a pointing manipulation using a pointing device or the like may be performed). In the viewpoint movement mode, an image 1030e in which a position $M_v$ of a virtual camera is moved can be displayed.

For example, the user U performs a pointing manipulation on the image 1030d of the tracking mode at a position distant by the predetermined distance or more from the display. At this time, the processor of the server 100 performs hit determination between a position in an image specified through a pointing manipulation and each frame displayed in the tracking mode and specifies a focus frame FRM' pointed to by the user U based on a result of the hit determination. Further, the processor sets a position moved virtually to the rear side by a predetermined offset amount $T(d)_{offset}$ from a position $M'_f$ of the frame FRM' for lending a fee as a new position $M'_v$ of the virtual camera. Thus, the position of the virtual camera is moved from a position $M_v$ in the tracking mode up to the current time to the position $M'_v$ in the viewpoint movement mode. This movement may be performed with, for example, an animation.

In the viewpoint movement mode, the position of the virtual camera can be controlled independently from the latest direction of the camera 260. The foregoing offset $T(d)_{offset}$ may be set to a value larger than the offset $T_{offset}$ in the tracking mode.

In this case, in the viewpoint movement mode, surroundings can be observed in a broader visual field than in the tracking mode.

(Pointing Mode)

The pointing mode illustrated in FIG. 1 OF is, for example, a mode that is set when a user U (hereinafter also referred to as a browsing user) browsing images performs a pointing manipulation within a predetermined distance from a display (in the illustrated example, a pointing manipulation is performed through a gesture, but a pointing manipulation using a pointing device or the like may be performed). In the pointing mode, a position $M'_v$ of a virtual camera can be decided by the same algorithm as in the foregoing viewpoint movement mode. However, the position $M'_v$ of the virtual camera may be set at a position at which the focus frame FRM' can be zoomed in on and viewed. Thus, the browsing user can observe the focus frame RFM' in more detail. The browsing user is supplied with an image 1030f as a result of the setting of the position $M'_v$ of the virtual camera.

In the pointing mode, pointing that is fixed in a space in which the camera 260 is located can be performed. In this case, for example, the processor of the server 100 extracts three feature points $P'_0$, $P'_1$, and $P'_2$ located at the nearest neighboring positions of pointing coordinates in a feature point group $P_0, P_1, \ldots,$ and $P_N$ of a space included in an image by comparing positions (2-dimensional pointing coordinates) specified in the image through a pointing manipulation to 2-dimensional coordinates of the feature point group. For example, the processor calculates pointing coordinates P'(x, y, z) using the following expression 3, assuming that 3-dimensional pointing coordinates in the space are points on a plane including the foregoing three points ($P'_0$, $P'_1$, and $P'_2$).

[Math 3]

$$P'(x,y,z)=a(P'_2-P'_0)+b(P'_1-P'_0) \quad \text{Expression 3}$$

In the foregoing expression 3, when the values of a and b are obtained, points on the plane including the foregoing three points can be obtained. For example, through the above-described process performed by the processor of the server 100, the browsing user can point to a 3-dimensional point in space coordinates recognized from a frame rather than a pixel of a frame.

In the foregoing example, the switching of the viewpoint movement mode and the pointing mode is performed according to a distance of the user U from the display. However, when the display is relatively large, this distance may be, for example, a distance between the display to the position of the user U. For example, when the display is a relatively small display installed in a tablet terminal, a smartphone, or the like, the distance used for the switching of the viewpoint movement mode and the pointing mode may be specified as a distance to a hand (finger) of the user U performing a gesture or a distance to a pointing device gripped by the user U. For example, when a pointing manipulation starts through a gesture of a hand of the user U and the distance between the hand and the display exceeds a threshold value, the viewpoint movement mode is selected. Thereafter, when the distance between the display and the hand becomes equal to or less than the threshold value, the viewpoint movement mode may be switched to the pointing mode, as described above.

Application Example 2

In the embodiment, as described above, the technology for transmitting and receiving an annotation using the position of the real space as the criterion can be used. When this technology is used, the user of the tablet terminal 300 (the reception side device) can input the annotation even to a region other than the streaming frames 1021 and 1031 displayed in the 3rd-person image 1020 or the 1.3rd-person image 1030. Thus, for example, an annotation can be added even to a position in the real space or an object seen previously with the wearable terminal 200 (the transmission side device) but not currently visible. For example, the annotation may be displayed when the streaming frame 1021 or 1031 is subsequently moved. As in an example to be described below, a notification indicating that an annotation is outside the image 1200 may be displayed in the wearable terminal 200.

Figure 12:
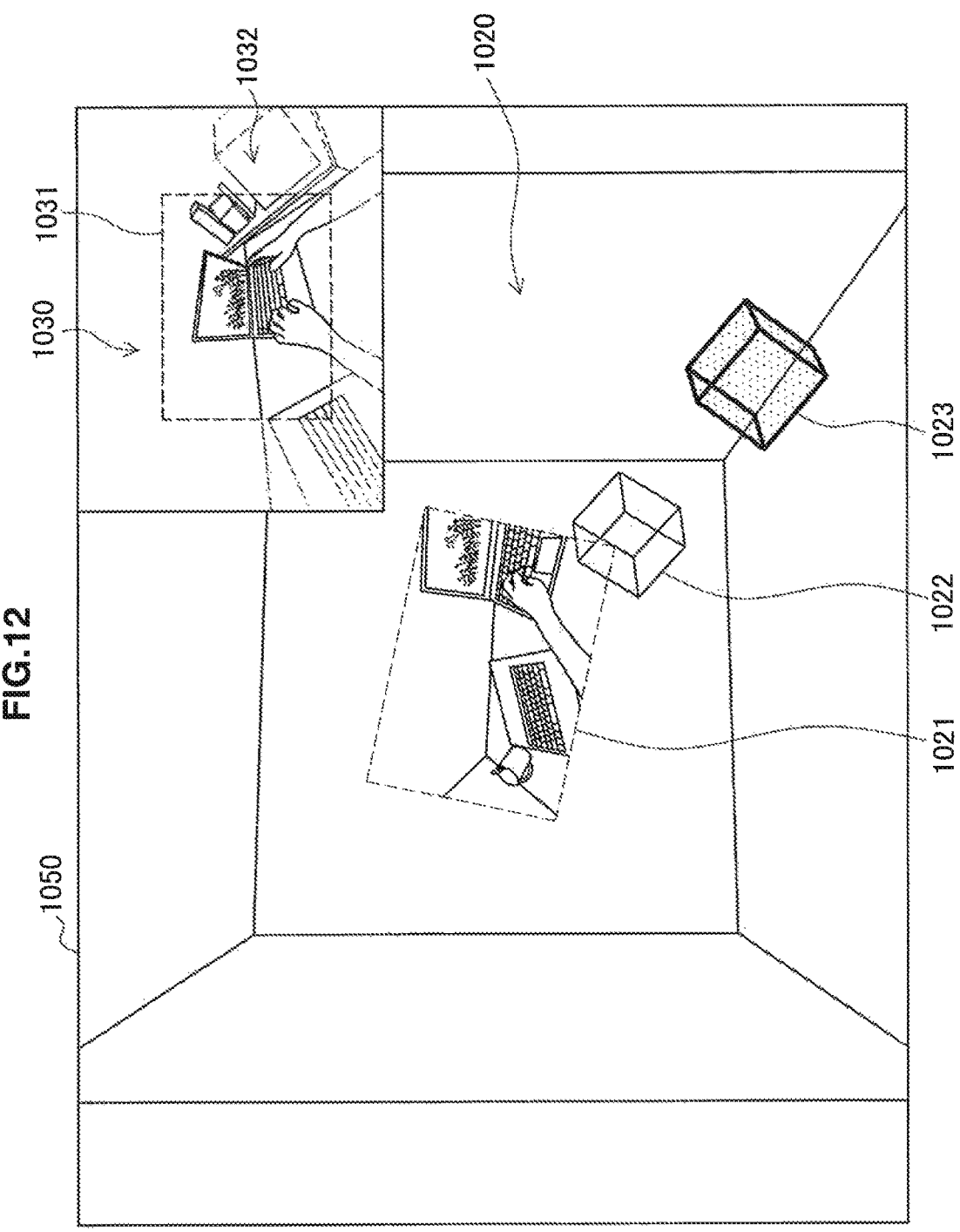
FIG. 12 is a diagram illustrating an example in which images of different viewpoints are simultaneously displayed according to the embodiment of the present disclosure.

FIGS. 11 and 12 are diagrams illustrating an example in which images of different viewpoints are simultaneously displayed according to the embodiment of the present disclosure. In an image 1040 exemplified in FIG. 11, the 3rd-person image 1020 and the 1st-person image 1010 are simultaneously displayed. At this time, in the 3rd-person image 1020, for example, the viewpoint object 1022 of the 1st-person image may be displayed with emphasis. In the illustrated example, the 1st-person image 1010 is displayed as a sub-screen of the screen of the 3rd-person image 1020. However, the 3rd-person image 1020 may conversely be displayed as a sub-screen of the screen of the 1st-person image 1010.

In an image 1050 exemplified in FIG. 12, the 3rd-person image 1020 and the 1.3rd-person image 1030 are simultaneously displayed. At this time, in the 3rd-person image 1020, for example, the viewpoint object 1023 of the 1.3rd-person image may be displayed with emphasis. In the illustrated example, the 1.3rd-person image 1030 is displayed as a sub-screen of the screen of the 3rd-person image 1020. However, the 3rd-person image 1020 may conversely be displayed as a sub-screen of the screen of the 1.3rd-person image 1030.

Thus, by simultaneously displaying the images of different viewpoints and supplying the images of the different viewpoints to the user of the reception side device (in the foregoing example, the tablet terminal 300), for example, it is easy to identify a viewpoint of the image that provides the sharing experience desired by the user.

(4. Display Annotation in Real Space)

Next, display of an annotation in the real space according to the embodiment of the present disclosure will be described with reference to FIGS. 13 to 20. In the embodiment, as described above, space information is added to image data of the real space transmitted from the transmission side device. The space information is, for example, information indicating a position and a posture of the imaging unit of the transmission side device in the real space. When this information is used, an annotation input with the reception side device can be displayed directly or indirectly in various forms in the real space in which the transmission side device is located.

In the following description, operations of the transmission side device, the reception device, and the server will be described using an example of a specific device. However, the same configuration can be realized by combining any device of the system 10 described above without relation to such an example.

(4-1. Display Example)

Figure 13:
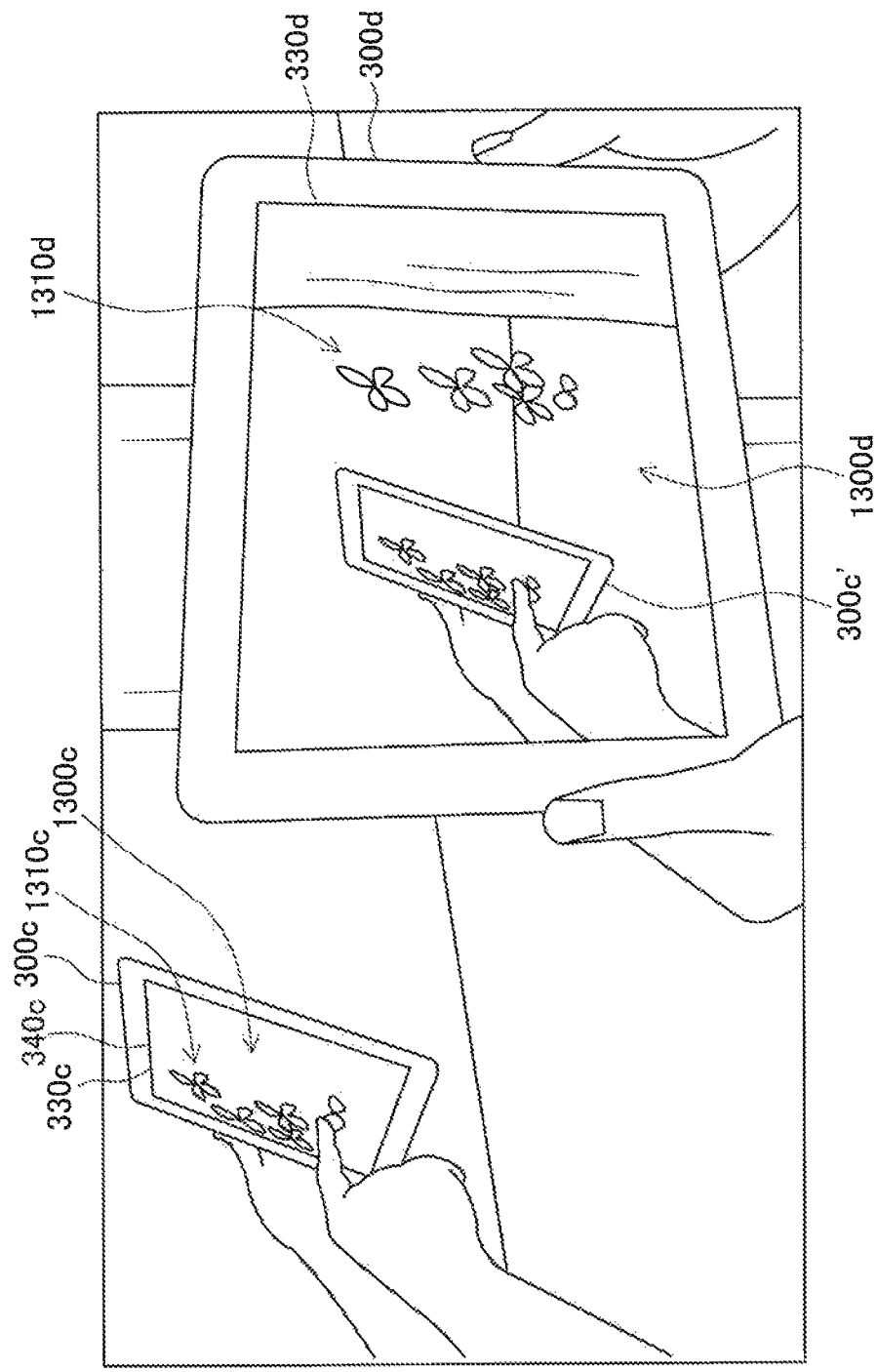
FIG. 13 is a diagram illustrating a first example of annotation indication according to the embodiment of the present disclosure.

FIG. 13 is a diagram illustrating a first example of annotation indication according to the embodiment of the present disclosure. In FIG. 13, tablet terminals 300c and 300d are illustrated. In the illustrated example, the tablet terminal 300c causes a camera (imaging unit) (not illustrated) to capture an image of a real space and displays the image as an image 1300c on a display 330c (display unit). A user of the tablet terminal 300c inputs an annotation 1310c for the image 1300c using a touch sensor 340 (manipulation unit) provided on the display 330c. Here, in the tablet terminal 300c, a position in the real space seen in the image 1300c is designated rather than a position in the image 1300c, and the annotation 1310c is input. The position in the real space can be designated based on the space information acquired along with the captured image by the tablet terminal 300c and can be expressed as, for example, a relative position using the imaging unit of the tablet terminal 300c as a criterion or as a position using feature points or the like in the space as a criterion.

On the other hand, an image of the real space is captured by the tablet terminal 300d or a camera (imaging unit) (not illustrated) and the image of the real space is displayed as an image 1300d on a display 330d (display unit). As illustrated, since the tablet terminals 300c and 300d are in the same space and the tablet terminal 300c is included in an angle of field of a camera of the tablet terminal 300d, a tablet terminal 300c' is pictured in the image 1300d. Further, information regarding the annotation 1310c for the image 1300c input to the tablet terminal 300c is transmitted to the tablet terminal 300d via the server 100 or inter-device communication, and thus is displayed as an annotation 1310d in the image 1300d.

Here, the annotation 1310d is displayed at a position in the real space designated in the tablet terminal 300c. This is expressed in such a manner that the annotation 1310d is displayed in the air distant from the tablet terminal 300c' in the image 1300d. The tablet terminal 300d can also acquire the space information along with the captured image and can specify the position of the tablet terminal 300c in the space or the positions of feature points or the like in the space in accordance with the acquired space information. Accordingly, the tablet terminal 300d can specify the position of the annotation 1310d in the space based on, for example, information indicating the position in the real space acquired from the tablet terminal 300c and the space information acquired by the tablet terminal 300d.

When the foregoing example corresponds to the system 10 described with reference to FIG. 1, the tablet terminal 300c functions as the devices (1) and (2) and the tablet terminal 300d functions as the device (3). As described above, information regarding the annotation 1310c input to the tablet terminal 300c may be transmitted to the tablet terminal 300d through inter-device communication. In this case, the foregoing example can be said to be a modification example of the system 10 in which each device performs communication without intervention of the server and image processing is performed using the space information in one device.

Figure 14:
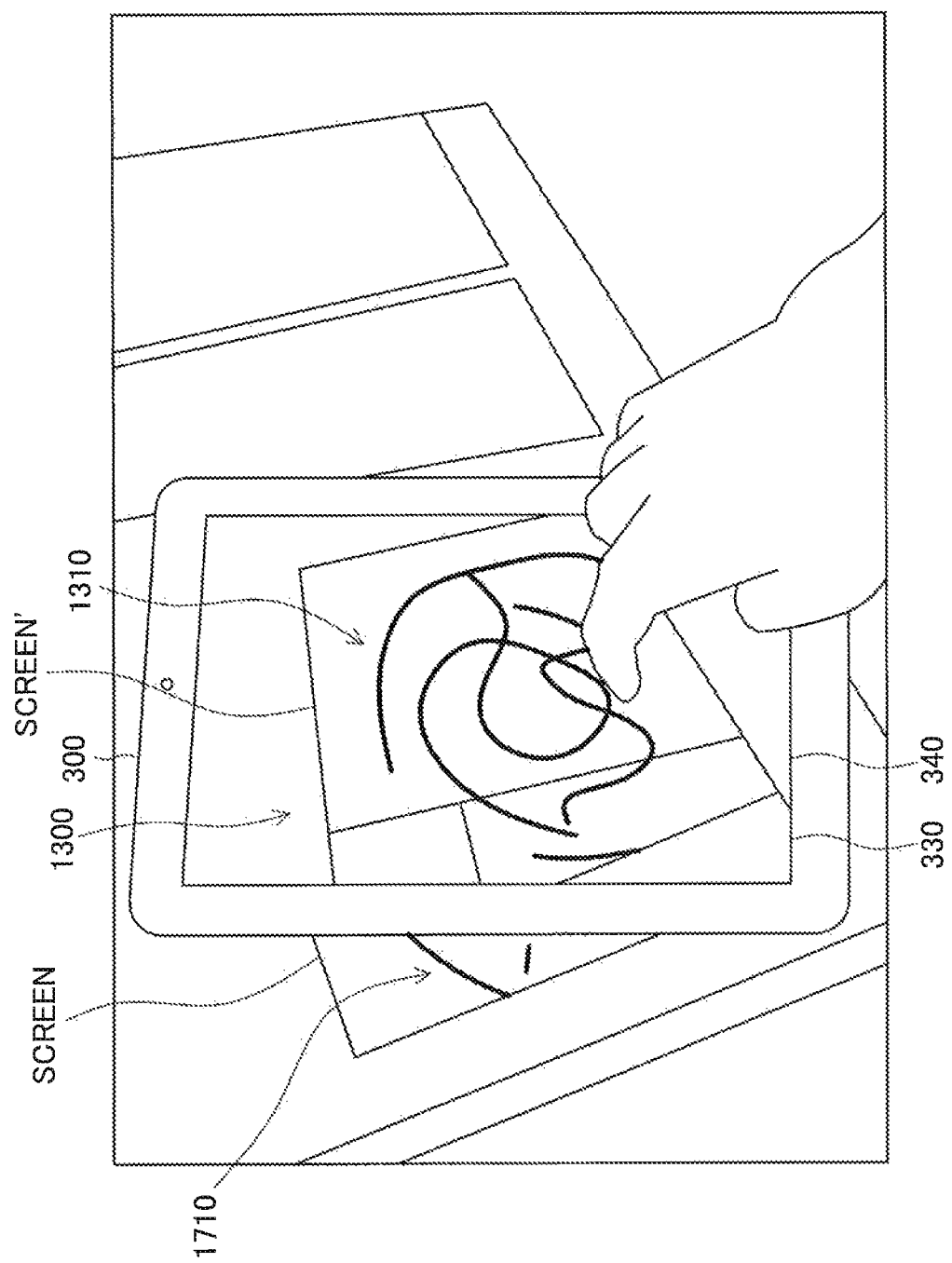
FIG. 14 is a diagram illustrating a second example of annotation indication according to the embodiment of the present disclosure.

FIG. 14 is a diagram illustrating a second example of the annotation indication according to the embodiment of the present disclosure. In FIG. 14, the tablet terminal 300 and a screen (SCREEN) on which an image is projected by a projector 700 (not illustrated) are illustrated. In the illustrated example, the tablet terminal 300 causes a camera (imaging unit) (not illustrated) to capture an image of a real space and displays the image of the real space as an image 1300 on the display 330 (display unit). As illustrated, since the screen is included in an angle of field of the camera of the tablet terminal 300, a screen (SCREEN') is pictured in the image 1300.

The user of the tablet terminal 300 inputs the annotation 1310 for the image 1300 using the touch sensor 340 (the manipulation unit) provided on the display 330. In the illustrated example, the annotation 1310 is a scribble drawn on the screen (SCREEN'). For example, the annotation 1310 is associated with a position on the screen (SCREEN) in the real space based on the space information acquired along with the captured image by the tablet terminal 300. Information regarding the annotation 1310 input to the tablet terminal 300 is transmitted along with positional information (indicating the position of the screen) of the real space to the projector 700 via the server 100 or through inter-device communication.

The projector 700 does not acquire the captured image, but acquires the space information like the tablet terminal 300, and thus recognizes the position of the screen (SCREEN) in the real space. Accordingly, the projector 700 can project an annotation 1710 (scribble) which is the same as the annotation input as the annotation 1310 in the tablet terminal 300 on the screen (SCREEN). In this case, the projector 700 can be said to display the annotation directly in the real space by projecting the annotation input for the image 1300 (virtual space) displayed on the display 330 with the tablet terminal 300 on the screen.

Figure 15:
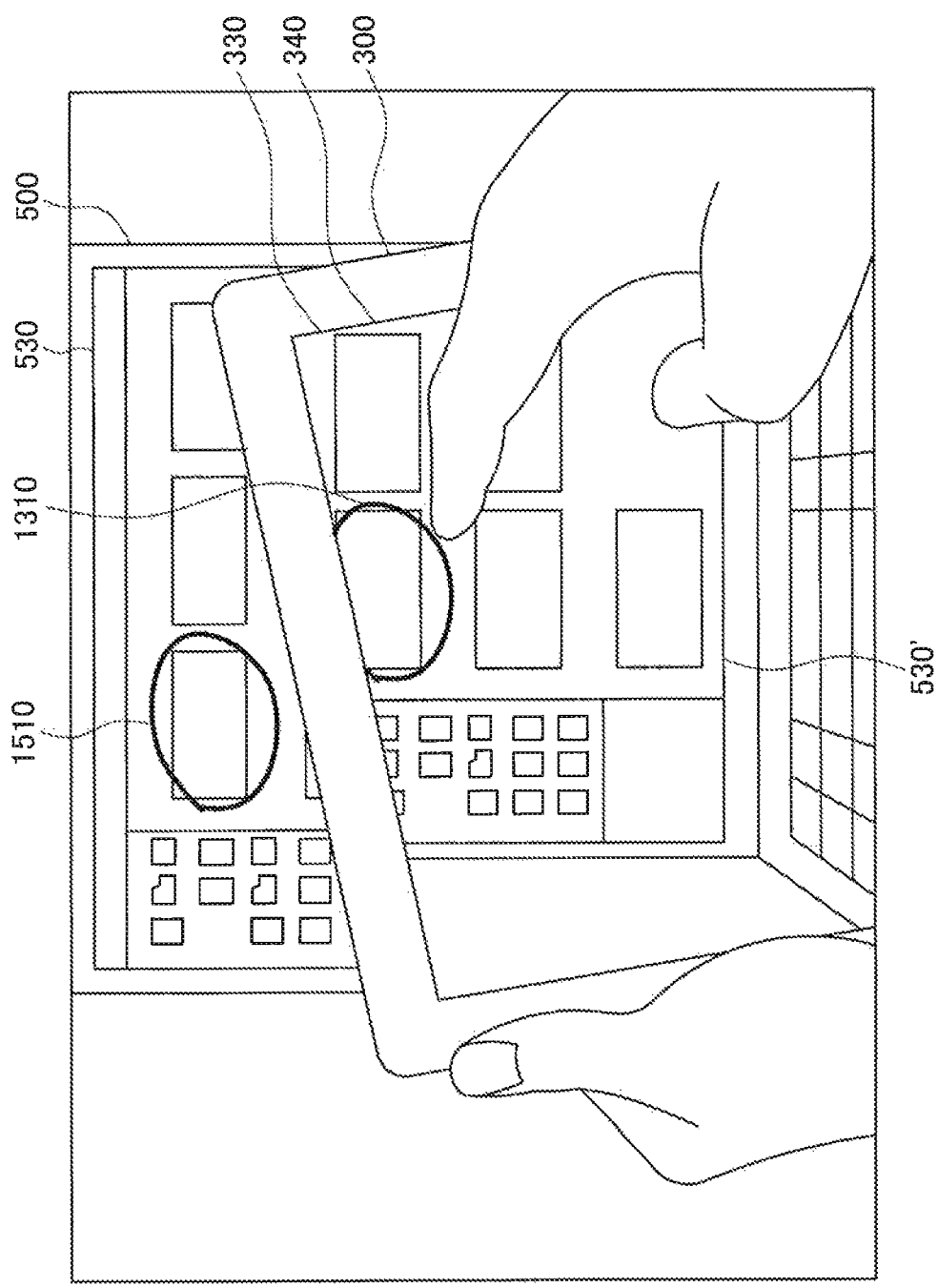
FIG. 15 is a diagram illustrating a third example of annotation indication according to the embodiment of the present disclosure.

FIG. 15 is a diagram illustrating a third example of the annotation indication according to the embodiment of the present disclosure. In FIG. 15, the tablet terminal 300 and a laptop PC 500 are illustrated. In the illustrated example, the tablet terminal 300 causes a camera (imaging unit) (not illustrated) to capture an image of a real space and displays the image of the real space as the image 1300 on the display 330 (display unit). As illustrated, since a display 530 (display unit) of the laptop PC 500 is included in an angle of field of the camera of the tablet terminal 300, a display 530' is pictured in the image 1300.

The user of the tablet terminal 300 inputs the annotation 1310 for the image 1300 using the touch sensor 340 (the manipulation unit) provided on the display 330. In the illustrated example, the annotation 1310 is a circle surrounding one of the thumbnail images of content displayed on the display 530'. For example, the annotation 1310 is associated with the position of the display 530 in the real space based on the space information acquired along with the captured image by the tablet terminal 300. Information regarding the annotation 1310 input to the tablet terminal 300 is transmitted along with positional information (indicating the position of the display 530) of the real space to the laptop PC 500 via the server 100 or through inter-device communication.

The laptop PC 500 does not acquire the captured image, but acquires the space information like the tablet terminal 300, and thus recognizes the position of the display 530 in the real space. Accordingly, the laptop PC 500 can display an annotation 1510 (the circle surrounding one of the thumbnail images) which corresponds to the annotation 1310 input to the tablet terminal 300 and is the same as the annotation input as the annotation 1310 on the display 530. In this case, the laptop PC 500 can be said to display the annotation directly in the real space by displaying the annotation input for the image 1300 (virtual space) displayed on the display 330 with the tablet terminal 300 on the display 530 configuring a part of the real space.

Figure 16:
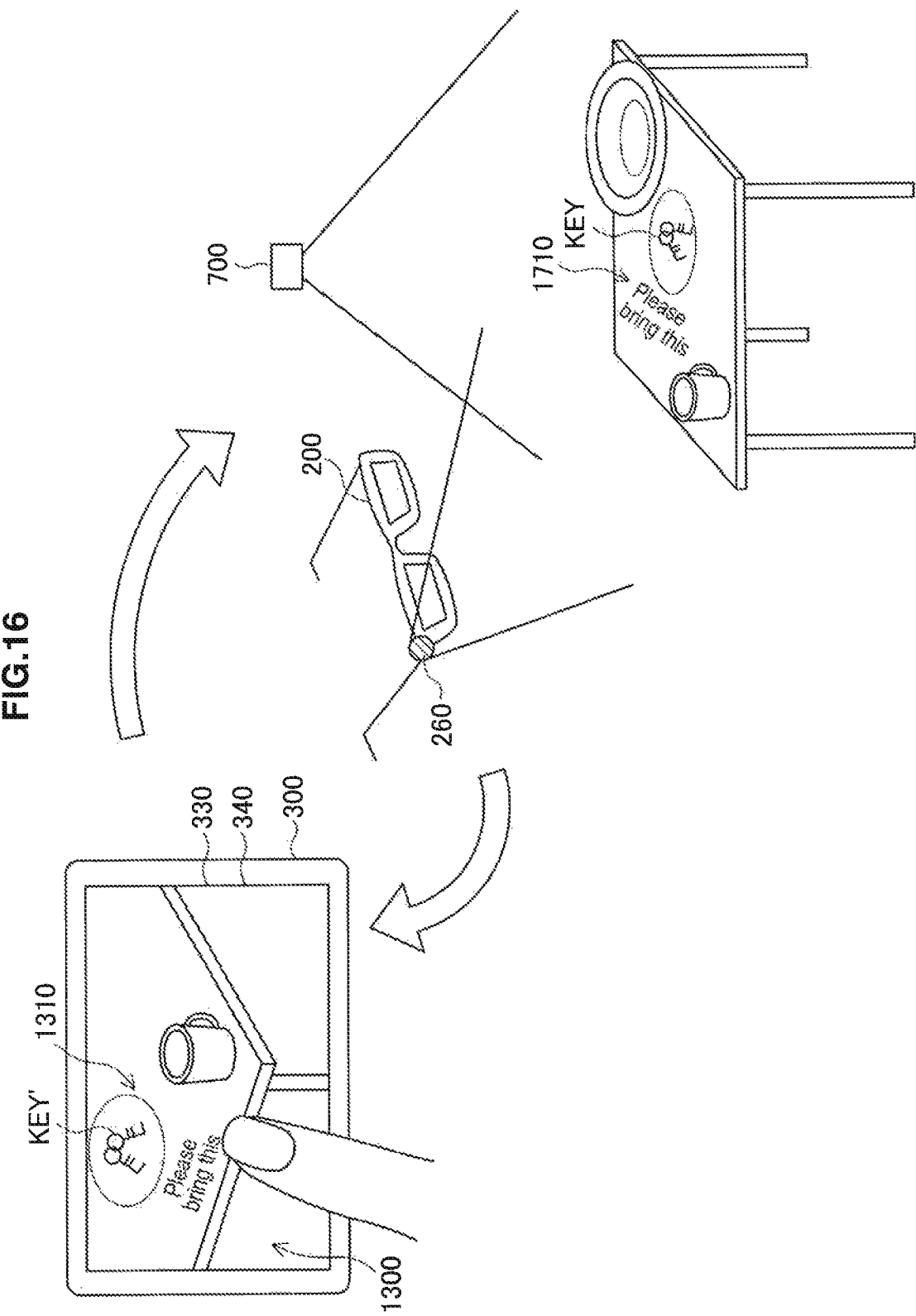
FIG. 16 is a diagram illustrating a fourth example of annotation indication according to the embodiment of the present disclosure.

FIG. 16 is a diagram illustrating a fourth example of the annotation indication according to the embodiment of the present disclosure. In FIG. 16, the wearable terminal 200, the tablet terminal 300, and the projector 700 are illustrated. In the illustrated example, the wearable terminal 200 causes the camera 260 (the imaging unit) to capture an image of a real space and acquires the space information, and then transmits data of the captured image along with the space information to the tablet terminal 300 via the server 100. Here, for example, the tablet terminal 300 may be in a different place from the wearable terminal 200 and the projector 700.

The tablet terminal 300 causes the display 330 (the display unit) to display the received image as the image 1300. As illustrated, a table, a cup on the table, a dish, and key (KEY) in the same space as the wearable terminal 200 are included in the image 1300. The user of the tablet terminal 300 inputs the annotation 1310 for the image 1300 using the touch sensor 340 (the manipulation unit) provided on the display 330. In the illustrated example, the annotation 1310 includes a circle surrounding the key (KEY') and a message "Please bring this." The annotation 1310 is associated with the position of the key (KEY) in the real space based on the space information received along with the image from the wearable terminal 200. Information regarding the annotation 1310 input to the tablet terminal 300 is transmitted along with positional information (indicating, for example, the position of the key (KEY)) of the real space to the projector 700 via the server 100.

The projector 700 does not acquire the captured image, but acquires the space information like the wearable terminal 200, and thus recognizes the position of a surface (for example, the surface of the table in the illustrated example) on which the image is projected in the real space. Accordingly, the projector 700 can project the annotation 1710 (the circle and the message) which is the same as the annotation input as the annotation 1310 in the tablet terminal 300 to the periphery of the key (KEY) on the table. Thus, the user of the wearable terminal 200 can directly view the annotation 1710 projected on the surface of the table. Accordingly, in this case, the wearable terminal 200 may not include a display unit such as a display.

In the foregoing example, the annotation input to the tablet terminal 300 can be displayed in the real space by the projector 700 which is a different device from the device capturing the image, using the positional information of the real space specified based on the space information to which the image of the real space captured by the wearable terminal 200 is added as a criterion. In such a configuration, for example, the wearable terminal 200 may not necessarily include a display unit such as a display, and thus it is possible to improve the degree of freedom of a device configuration when interaction between the users using an AR technology is practiced.

Figure 17:
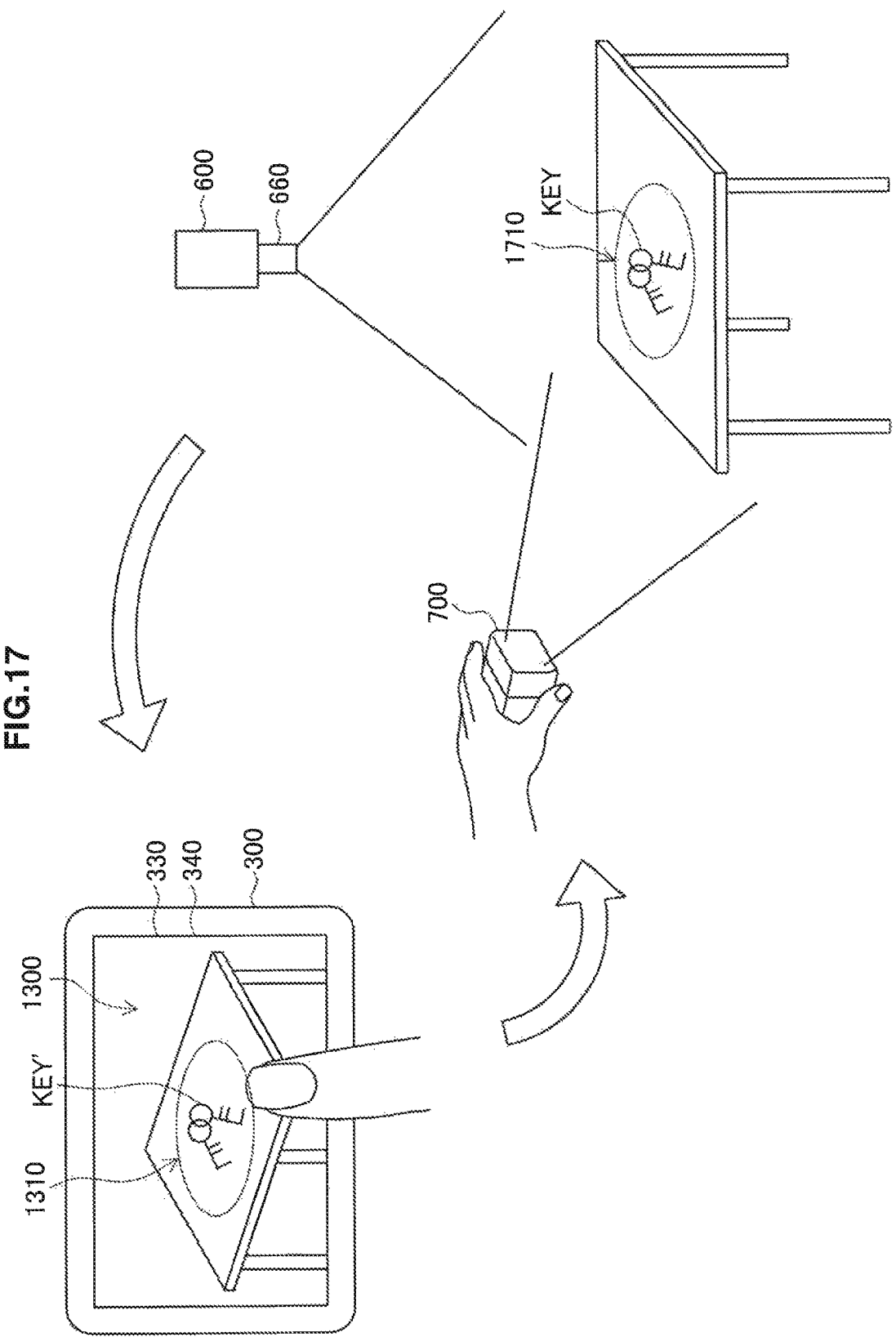
FIG. 17 is a diagram illustrating a fifth example of annotation indication according to the embodiment of the present disclosure.

FIG. 17 is a diagram illustrating a fifth example of the annotation indication according to the embodiment of the present disclosure. In FIG. 17, the fixed camera 600, the tablet terminal 300, and the projector 700 are illustrated. The projector 700 can be a handheld type unlike the fixed projector described in the above examples. In the illustrated example, the fixed camera 600 causes the camera 660 (the imaging unit) to capture an image of a real space and acquires the space information, and then transmits data of the captured image along with the space information to the tablet terminal 300 via the server 100. Here, for example, the tablet terminal 300 may be in a different place from the fixed camera 600 and the projector 700.

Since the fixed camera 600 does not move, the space information in the fixed camera 600 may be acquired by a different method from, for example, the foregoing case of the wearable terminal 200. For example, the space information in the fixed camera 600 may be fixed information set by measuring a surrounding environment at the time of installation or the like. In this case, the fixed camera 600 may have the space information stored in a memory or may not include a sensor or the like acquiring the space information. The space information can also be acquired in another fixed device.

The tablet terminal 300 causes the display 330 (the display unit) to display the received image as the image 1300. As illustrated, a table and key (KEY') on the table below the fixed camera 600 are included in the image 1300. The user of the tablet terminal 300 inputs the annotation 1310 for the image 1300 using the touch sensor 340 (the manipulation unit) provided on the display 330. In the illustrated example, the annotation 1310 includes a circle surrounding the key (KEY'). The annotation 1310 is associated with the position of the key (KEY) in the real space based on the space information received along with the image from the fixed camera 600. Information regarding the annotation 1310 input to the tablet terminal 300 is transmitted along with positional information (indicating, for example, the position of the key (KEY)) of the real space to the projector 700 via the server 100.

The projector 700 does not acquire the captured image (may acquire the captured image), but acquires the space information, and thus recognizes the position of a surface (for example, the surface of the table in the illustrated example) on which the image is projected in the real space. Accordingly, the projector 700 can project the annotation 1710 (the circle) which is the same as the annotation input as the annotation 1310 in the tablet terminal 310 to the periphery of the key (KEY) on the table. The projector 700 is a handheld type, and thus can be carried by the user and easily moved. Accordingly, for example, the method of acquiring the space information in the projector 700 can be the same as that of a portable terminal such as the wearable terminal 200.

In the foregoing example, the annotation input to the tablet terminal 300 is displayed directly in the real space by the projector 700 which is a different device from the device capturing the image, using the positional information of the real space specified based on the space information to which the image of the real space captured by the fixed camera 600 is added as a criterion. In this example, the projector 700 is a handheld type, and thus can be carried by the user so that an image can be projected to any position in the real space. Therefore, for example, by causing the projector 700 to project the image to various places in the real spaces as if the user were searching in the dark using a flashlight or the like, the user can search for an object or a position instructed by the annotation input by the user of the tablet terminal 300. In this case, the user may not necessarily wear the same device as the wearable terminal 200 and it is possible for the users to interact more freely using an AR technology.

Figure 18:
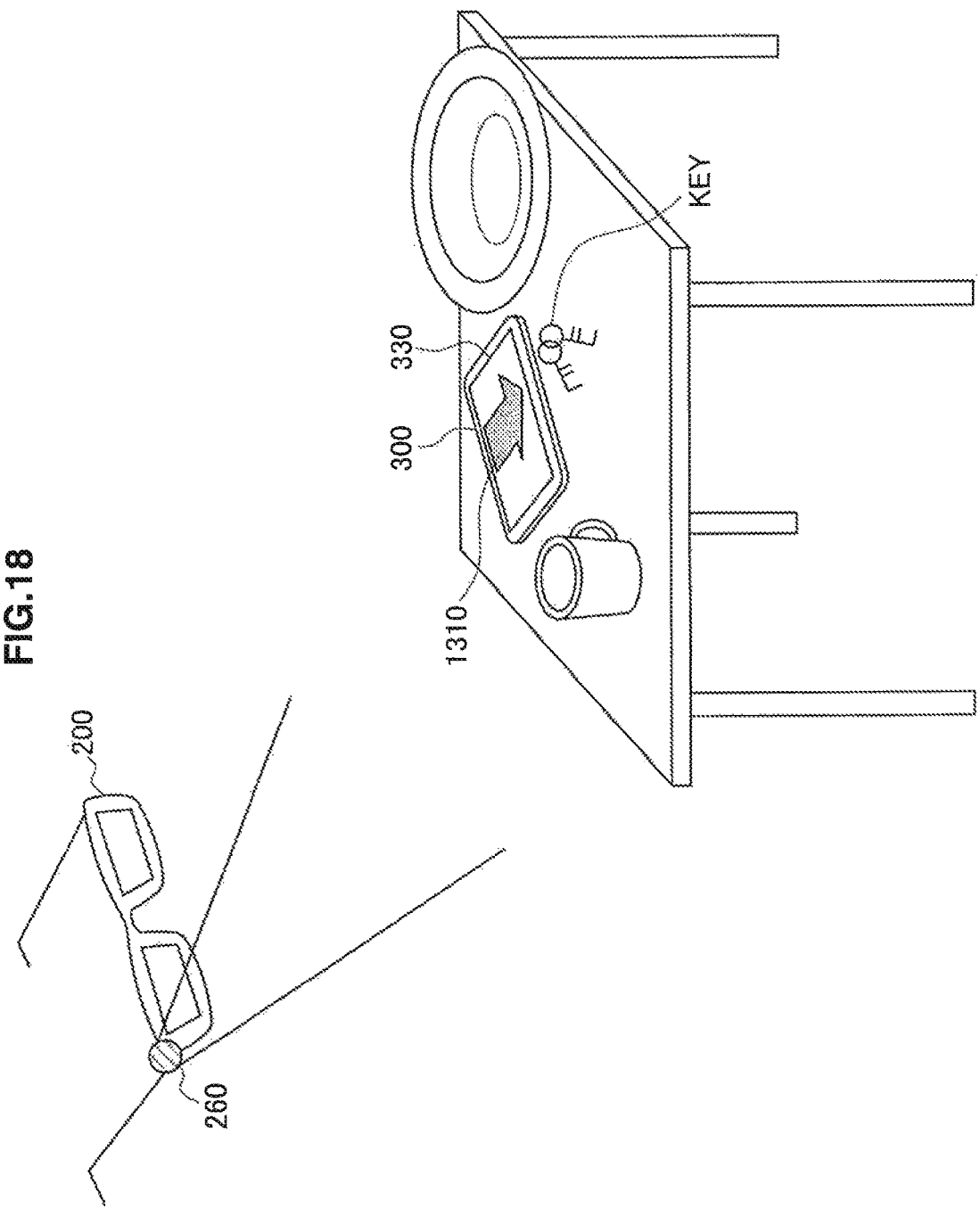
FIG. 18 is a diagram illustrating a sixth example of annotation indication according to the embodiment of the present disclosure.

FIG. 18 is a diagram illustrating a sixth example of the annotation indication according to the embodiment of the present disclosure. The example of FIG. 18 can be said to be a modification example of the example described above with reference to FIG. 16. In the drawing, the wearable terminal 200 and the tablet terminal 300 are illustrated. In the illustrated example, the wearable terminal 200 causes the camera 260 (the imaging unit) to capture an image of a real space, acquires the space information, and then transmits data of the captured image along with the space information to a device in a different place from the wearable terminal 200 and the tablet terminal 300 via the server 100. In the drawing, the device at the transmission destination is not illustrated.

The tablet terminal 300 receives information regarding an annotation input to the device at the transmission destination from the server 100. The tablet terminal 300 is put on a table in the same space as the wearable terminal 200. The tablet terminal 300 does not acquire the captured image (may include an imaging unit), but acquires the space information like the wearable terminal 200, and thus recognizes the position of the display 330 in the real space. In the illustrated example, an arrow 1310 indicating a nearby key (KEY) is displayed on the display 330 of the tablet terminal 300 put on the table. This arrow can be an indication corresponding to the annotation input for the key displayed in the image in the device at the transmission destination.

(4-2. Annotation Arrangement)

Figure 19:
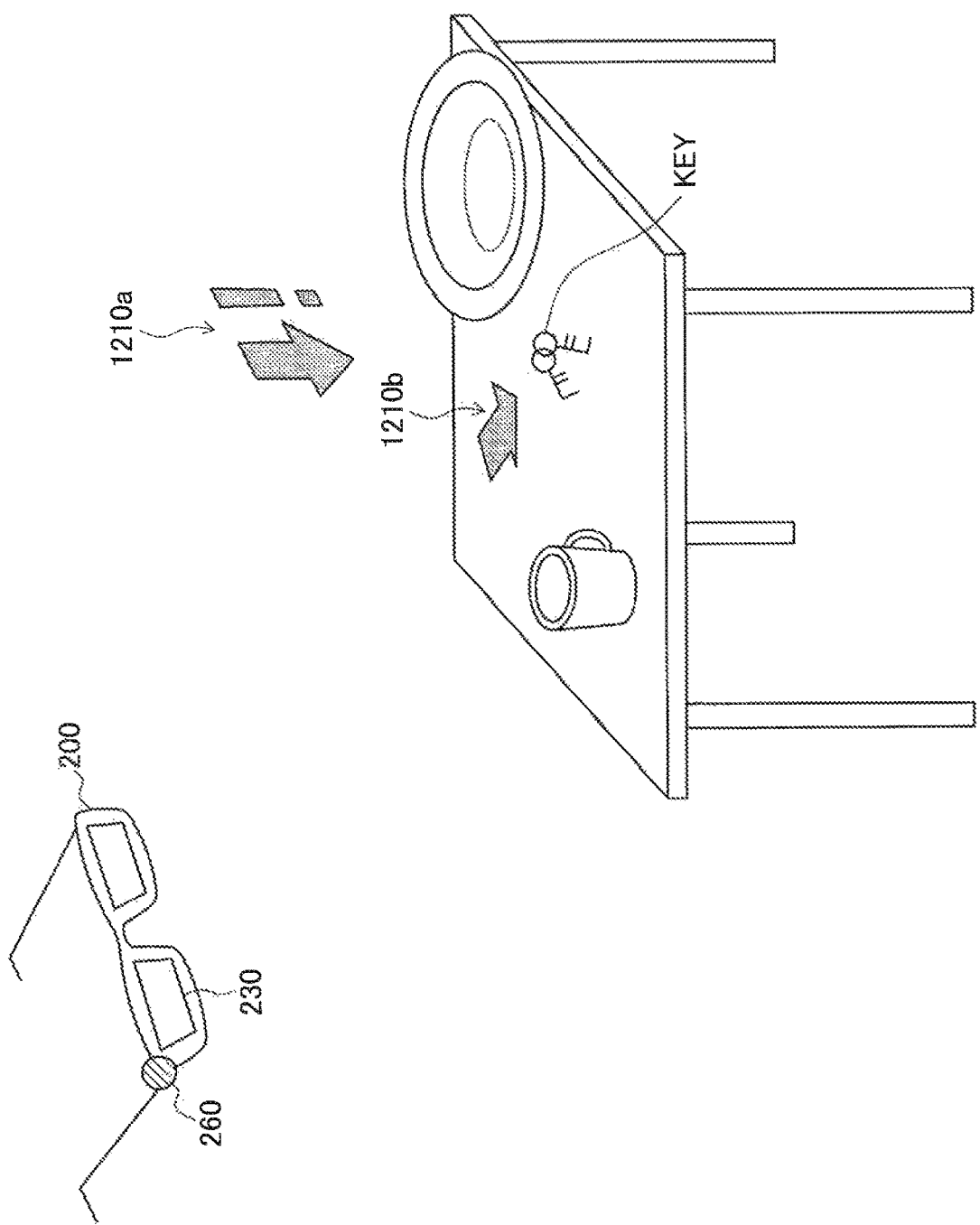
FIG. 19 is a diagram for describing annotation arrangement according to the embodiment of the present disclosure.

FIG. 19 is a diagram for describing annotation arrangement according to the embodiment of the present disclosure. The wearable terminal 200 illustrated in FIG. 19 transmits the image of the real space captured by the camera 260 (the imaging unit) along with the space information. The wearable terminal 200 receives the information regarding the annotation input for the transmitted image with another device along with the positional information of the real space and displays an annotation 1210 so that the annotation 1210 is superimposed on an image of the real space transmitted through the display 230 (the display unit) and viewed based on the received information. The annotation 1210 is virtually displayed so that the annotation 1210 is superimposed on the image of the real space, and is consequently illustrated at a position recognized by the user of the wearable terminal 200. That is, the illustrated annotation 1210 is invisible except to the user of the wearable terminal 200.

The annotation 1210 is displayed so that the key (KEY) on the table is indicated. In the drawing, two examples are illustrated. The two examples mentioned herein are an annotation 1210a disposed in the space and an annotation 1210b disposed as an object.

In the illustrated example, the annotation 1210a is displayed in the space above the key (KEY). Since the space disposition of the annotation attracts the attention of the user viewing the image, the space disposition of the annotation is suitable for, for example, a case in which a direction is desired to be instructed by the annotation. For example, when a photographic angle or the like of a photo is desired to be expressed, a position at which the camera is disposed at the time of photographing of a photo is in midair in many cases (a camera is normally held by the user or installed on a tripod or the like). Therefore, the space disposition of the annotation can be useful. The space disposition of the annotation is possible not only, for example, when an annotation is displayed as an image on a display but also, for example, when an annotation is projected by a projector to be displayed as in the foregoing examples of FIGS. 16 and 17, for example, when the projector is a 3D projector.

On the other hand, the annotation 1210*b* is displayed near the key (KEY) on the table on which the key (KEY) is put. Such object disposition of the annotation is suitable for, for example, a case in which an object is desired to be instructed by the annotation since a relation with an object which is a target of the annotation is easily recognized. When the annotation is disposed as an object, feature points detected by an SLAM method or the like or 3-dimensional data of dense mapping can be used to specify the object which is a target. Alternatively, when individual objects are recognized by a known object recognition technology, an object which is a target among the objects may be specified. When the objects are recognized, for example, even when the object is moved independently from a space (for example, the object is moved by a hand of a user), the annotation can be disposed by tracking the object.

In a device receiving an annotation input (hereinafter, for example, the device is assumed to be the tablet terminal 300, but another device may be used), the space disposition or the object disposition of the annotation described above are selected according to a certain method. For example, the processor of the server 100 or the tablet terminal 300 may initially set the space disposition or the object disposition automatically according to a kind of annotation intended to be input by the user. As described above, when a direction is instructed or a photographic angle is displayed, the space disposition can be selected automatically. When the object is instructed, the object disposition can be selected automatically. The disposition of the annotation can be selected through a manipulation of the user on the manipulation unit of the device.

Figure 20:
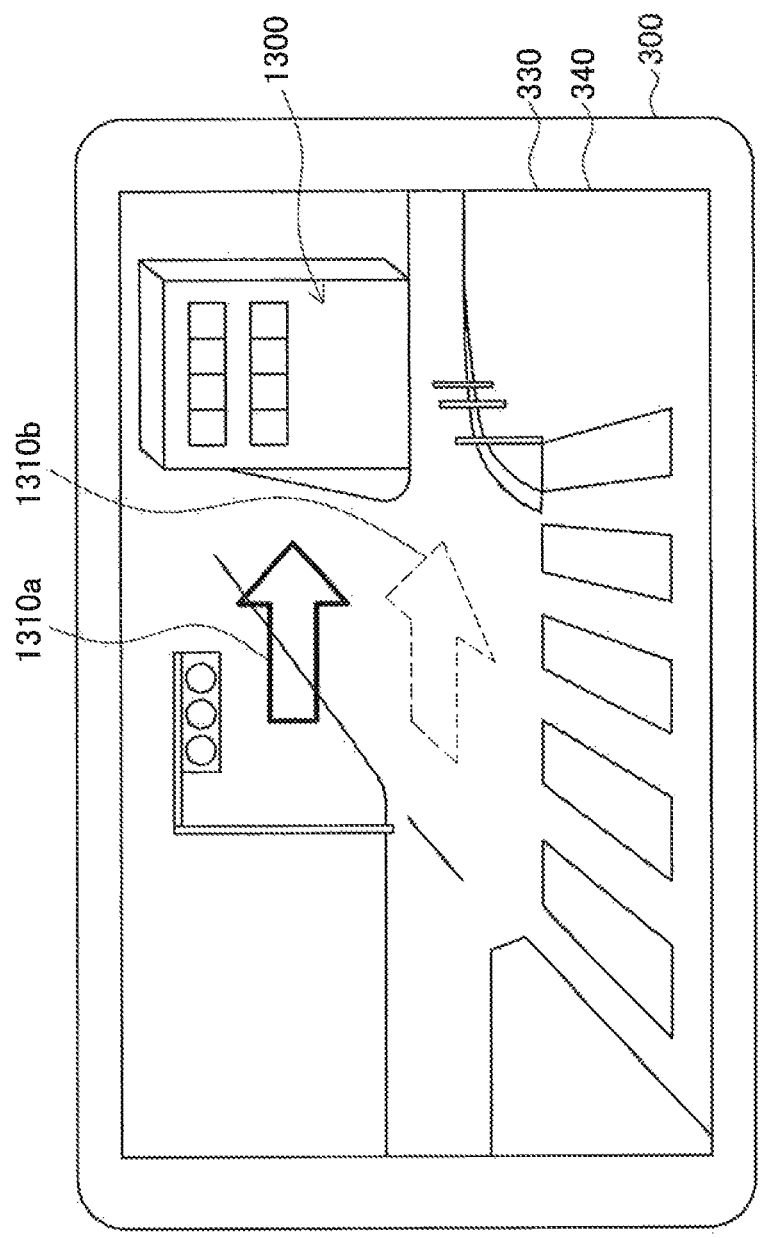
FIG. 20 is a diagram illustrating an example of selection of the annotation arrangement according to the embodiment of the present disclosure.

For example, when the annotation 1310 is input using the touch sensor 340 in regard to the image 1300 displayed on the display 330 of the tablet terminal 300 as in the example illustrated in FIG. 20, both of the annotation 1310*a* disposed in the space and the annotation 1310*b* disposed as the object may be displayed and a Graphic User Interface (GUI) used to select one annotation through a touch manipulation of the user may be supplied.

For example, when the disposition of the annotation 1310 is changed using such a GUI, it is difficult to identify whether the annotation 1310 is displayed in midair in the space disposition or the surface of a rear object is displayed in the object disposition in some cases. For such cases, for example, the annotation 1310*a* disposed in the space may be configured such that the fact that the annotation is disposed in midair is easily identified by displaying a shadow with the upper side of the real space pictured in the image 1300 set as a light source. As the same display, a perpendicular line from the annotation 1310 disposed in the space to the surface of the object below the annotation 1310 may be displayed. A grid may be displayed in a depth direction of the image 1300 so that the position of the annotation 1310 in the depth direction is easy to recognize. When the position of the annotation 1310 in the depth direction is adjusted, pinch-in/out using the touch sensor 340 or a separately provided forward/backward movement button may be used. A sensor of the tablet terminal 300 may detect a motion of the tablet terminal 300 moving forward/backward from the user and the processor may reflect the motion to the position of the annotation 1310 in the depth direction.

(5. Annotation Indication Outside of Visible Range)

Next, display of an annotation outside of the visible range according to the embodiment of the present disclosure will be described with reference to FIGS. 21 to 32. In the embodiment, as described above, the space information is added to the image data of the real space transmitted in the transmission side device. When the space information is used, an annotation can be input at any position of the real space in the reception side device irrespective of the display range of an image displayed with the transmission side device.

For example, in the example of FIGS. 3A and 3B described above, the display range of the image 1300 captured by the camera 260 (the imaging unit) and displayed in the tablet terminal 300 (the reception side device) is broader than the display range of the image 1200 displayed on the display 230 (the display unit) with the wearable terminal 200 (the transmission side device). In this case, in the tablet terminal 300, the annotations 1310 and 1320 can be input even at positions of the real space not currently included in the display range of the image 1200 displayed with the wearable terminal 200. The annotations can be maintained with the tablet terminal 300, the server 100, or the wearable terminal 200 in association with the positional information in the real space defined based on the space information acquired with the wearable terminal 200 and can be displayed as the annotations 1210 and 1220 in the image 1200 when the camera 260 is subsequently moved along with the wearable terminal 200 and the positions of the annotations are located within the display range of the image 1200.

For example, in the examples of FIGS. 7 to 10C described above, an image of a range beyond the 3rd-person image 1020 or the 1st-person image 1010 viewed as the 1.3rd-person image 1030 with the transmission side device can be displayed, and thus the user viewing this image with the reception side device can also input an annotation to the real space outside of the display range of the 1st-person image 1010. Even in this case, the input annotation can be maintained in association with the positional information of the real space defined based on the space information acquired with the transmission side device and can be displayed when the display range of the 1st-person image 1010 is subsequently moved and includes the position of the annotation.

In the foregoing case, for example, when the user of the transmission side device (hereinafter, for example, the transmission side device is assumed to be the wearable terminal 200) is not aware of the presence of the annotation, there is a possibility of the annotation not being included in the display range of the image 1200 and a time passing. In the interaction between the users using an AR technology, the user of the reception side device (hereinafter, for example, the reception side device is assumed to be the tablet terminal 300) is considered to input many annotations in order to convey something to the user of the wearable terminal 200. Therefore, it is preferable to inform the user of the wearable terminal 200 of the presence of the annotations.

Accordingly, in the embodiment, as will be described in the following examples, information regarding an annotation outside of a visible range can be displayed. Display of such information is a kind of annotation. However, in the following description, what is input by the user of the reception side device is particularly referred to as an annotation for discrimination. Display control for such display may be performed by, for example, a processor of a device (for example, the wearable terminal 200 or the tablet terminal 300) displaying an annotation or may be performed by the processor of the server 100 recognizing a portion outside of a visible range in such a device. The following examples can be broadly applied, for example, when there is a possibility of an annotation being input to a portion outside of a visible range of an image of a real space independently from the above-described various examples.

First Example

Figure 21:
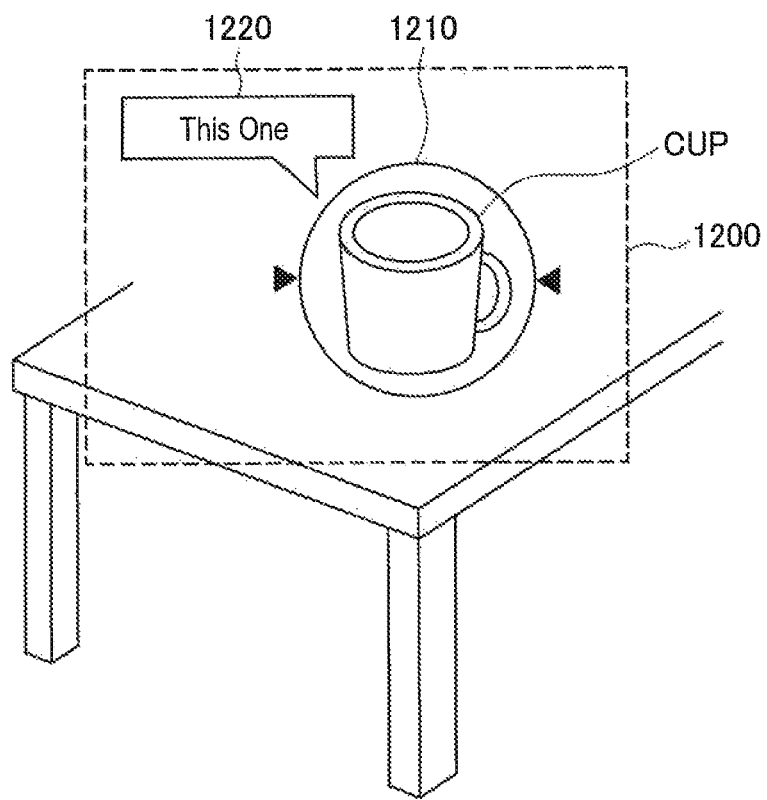
FIG. 21 is a diagram illustrating a first example of display of an annotation outside of a visible range according to the embodiment of the present disclosure.
Figure 22:
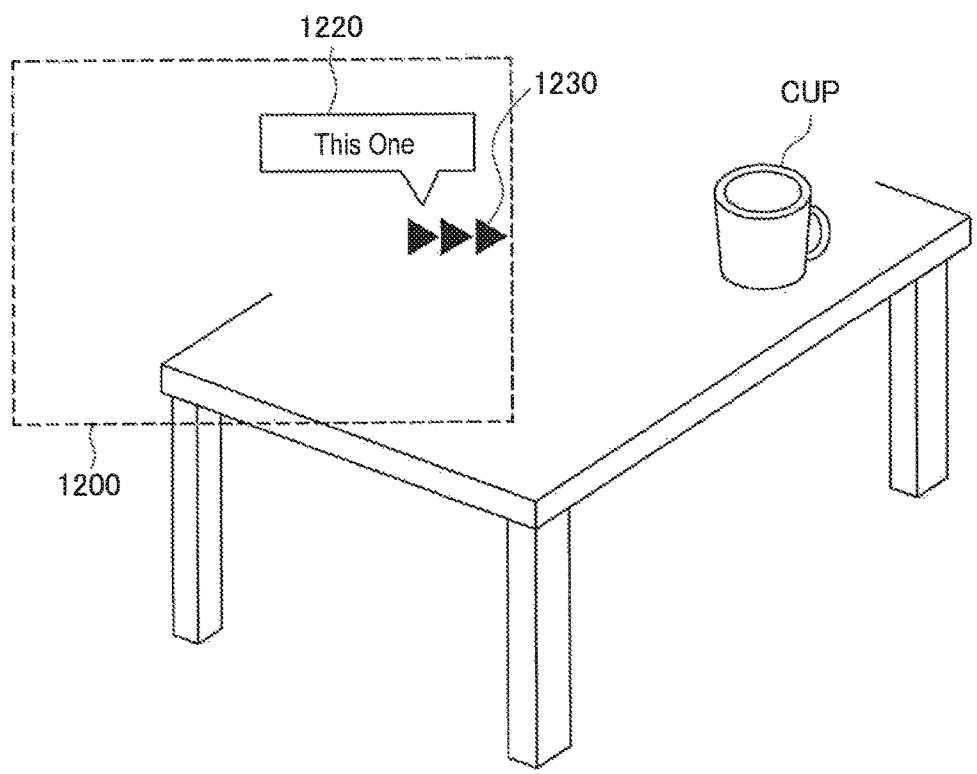
FIG. 22 is a diagram illustrating a first example of display of an annotation outside of a visible range according to the embodiment of the present disclosure.
Figure 23:
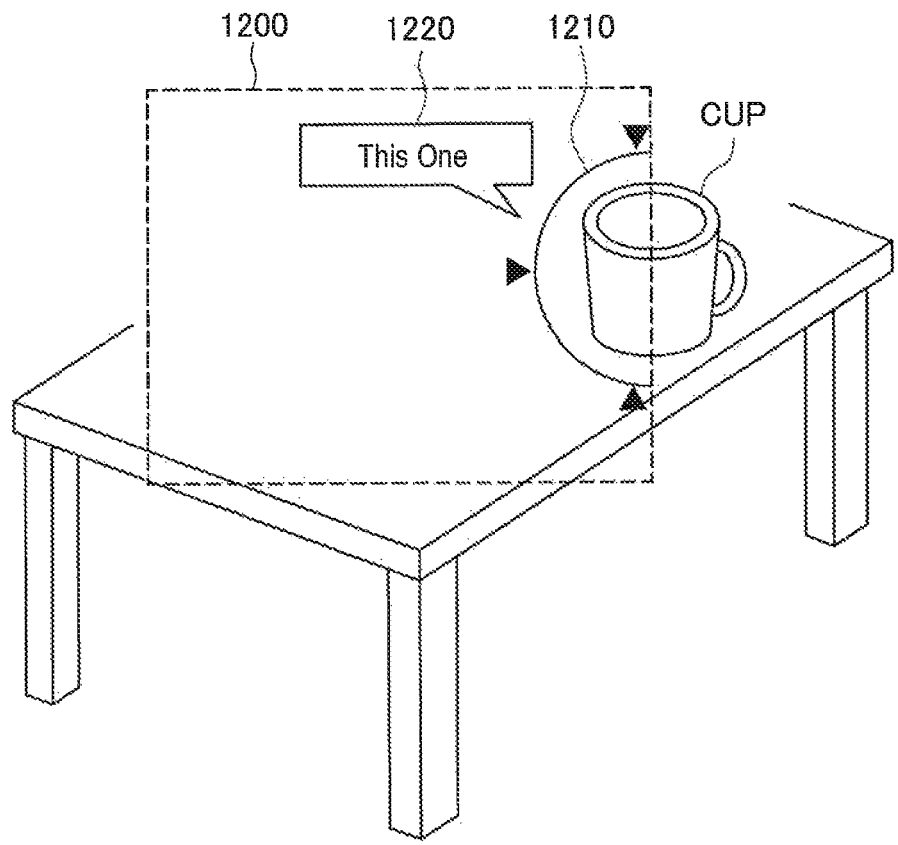
FIG. 23 is a diagram illustrating a first example of display of an annotation outside of a visible range according to the embodiment of the present disclosure.

FIGS. 21 to 23 are diagrams illustrating a first example of display of an annotation outside of a visible range according to the embodiment of the present disclosure.

In FIG. 21, a display example in which an annotation is within the image 1200 (the visible range) is illustrated. In this case, the annotation is displayed for a target cup (CUP) put on a table and includes a pointer 1210 and a comment 1220.

In FIG. 22, a display example in which the cup (CUP) which is a target of an annotation is outside of the image 1200 is illustrated. In this case, a direction indication 1230 denoting a direction toward a target of an annotation can be displayed instead of the annotation illustrated in FIG. 21. For example, the direction indication 1230 can be displayed by specifying a positional relation between the display range of the image 1200 and the target of the annotation based on the space information acquired by the wearable terminal 200. At this time, the comment 1220 in the annotation may be displayed along with the direction indication 1230. Since the comment 1220 is information indicating content, a kind, or the like of the annotation, it is useful to display the comment 1220 along with the direction indication 1230 rather than the pointer 1210.

In FIG. 23, a display example in which the display range of the image 1200 is moved when, for example, the user of the wearable terminal 200 changes the direction of the camera 260 according to the direction indication 1230, and a part of the cup (CUP) which is the target of the annotation is included in the image 1200 is illustrated. In this case, even when the entire target is not included in the image 1200, a part of the pointer 1210 and the comment 1220 may be displayed as annotations.

Second Example

Figure 24:
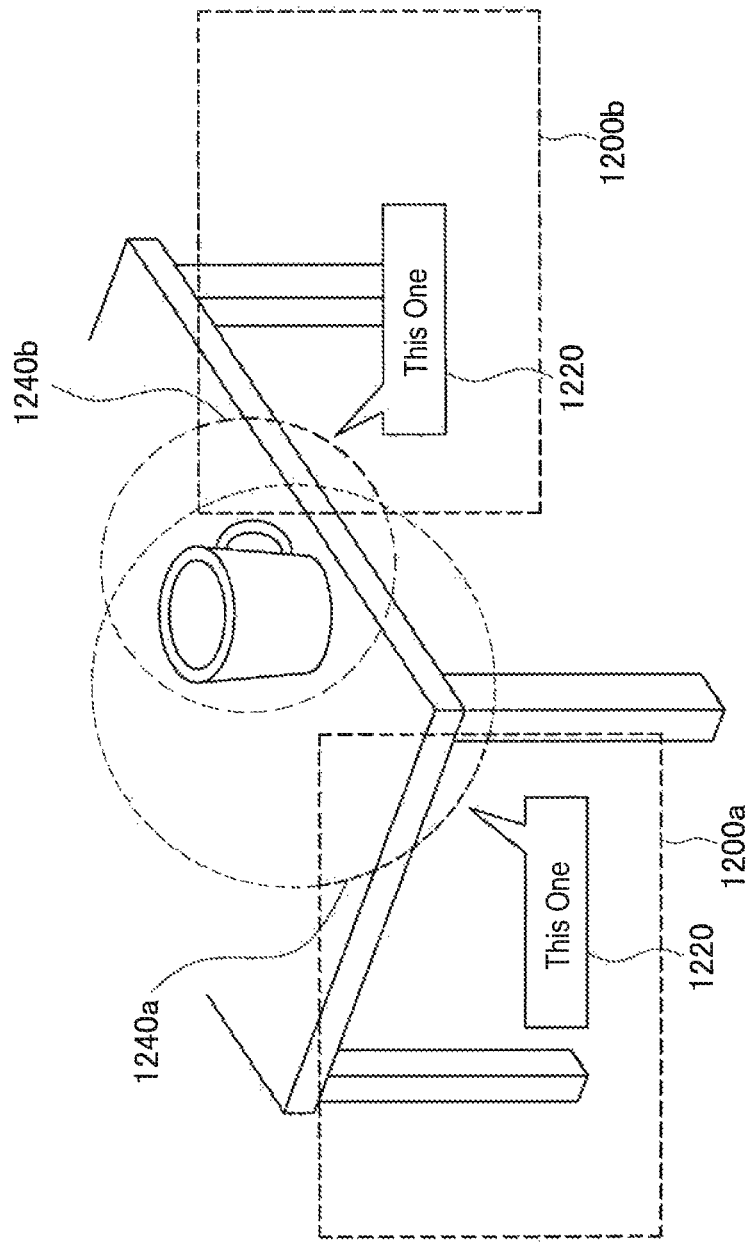
FIG. 24 is a diagram illustrating a second example of display of an annotation outside of a visible range according to the embodiment of the present disclosure.
Figure 25:
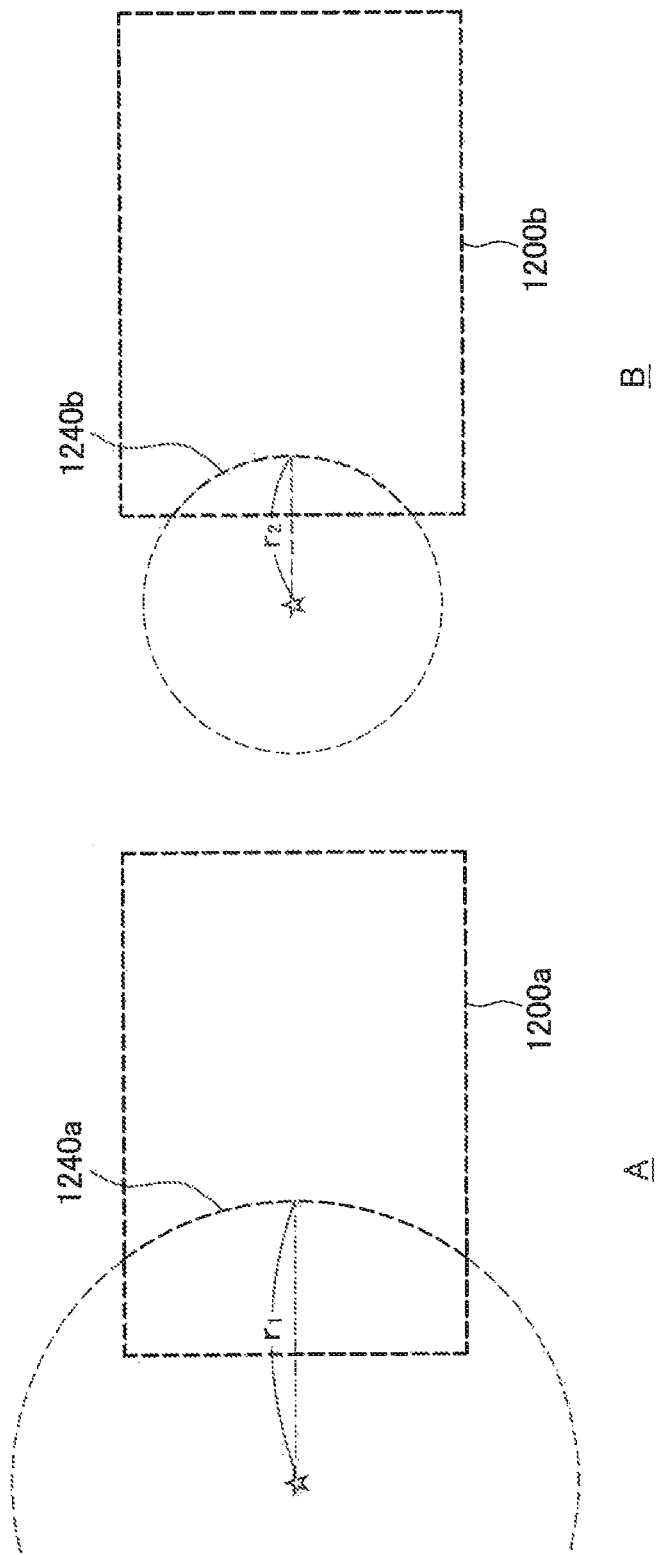
FIG. 25 is a diagram illustrating a second example of display of an annotation outside of a visible range according to the embodiment of the present disclosure.

FIGS. 24 and 25 are diagrams illustrating a second example of the display of an annotation outside of a visible range according to the embodiment of the present disclosure. In the second example, a target of the annotation is outside of the visible range, and a distance up to the target of the annotation is displayed.

FIG. 24 is a diagram illustrating an example of display of two images of which distances from the visible range to the target of the annotation are different. In this example, the fact that the annotation is outside of the visible range is displayed by circles 1240. The circles 1240 are displayed with radii according to the distances from the target of the annotation to the visible range, as illustrated in FIG. 25. As illustrated in FIG. 25A, when the distance from the target of the annotation to the visible range (image 1200a) is large, a circle 1240a with a larger radius r1 is displayed. As illustrated in FIG. 25B, when the distance from the target of the annotation to the visible range (image 1200b) is small, a circle 1240b with a smaller radius r2 is displayed. The radius r of the circle 1240 may be set continuously according to the distance to the target of the annotation or may be set step by step. As illustrated in FIG. 24, the comments 1220 in the annotations may be displayed along with the circle 1240.

Thus, when the circles 1240 are displayed, for example, the user viewing the image 1200 can intuitively comprehend not only that the annotation is outside of the visible range but also whether the annotation can be viewed when the display range of the image 1200 is moved in a certain direction to a certain extent.

Third Example

Figure 26:
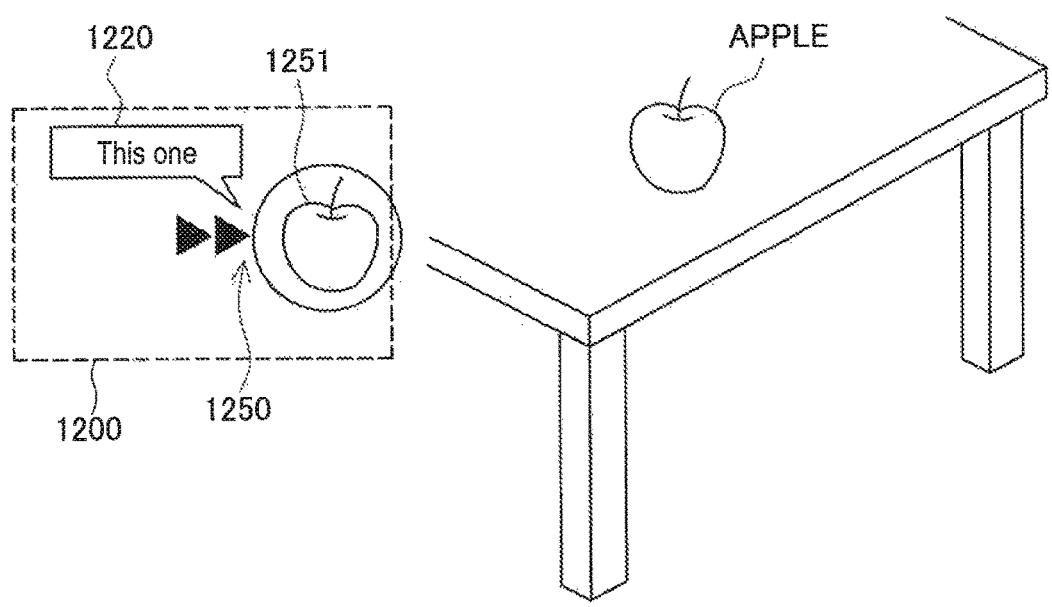
FIG. 26 is a diagram illustrating a third example of display of an annotation outside of a visible range according to the embodiment of the present disclosure.
Figure 27:
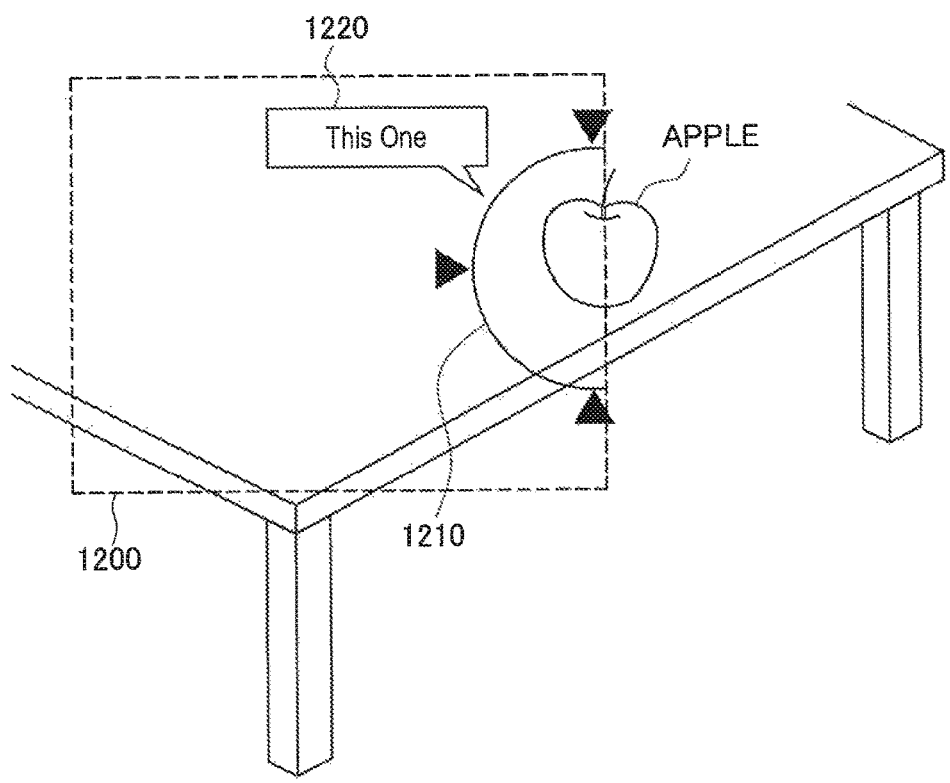
FIG. 27 is a diagram illustrating a third example of display of an annotation outside of a visible range according to the embodiment of the present disclosure.

FIGS. 26 and 27 are diagrams illustrating a third example of the display of an annotation outside of a visible range according to the embodiment of the present disclosure.

In FIG. 26, a display example in which an apple (APPLE) which is a target of the annotation is outside of the image 1200 is illustrated. In this case, an icon 1251 of a target can be displayed along with the same direction indication 1250 as that of the example of FIG. 22. For example, the icon 1251 can be generated by cutting the portion of the apple APPLE from an image captured by the camera 260 by the processor of the wearable terminal 200 or the server 100 when the apple (APPLE) is included in the image previously or currently captured by the camera 260. In this case, the icon 1251 may not necessarily be changed according to a change in a frame image acquired by the camera 260 and may be, for example, a still image. Alternatively, when the apple APPLE is recognized as an object, an illustration or a photo representing the apple may be displayed as the icon 1251 irrespective of the image captured by the camera 260. At this time, the comment 1220 in the annotations may be displayed along with the direction indication 1250 and the icon 1251.

In FIG. 27, a display example in which the display range of the image 1200 is moved when, for example, the user of the wearable terminal 200 changes the direction of the camera 260 according to the direction indication 1230, and a part of the apple (APPLE) which is the target of the annotation is included in the image 1200 is illustrated. In this case, the display of the direction indication 1250 and the icon 1251 may end and a part of the pointer 1210 and the comment 1220 may be displayed as annotations as in the example of FIG. 23.

Thus, when the icon 1251 is displayed, for example, the user viewing the image 1200 can comprehend not only that the annotation is outside of the visible range but also the target of the annotation, and thus can easily decide a behavior of viewing the annotation immediately or viewing the annotation later.

Fourth Example

Figure 28:
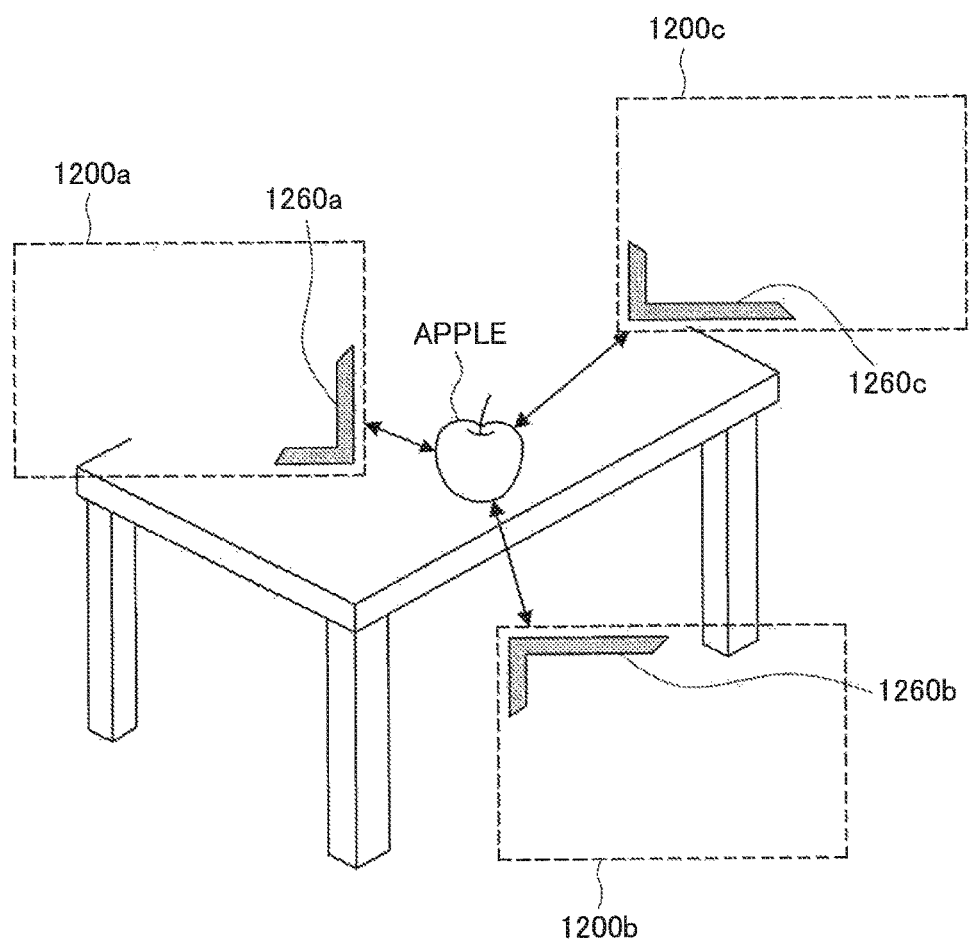
FIG. 28 is a diagram illustrating a fourth example of display of an annotation outside of a visible range according to the embodiment of the present disclosure.

FIG. 28 is a diagram illustrating a fourth example of display of an annotation outside of a visible range according to the embodiment of the present disclosure. In the illustrated example, when the apple (APPLE) which is a target of the annotation is outside of the image 1200, an end portion 1260 of the image 1200 closer to the apple shines. For example, since the apple is located to the lower right of a screen in an image 1200a, a lower right end portion 1260a shines. Since the apple is located to the upper left of the screen in an image 1200b, an upper left end portion 1260b shines. Since the apple is located to the lower left the screen in an image 1200c, a lower left end portion 1260c shines.

In the foregoing example, the region of the end portion 1260 can be set based on a direction toward the target of the annotation in a view from the image 1200. The example of the oblique directions is illustrated in the drawing. In another example, the left end portion 1260 may shine when the apple is to the left of the image 1200. In this case, the end portion 1260 may be the entire left side of the image 1200. When the target of the annotation is in an oblique direction and the end portion 1260 including a corner of the image 1200 shines, a ratio between the vertical portion and the horizontal portion of the corner of the end portion 1260 may be set according to an angle of the direction toward the target of the annotation. In this case, for example, when the target is to the upper left but further up, the horizontal portion (extending along the upper side of the image 1200) can be longer than the vertical portion (extending along the left side of the image 1200) of the end portion 1260. In contrast, when the target is to the upper left but further left, the vertical portion (extending along the left side of the image 1200) can be longer than the horizontal portion (extending along the upper side of the image 1200) of the end portion 1260. In another example, the end portion 1260 may be colored with a predetermined color (which can be a transparent color) instead of the end portion 1260 shining.

Thus, when the user is notified that the annotation is outside of the visible range by the change in the display of the end portion 1260, for example, a separate direction indication such as an arrow may not be displayed. Therefore, the user can be notified of the presence of the annotation without the display of the image 1200 being disturbed.

Fifth Example

Figure 29:
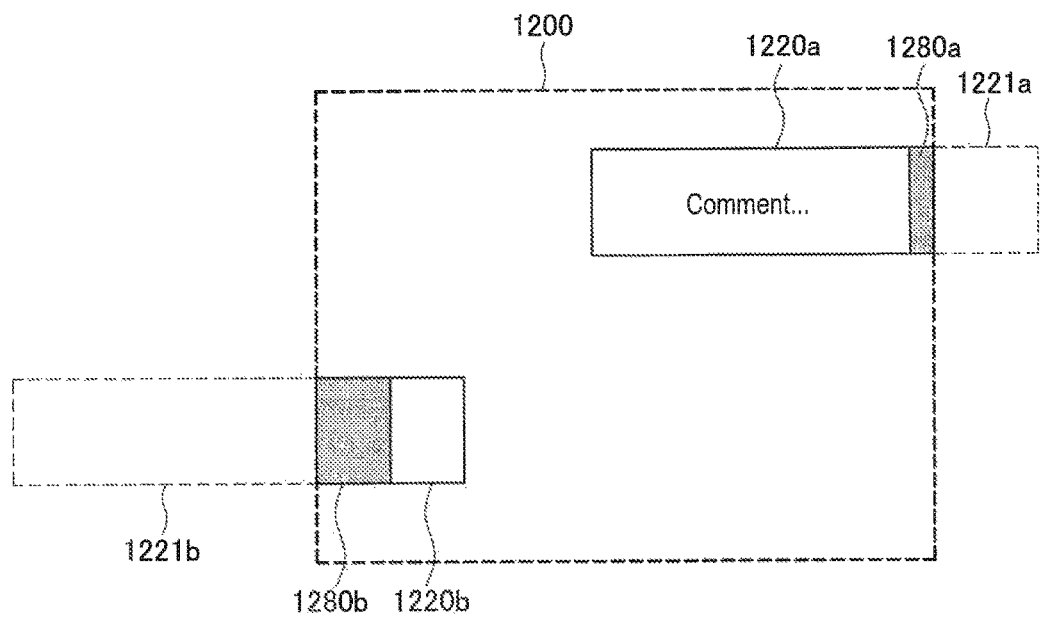
FIG. 29 is a diagram illustrating a fifth example of display of an annotation outside of a visible range according to the embodiment of the present disclosure.

FIG. 29 is a diagram illustrating a fifth example of display of an annotation outside of a visible range according to the embodiment of the present disclosure. In the illustrated example, the comment 1220 is displayed as an annotation. However, since the comment 1220 is long horizontally, the entire comment 1220 is not displayed in the image 1200. In the drawing, a non-display portion 1221 occurring due to the long comment is also illustrated. The non-display portion 1221 of the comment 1220 in this case can also be said to be an annotation outside of the visible range. To indicate the presence of the non-display portion 1221, a luminous region 1280 is displayed in a portion in which the comment 1220 comes into contact with an end of the image 1200.

Here, the length of the luminous region 1280 can be set according to the length (for example, which may be expressed with the number of pixels in the longitudinal direction or may be expressed in accordance with a ratio of the non-display portion to a display portion of the comment 1220 or a ratio of the non-display portion to another non-display portion 1221) of the non-display portion 1221. In the illustrated example, a luminous region 1280a is displayed in regard to a non-display portion 1221a of a comment 1220a and a luminous region 1280b is displayed in regard to a non-display portion 1221b of a comment 1220b. However, the luminous region 1280b may be displayed to be longer than the luminous region 1280a by reflecting the fact that the non-display portion 1221b is longer than the non-display portion 1221a.

Thus, when the user is notified that the annotation is outside of the visible range through the display of the luminous region 1280, the display can be completed inside the comment 1220 which is an annotation. Therefore, the user can be notified of the presence of the annotation without the display of the image 1200 being disturbed. When the length of the luminous region 1280 is set according to the length of the non-display portion 1221, the user can intuitively comprehend that the entire comment 1220 is long, and thus can easily decide, for example, a behavior of viewing the comment immediately or viewing the comment later. When the non-display portion 1221 of the comment 1220 is included in the display of the image 1200, for example, the display range of the image 1200 may be moved or the comment 1220 may be dragged to the inside (in the illustrated example, to the left in the case of the comment 1220a or to the right in the case of the comment 1220b) of the image 1200.

Sixth Example

Figure 30:
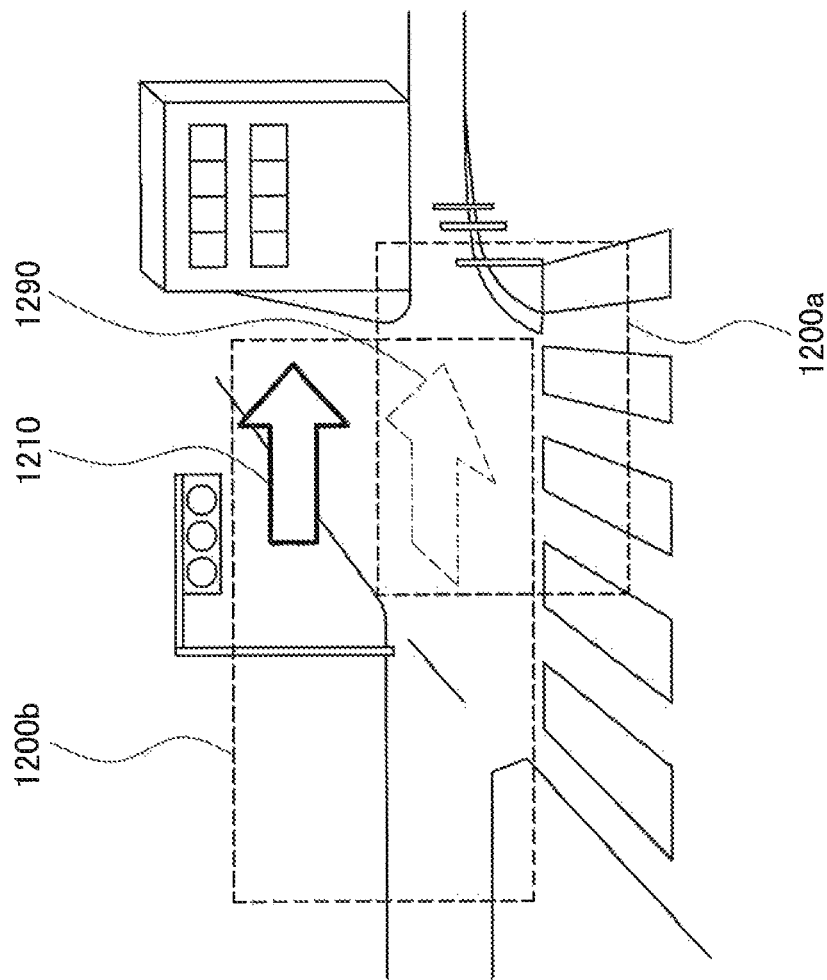
FIG. 30 is a diagram illustrating a sixth example of display of an annotation outside of a visible range according to the embodiment of the present disclosure.

FIG. 30 is a diagram illustrating a sixth example of display of an annotation outside of a visible range according to the embodiment of the present disclosure. In the illustrated example, the arrow annotation 1210 indicating a direction in road guidance is displayed. The annotation 1210 can be viewed, for example, when the user views the image 1200b. However, the annotation 120 may not be viewed when the user views the image 1200a. Accordingly, when the user views the image 1200a, a shadow 1290 of the annotation 1210 can be displayed. When the shadow 1290 is displayed, the user viewing the image 1200a can recognize that the annotation is above a screen.

Thereafter, when the user views the image 1200b, the display of the shadow 1290 may end or may continue. When the shadow 1290 continues to be displayed along with the annotation 1210 and the shadow 1290 is displayed, the user can easily recognize the position of the annotation 1210 disposed in the air in the depth direction.

Thus, by displaying the shadow 1290, the user can be notified of the presence of the annotation through the display without a sense of discomfort from a restriction to a direction of a virtual light source.

APPLICATION EXAMPLES

Figure 31:
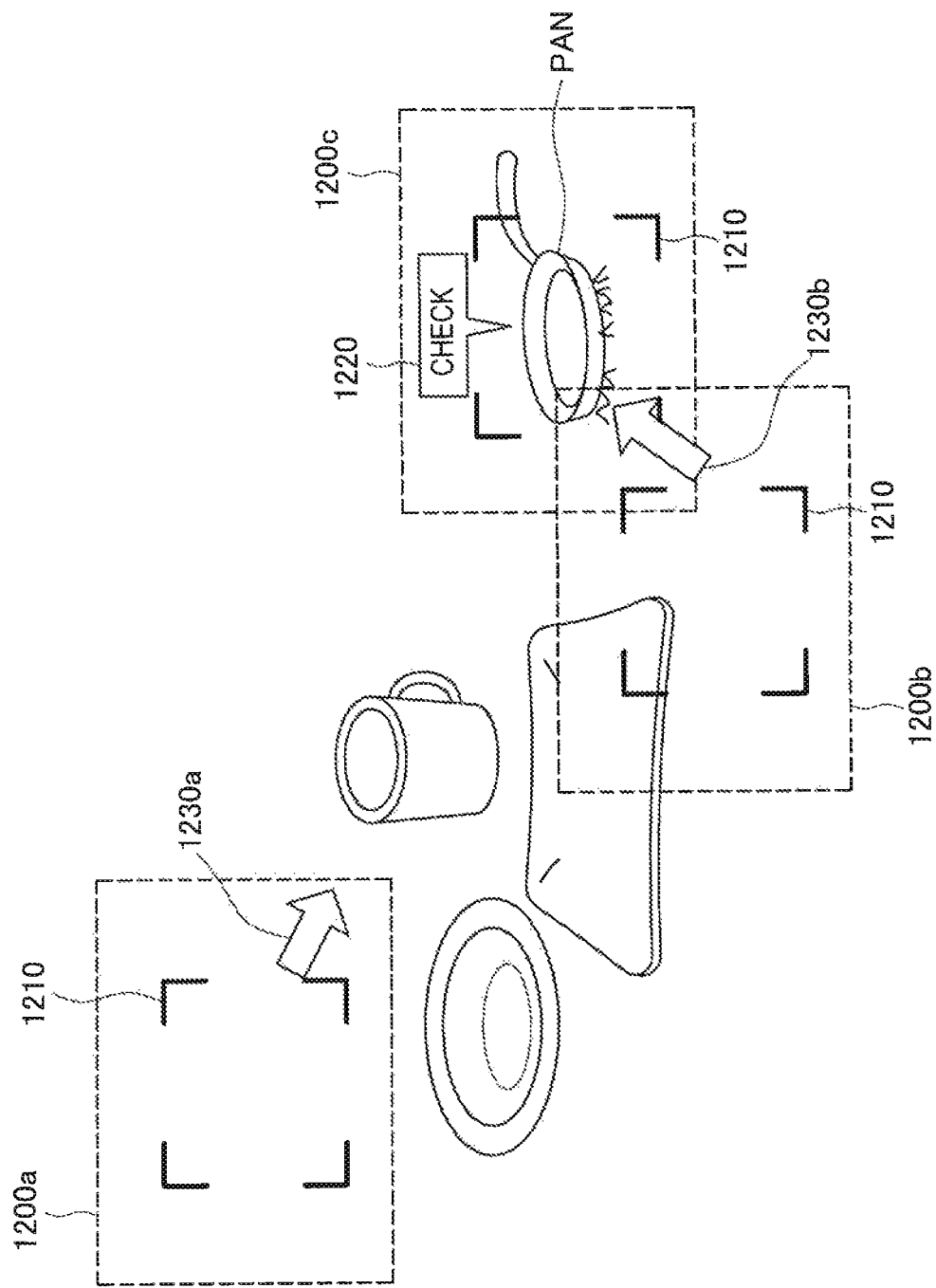
FIG. 31 is a diagram illustrating an application example of the annotation indication outside of the visible range according to the embodiment of the present disclosure.
Figure 32:
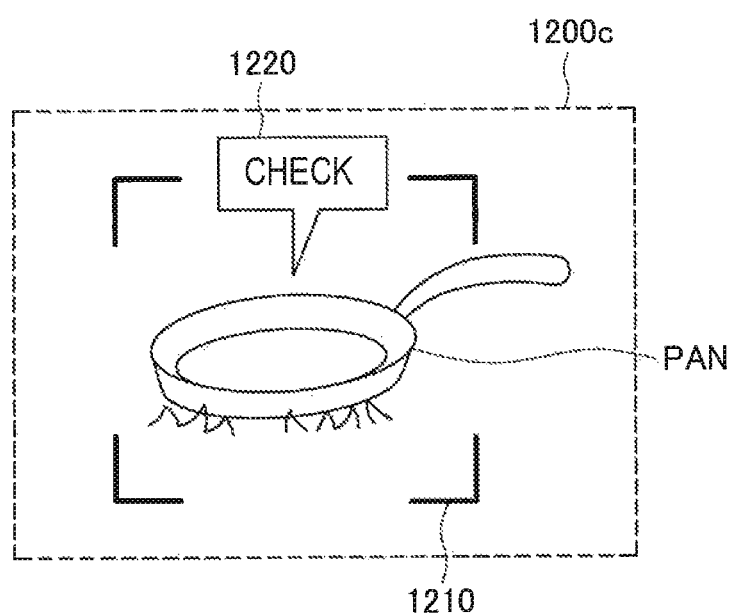
FIG. 32 is a diagram illustrating an application example of the annotation indication outside of the visible range according to the embodiment of the present disclosure.

FIGS. 31 and 32 are diagrams illustrating application examples of the annotation indication outside of the visible range according to the embodiment of the present disclosure. In the illustrated example, the display of the annotation is changed while the image 1200 viewed by the user of the wearable terminal 200 is changed from an image 1200a to an image 1200b and is further changed to an image 1200c. In the image 1200, a pointer 1210, direction indications 1230, and a comment 1220 are displayed as annotations.

The pointer 1210 is different from that of the foregoing several examples. For example, the pointer 1210 continues to be displayed as an icon indicating an observation region of the user near the center of the image 1200. The user of the wearable terminal 200 is guided by the direction indication 1230 so that, for example, a target (a pan (PAN) in the illustrated example) of an annotation input by the user of the tablet terminal 300 enters the pointer 1210.

Since the pan (PAN) is outside of the visible range of the user in the images 1200a and 1200b, direction indications 1230a and 1230b indicating the directions toward the pan are displayed. When the user moves the display range of the image 1200 in the direction indication 1230, catches the pan within the display range in the image 1200c, and can put the pan in the pointer 1210, the comment 1220 is accordingly displayed for the first time. The image 1200c at this time is separately illustrated in FIG. 32.

The change in the display is performed to determine that the user of the wearable terminal 200 can confirm the annotation for the pan when the pan (PAN) which is a target of the annotation enters the pointer 1210. Thus, by acknowledging the confirmable state and displaying the entire annotation when the target of the annotation, which is an annotation to be necessarily confirmed, enters an attention region (or a focus region) of the user, the user may continue to be guided so that the target enters the observation region (or the focus region) by the direction indications 1230 or the like until then.

The fact that the user can confirm the annotation may be acknowledged not only when the target of the annotation enters the observation region (or the focus region) but also when a predetermined time has passed in this state.

(6. Other Display Examples)

Next, other display examples in the embodiment of the present disclosure will be described with reference to FIGS. 33 to 35.

Figure 33:
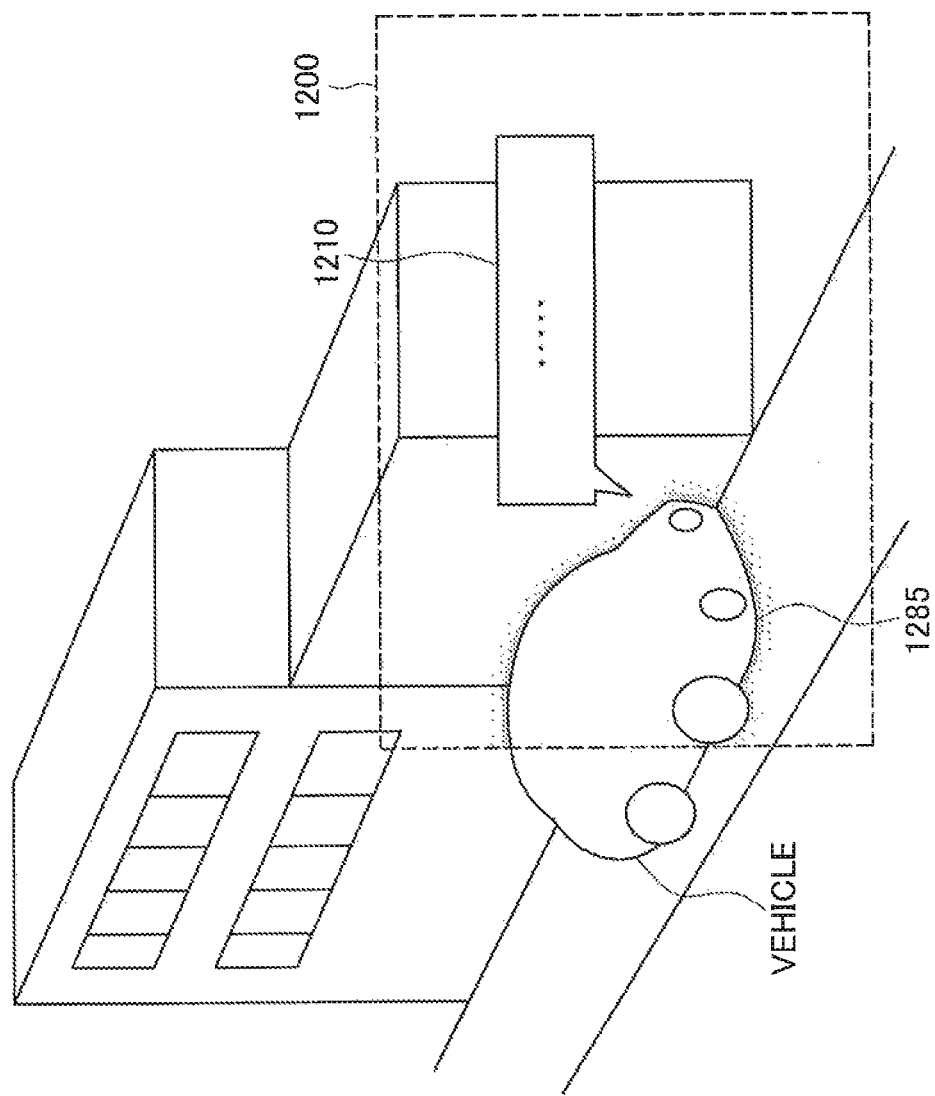
FIG. 33 is a diagram illustrating a display example of an annotation target object using edge detection according to the embodiment of the present disclosure.

FIG. 33 is a diagram illustrating a display example of an annotation target object using edge detection according to the embodiment of the present disclosure. In the illustrated example, the annotation 1210 is input using a vehicle (VEHICLE) as a target. In the image 1200, the annotation 1210 is displayed and an effect 1285 of causing the edges of the vehicle to shine is displayed. Such display is possible when the edges of the vehicle (VEHICLE) are detected by performing a process of generating space information in the wearable terminal 200 and performing analysis or the like of feature points.

By displaying the effect 1285 using the edges as a criterion, the target of the annotation can be expressed, for example, even when the annotation is input by position designation called "the vicinity" without recognition of an object of the target. When the object of the target is recognized, the effect 1285 may be displayed for the edges of the object.

Figure 34:
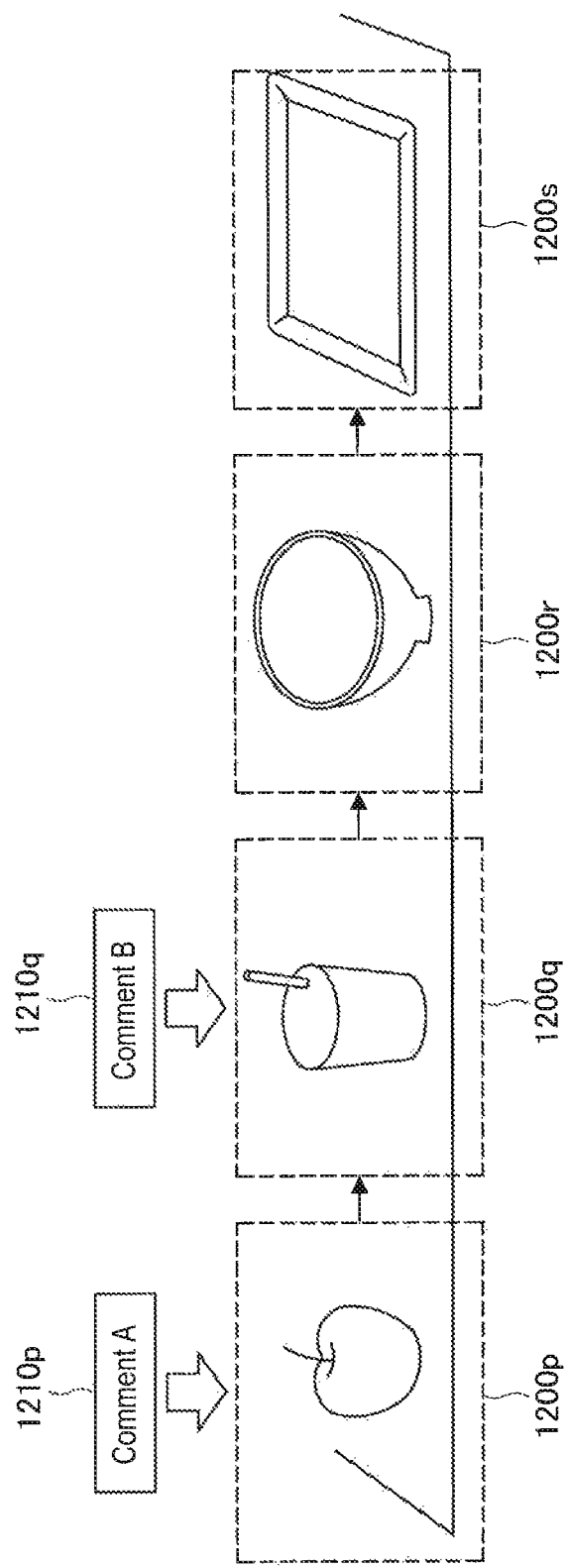
FIG. 34 is a diagram illustrating an example of rollback display of a streaming frame according to the embodiment of the present disclosure.
Figure 35:
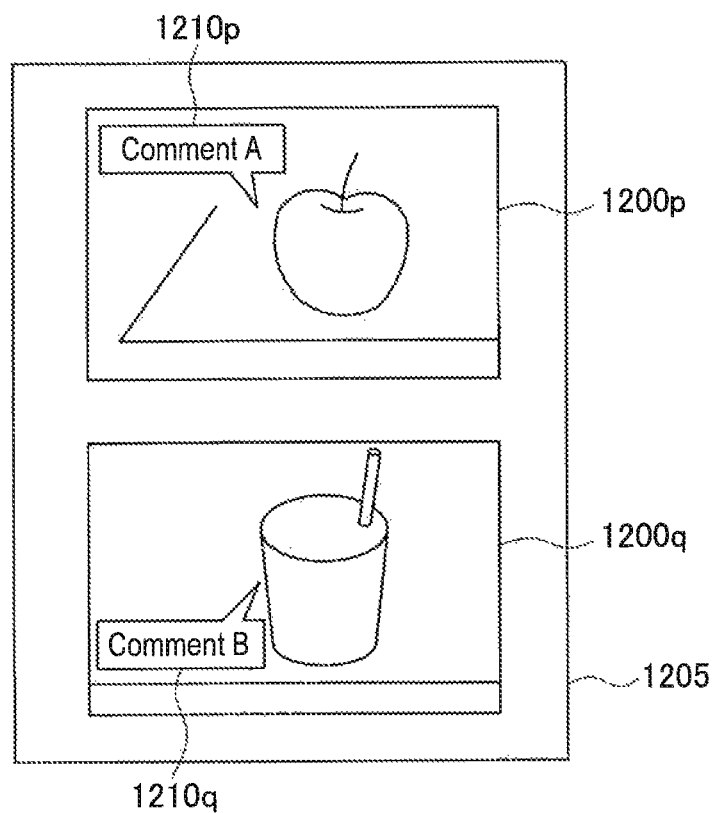
FIG. 35 is a diagram illustrating an example of rollback display of a streaming frame according to the embodiment of the present disclosure.

FIGS. 34 and 35 are diagrams illustrating examples of rollback display of a streaming frame according to the embodiment of the present disclosure. In the example, as illustrated in FIG. 34, the image 1200 viewed by the user of the wearable terminal 200 (which is an example of the transmission side device) is changed from an image 1200p to an image 1200q, an image 1200r, and an image 1200s. Such images are all transmitted sequentially as streaming frames to the tablet terminal 300 (an example of the reception side device) via the server 100.

The user of the tablet terminal 300 can input an annotation for each of the foregoing images. In the illustrated example, an annotation 1210p (comment A) is input for the image 1200p and an annotation 1210q (comment B) is input for the image 1200q. Such annotations may be displayed in real time in the images 1200 or may not be displayed in real time in the images 1200 because of, for example, movement of the display ranges of the images 1200.

Here, in the illustrated example, as described above, the streaming frames in which the annotations are input can be browsed later with a list display screen 1205 illustrated in FIG. 35. In the list display screen 1205, the streaming frames in which the annotations are input, that is, the images 1200p and 1200q, are shown in a list. For example, the annotations 1210p and 1210q which are not displayed (or may be displayed) in real time can be displayed in the images 1200p and 1200q, respectively. Such display can be realized by storing the image 1200p in the streaming frames as a snapshot and associating information regarding the annotation 1210p, for example, when the server 100 detects that the annotation 1210p is input for the image 1200p.

As another example, instead of the list display screen 1205, navigation may also be displayed in the image 1200 so that the user of the wearable terminal 200 is guided to a position at which the image 1200p or the image 1200q is acquired (that is, a position at which the display range of the image 1200 becomes the same as that of the image 1200p or the image 1200q again). Even in this case, when the user views the image 1200 such as the image 1200p or 1200q according to the navigation, the annotation 1210p or the annotation 1210q may be displayed in the image 1200.

(7. Examples of Applications)

Next, application examples according to the embodiment of the present disclosure will be described with reference to FIGS. 36 to 44.

Figure 36:
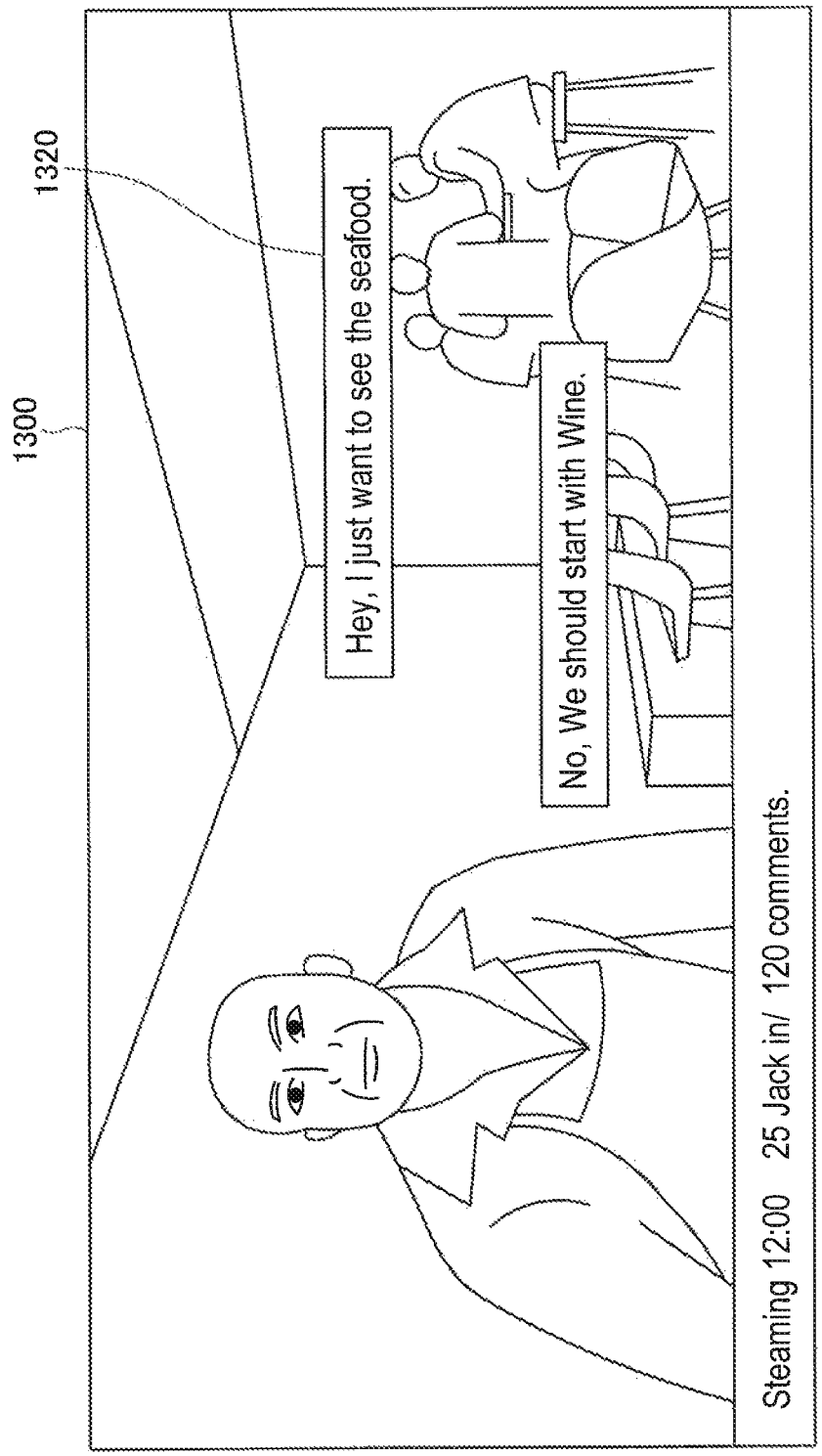
FIG. 36 is a diagram illustrating an application example for sharing a viewpoint of a traveler using a technology related to the embodiment of the present disclosure.

FIG. 36 is a diagram illustrating an application example for sharing a viewpoint of a traveler using a technology related to the embodiment of the present disclosure. For example, a user who wears a transmission side device such as the wearable terminal 200 and presents an image of a real space of a travel destination can be a general traveler (or may be a professional reporter). For example, a user viewing the supplied image 1300 using a reception side device such as the tablet terminal 300 can input the comment 1320 (which is an example of an annotation) with respect to, for example, the entire image or a specific object in the image. The input comment 1320 may be displayed on the display of the wearable terminal 200 and may be used to convey a request, advice, or the like of the traveler. Alternatively, as illustrated, the comment 1320 may be displayed in the image 1300 of the tablet terminal 300. In this case, for example, the comments 1320 input by the plurality of users are all displayed on the image 1300, so that communication is executed between the users sharing the viewpoint of the traveler.

Figure 37:
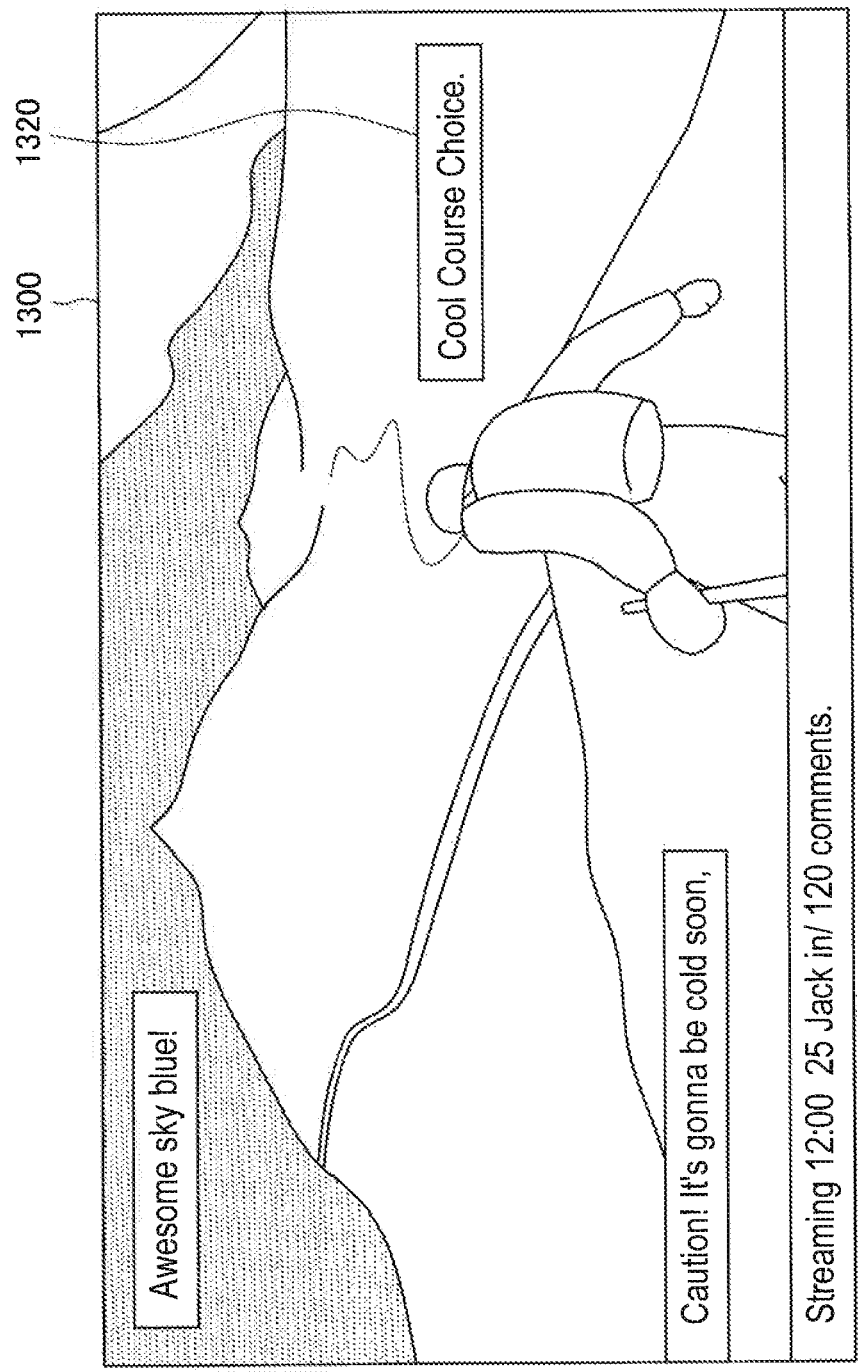
FIG. 37 is a diagram illustrating an application example for sharing a viewpoint of a climber using a technology related to the embodiment of the present disclosure.

FIG. 37 is a diagram illustrating an application example for sharing a viewpoint of a climber using a technology related to the embodiment of the present disclosure. As in the example of FIG. 36, for example, a user who wears the wearable terminal 200 or the like and presents an image of a real space can be a general mountaineer (may be a professional reporter). For example, a user viewing the supplied image 1300 using the tablet terminal 300 or the like can input the comment 1320 (which is an example of an annotation) with respect to, for example, the entire image or a specific object or position in the image. Apart from the inputting of the annotation, the user viewing the image 1300 may capture the image 1300 and save the image 1300 as a photo. As in the foregoing example, the input comment 1320 may be used to convey advice or the like to the mountaineer or to execute communication between the users sharing the viewpoint of the mountaineer.

Figure 38:
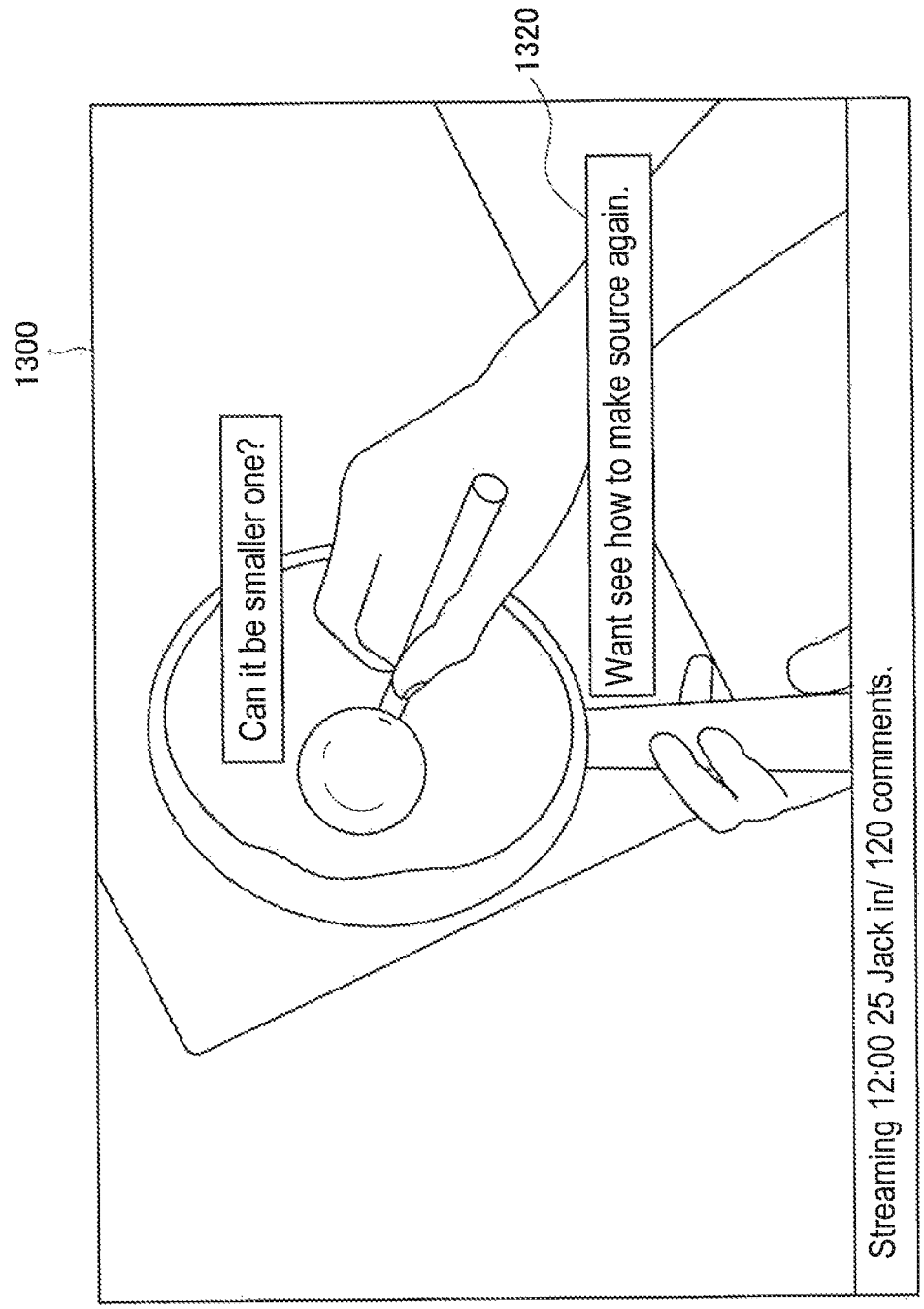
FIG. 38 is a diagram illustrating an application example for sharing a viewpoint of a person cooking using a technology related to the embodiment of the present disclosure.

FIG. 38 is a diagram illustrating an application example for sharing a viewpoint of a person cooking using a technology related to the embodiment of the present disclosure. For example, a user who wears the wearable terminal 200 or the like and supplies an image of a real space of a travel destination can be a general user who is good at cooking (or may be a cooking teacher). For example, a user viewing the supplied image 1300 using the tablet terminal 300 or the like can input the comment 1320 with respect to, for example, the entire image or a specific position in the image. For example, the comment 1320 can be displayed on the display of the wearable terminal 200 and can be used to convey questions to the user who is the teacher. The comment 1320 is associated with the position of a real space surrounding the wearable terminal 200 rather than a position in the image 1300, so that the comment can be displayed at a position intended by the user inputting the comment 1320 (in the example, the position of an egg) when the comment 1320 is input with respect to, for example, a specific material or equipment (in the illustrated example, a question about the egg which can be a smaller egg to be mixed with the contents of a pan) and even when the display range of the image is changed with movement of the wearable terminal 200.

Figure 39:
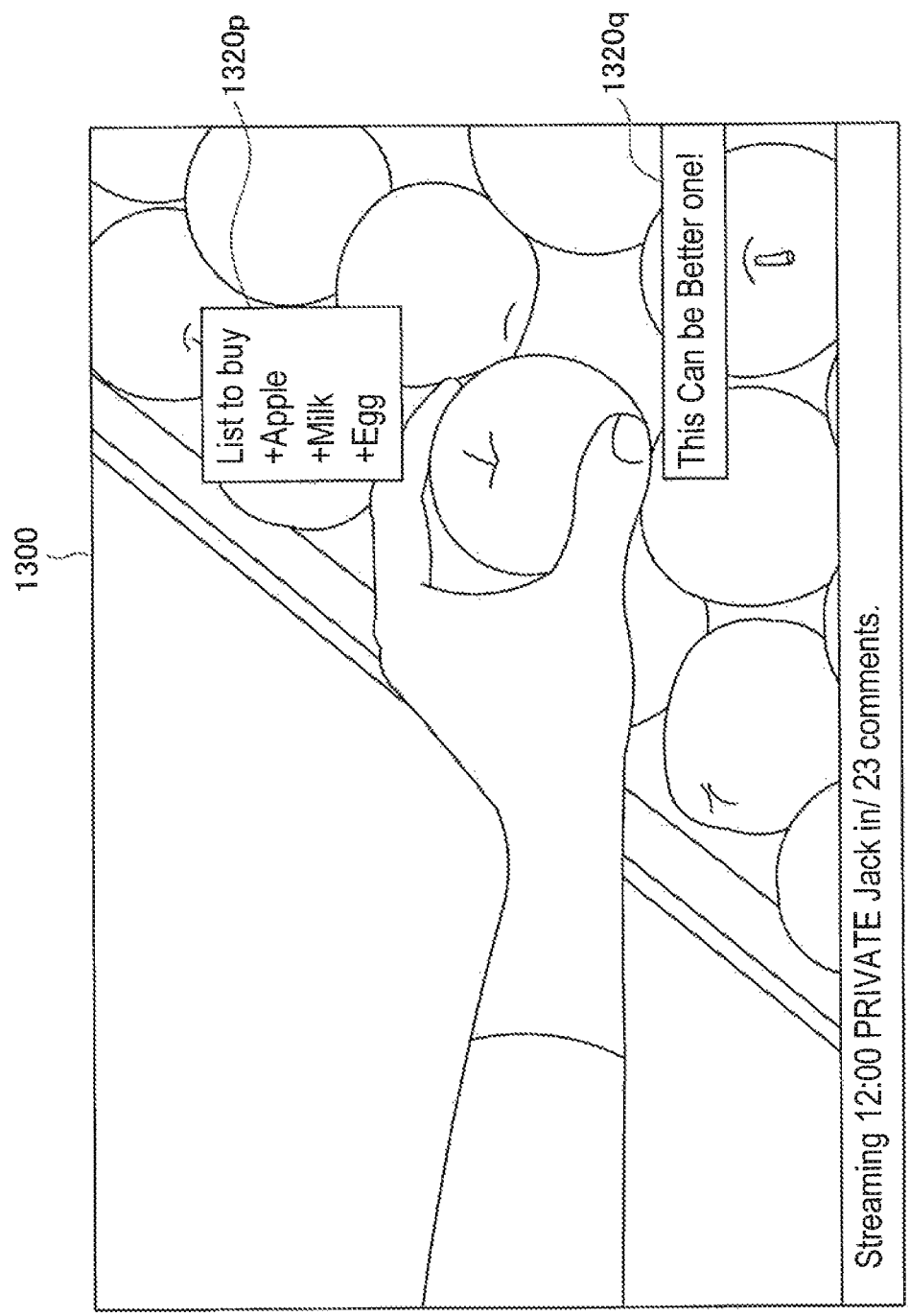
FIG. 39 is a diagram illustrating an application example for sharing a viewpoint of a person shopping using a technology related to the embodiment of the present disclosure.

FIG. 39 is a diagram illustrating an application example for sharing a viewpoint of a person shopping using a technology related to the embodiment of the present disclosure. In this example, in regard to a user who wears the wearable terminal 200 or the like and supplies an image of a store, users sharing the image using the tablet terminals 300 or the like can be users permitted to share individual images, for example, family members of the user supplying the image. That is, in the example of FIG. 39, an image of a real space is shared within a private range. Whether to share the image of the real space in private or in public can be appropriately set according to, for example, a kind of supplied image of the real space or information which can be desired to be obtained as an annotation by the user supplying the image.

In the illustrated example, a comment 1320q designating one of the apples in a shopping list 1320p is input as the comment 1320. Of the comments, it is desirable to display the comment 1320q designating the apple for the same apple even when the display range of the image is changed with the movement of the wearable terminal 200. Therefore, the comment 1320q can be associated with the position of the real space surrounding the wearable terminal 200. On the other hand, the shopping list 1320p can be associated with a position in the image 1300 since it is desirable to display the shopping list 1320p continuously at the same position of the image even when the display range of the image is changed with movement of the wearable terminal 200. Thus, a processor of a device (for example, the tablet terminal 300) to which the annotation is input may execute switching between association of the annotation with the position of the real space and association of the annotation with the position in the image according to a kind of annotation, a user manipulation, or the like.

Figure 40:
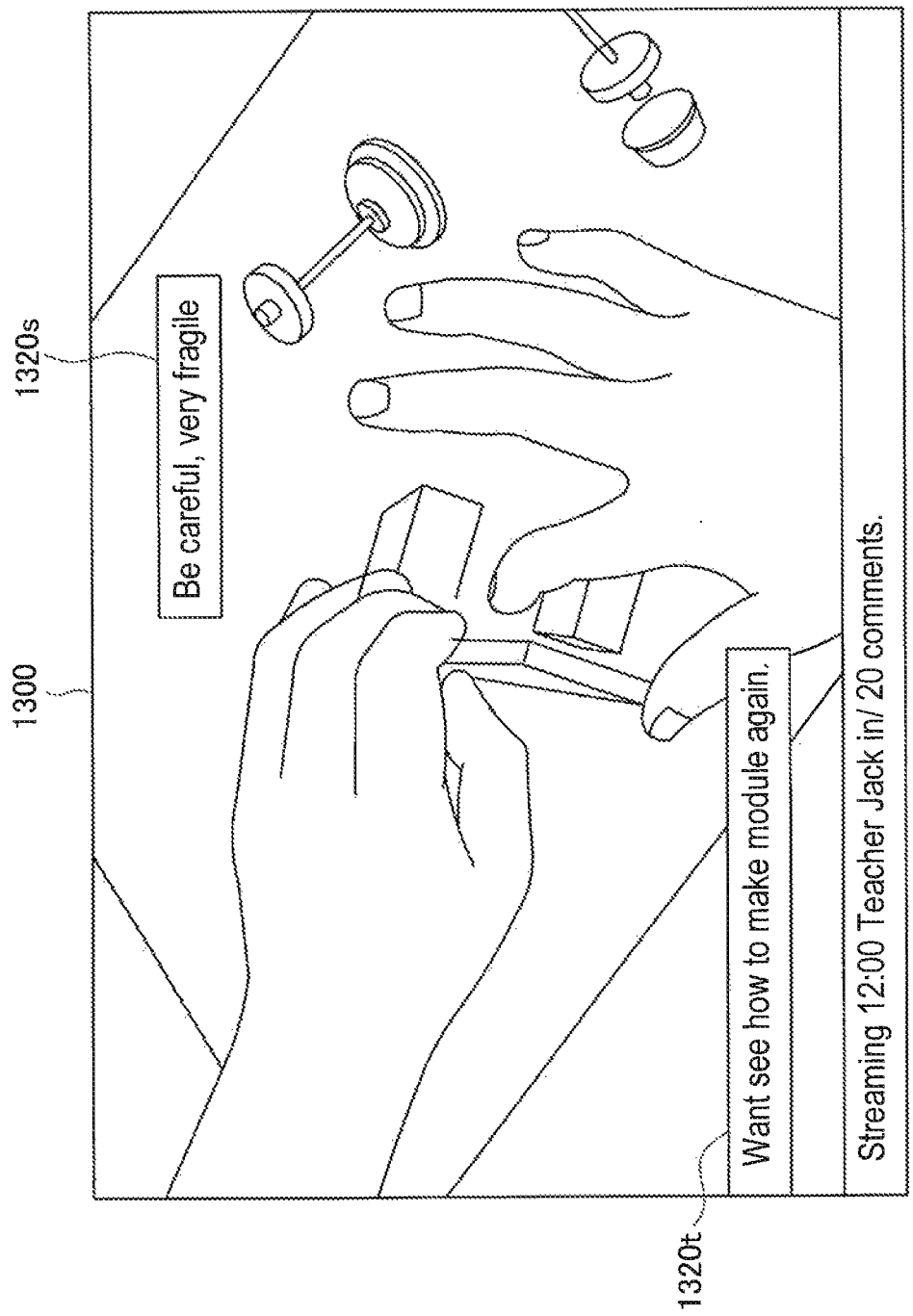
FIG. 40 is a diagram illustrating an application example for sharing a viewpoint of a person doing handicrafts using a technology related to the embodiment of the present disclosure.

FIG. 40 is a diagram illustrating an application example for sharing a viewpoint of a person doing handicrafts using a technology related to the embodiment of the present disclosure. In this example, in regard to a user who wears the wearable terminal 200 or the like and supplies an image during the handicrafts, a user sharing the image using the tablet terminal 300 or the like can be a user who is designated as a teacher in advance by the user supplying the image. The user who is the teacher can view the image 1300 and input an annotation such as a comment 1320s (advice calling attention to fragility of a component). On the other hand, for example, the user supplying the image can also input, for example, a comment 1320t such as a question to the user who is the teacher, using audio recognition (which may be an input by a keyboard or the like).

That is, in the illustrated example, for example, an interactive dialog about the handicrafts can be executed between the user supplying the image and the user who is the teacher via the comment 1320. Even in this case, by associating the comment 1320 with a position of a real space, the comment can be displayed accurately at the position of a target component or the like. The image can also be further shared with other users. In this case, inputting of the comment 1320 by users other than the user supplying the image and the user who is the teacher may be restricted. Alternatively, the comment 1320 input by other users may be displayed in the image 1300 only between the other users.

FIGS. 41 to 44 are diagrams illustrating application examples for changing and sharing viewpoints of a plurality of users using a technology related to the embodiment of the present disclosure.

Figure 41:
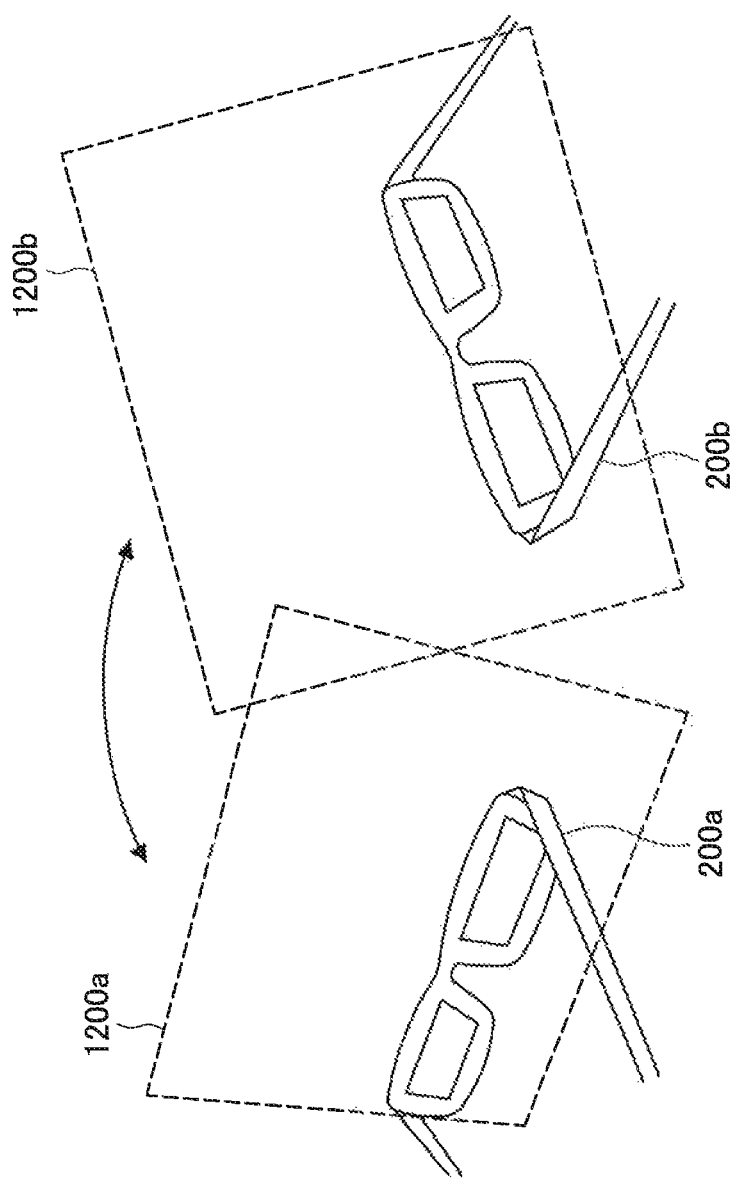
FIG. 41 is a diagram illustrating an application example for changing and sharing viewpoints of a plurality of users using a technology related to the embodiment of the present disclosure.

FIG. 41 is a diagram for conceptually describing viewpoint conversion. In FIG. 41, a case in which two wearable terminals 200a and 200b in the same real space include imaging units and acquire images 1200a and 1200b is illustrated. At this time, when the wearable terminals 200a and 200b each acquire the space information, mutual positions (viewpoint positions) can be recognized via the positional information of the real space. Accordingly, for example, by selecting the wearable terminal 200b pictured in the image 1200a or the wearable terminal 200a pictured in the image 1200b, it is possible to switch between display of the image 1200a and display of the image 1200b.

Figure 42:
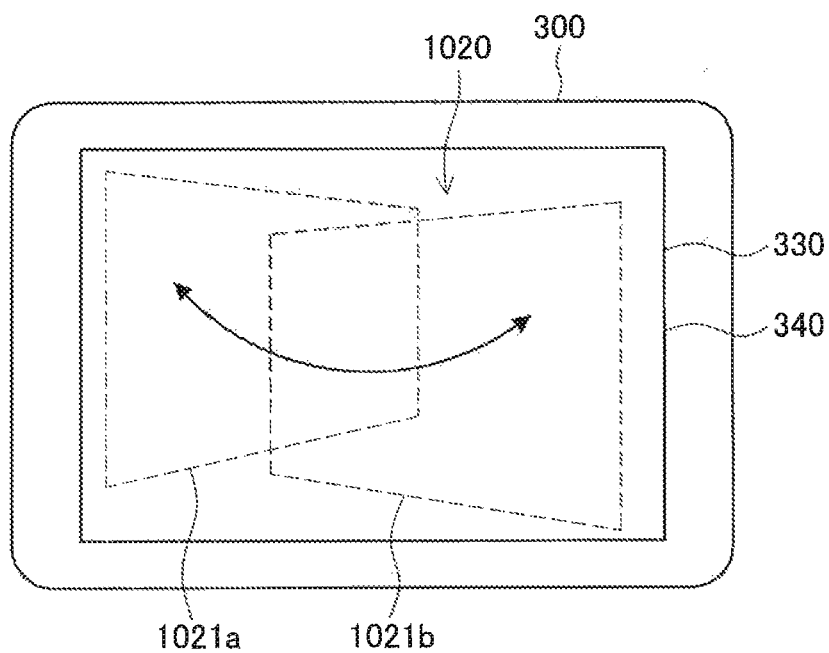
FIG. 42 is a diagram illustrating an application example for changing and sharing viewpoints of a plurality of users using a technology related to the embodiment of the present disclosure.

FIG. 42 is a diagram illustrating an example of viewpoint conversion using a 3rd-person image. In the illustrated example, the 3rd-person image 1020 is displayed on the display 330 of the tablet terminal 300 and two streaming frames 1021a and 1021b are displayed in the 3rd-person image 1020. For example, such streaming frames can be acquired by the wearable terminals 200a and 200b illustrated in FIG. 41. A user can execute switching between an image from the viewpoint of the wearable terminal 200a and an image from the viewpoint of the wearable terminal 200b and share the images, for example, by selecting one of the streaming frames 1021 through a touch manipulation on the touch sensor 340 on the display 330.

Figure 43:
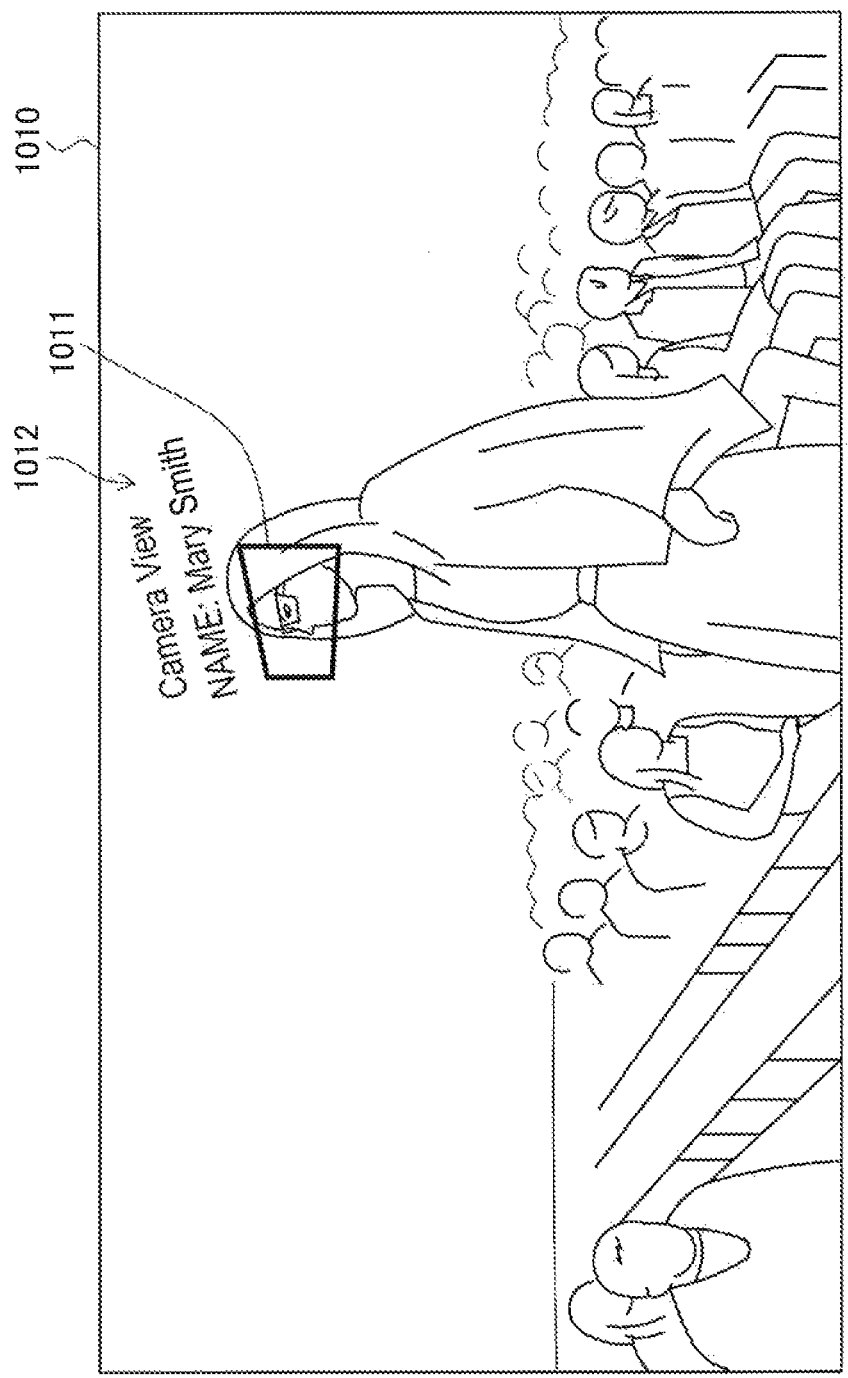
FIG. 43 is a diagram illustrating an application example for changing and sharing viewpoints of a plurality of users using a technology related to the embodiment of the present disclosure.
Figure 44:
FIG. 44 is a diagram illustrating an application example for changing and sharing viewpoints of a plurality of users using a technology related to the embodiment of the present disclosure.

FIGS. 43 and 44 are diagrams illustrating examples of viewpoint conversion using a 1st-person image. In the example illustrated in FIG. 43, a pointer 1011 indicating a switchable viewpoint and information 1012 regarding this viewpoint are displayed in the 1st-person image 1010. The pointer 1011 can be, for example, an indication pointing to a device supplying an image from another viewpoint. As illustrated, the pointer 1011 may indicate an angle of field of an image supplied by the device. The information 1012 indicates which kind of image is supplied by another device (in the illustrated example, "Camera View") or who supplies the image. When the user selects the pointer 1011 or the information 1012 through a manipulation unit of a reception side device, as illustrated in FIG. 44, the display can be switched to a 1st-person image 1010' from another viewpoint. The image illustrated in FIG. 43 is an image from a viewpoint of an audience viewing a model in a fashion show. On the other hand, the image illustrated in FIG. 44 is an image from the viewpoint of the model and the audience located on the side of a runway is pictured.

In each image of a plurality of switchable viewpoint images, for example, attributes such as whether an image is public or private, or whether or not an image can be viewed for free may be set. In this case, for example, permission is already given whether the 3rd-person image 1020 illustrated in FIG. 42 or the 1st-person image 1010 illustrated in FIG. 43 is private or public. Therefore, the pointer 1011 or the information 1012 may be displayed only for a viewable image. Alternatively, in the 3rd-person image 1020 or the 1st-person image 1010, the pointer 1011 or the information 1012 may be displayed only for an image which can be viewed since the purchase is already done whether or not the image can be viewed for free by the setting of the user viewing the image.

(8. Supplement)

An embodiment of the present disclosure can include, for example, the above-described image processing device (a server or a client), the above-described system, the above-described image processing method executing the image processing device or the system, a program causing the image processing apparatus to function, and a non-transitory medium recording the program.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

An image processing device including:

an image processing unit configured to generate an output image using a first image obtained by imaging a real space from a first viewpoint as an input image, wherein, based on a position and a posture of the first viewpoint in the real space, the image processing unit generates, as the output image, a second image obtained by virtually imaging the real space from a second viewpoint having a position and a posture different from the position and the posture of the first viewpoint in the real space.

(2)

The image processing device according to (1), wherein the position and the posture of the second viewpoint are set using the position and the posture of the first viewpoint as a criterion.

(3)

The image processing device according to (2), further including:

a display control unit configured to control a display unit of a terminal device to display the output image, wherein, based on the position and the posture of the first viewpoint in the real space, the image processing unit generates, as the output image, a third image obtained by virtually imaging the real space from a third viewpoint at which a position and a posture are freely set in the real space, and wherein the display control unit causes the display unit to display one or both of the second and third images.

(4)

The image processing device according to (3), wherein the display control unit causes the display unit to display at least the third image, and wherein, when the second viewpoint is included in a range of the third image, the image processing unit displays an icon indicating the second viewpoint in the third image.

(5)

The image processing device according to (4), further including:

a manipulation acquisition unit configured to acquire information based on a user manipulation on an image displayed on the display unit, wherein, when information based on a user manipulation of selecting the icon indicating the second viewpoint is acquired, the image processing unit presents the second image as the output image along with the third image or instead of the third image.

(6)

The image processing device according to any one of (2) to (5), wherein the second viewpoint is a viewpoint set back from the first viewpoint.

(7)

The image processing device according to any one of (2) to (6), wherein the image processing unit continuously generates the second image based on the continuously captured first image, and wherein the position and the posture of the second viewpoint are changed to track the position and the posture of the first viewpoint.

(8)

The image processing device according to (7), wherein the image processing unit smooths a change in the position and the posture of the first viewpoint to reflect the change in the position and the posture of the second viewpoint.

(9)

The image processing device according to (8), wherein the image processing unit sets a restriction on a change amount of the position and the posture of the second viewpoint and releases the restriction when the first image displayed in the second image based on a relation between the position and the posture of the first viewpoint and the position and the posture of the second viewpoint is deviated by a predetermined proportion or more from a range of the second image.

(10)

The image processing device according to (1), wherein the position and the posture of the second viewpoint are set using a position and a posture of an object disposed in the real space as a criterion.

(11)

The image processing device according to any one of (1) to (10), wherein, when the first viewpoint is included in a range of the second image, the image processing unit displays an icon indicating the first viewpoint in the second image.

(12)

The image processing device according to (11), further including:

a display control unit configured to control a display unit of a terminal device to display the output image; and a manipulation acquisition unit configured to acquire information based on a user manipulation on an image displayed on the display unit, wherein, when information based on a user manipulation of selecting the icon indicating the first viewpoint is acquired, the image processing unit presents the first image as the output image along with the second image or instead of the second image.

(13)

The image processing device according to any one of (1) to (12), wherein the image processing unit generates the second image using, as the second viewpoint, one viewpoint among a plurality of viewpoints at which positions and postures in the real space are different, and displays an icon indicating another viewpoint among the plurality of viewpoints in the second image when the other viewpoint is included in a range of the second image.

(14)

The image processing device according to (13), further including:

a display control unit configured to control a display unit of a terminal device to display the output image; and a manipulation acquisition unit configured to acquire information based on a user manipulation on an image displayed on the display unit, wherein, when information based on a user manipulation of selecting the icon indicating the other viewpoint is acquired, the image processing unit generates the second image using the other viewpoint corresponding to the selected icon as the second viewpoint and presents the newly generated second image as the output image along with the original second image or instead of the original second image.

(15)

The image processing device according to any one of (1) to (14), wherein the image processing unit displays the first image deformed based on a relation between the position and the posture of the first viewpoint and the position and the posture of the second viewpoint in the second image.

(16)

The image processing device according to (15), wherein the image processing unit continuously generates the second image based on the continuously captured first image, displays the latest first image in the second image, and generates a portion of the second image other than the latest first image based on the previous first image.

(17)

The image processing device according to (16), wherein the image processing unit generates the portion of the second image other than the latest first image by stitching between the latest first image and the previous first image or between the previous first images.

(18)

The image processing device according to any one of (15) to (17), wherein the image processing unit generates the output image using, as input images, a plurality of the first images obtained by imaging the real space from a plurality of the first viewpoints at which positions and postures in the real space are different and displays, in the second image, the plurality of first images deformed based on a relation between the position and the posture of each of the plurality of first viewpoints and the position and the posture of the first viewpoint.

(19)

An image processing method including:

generating, by a processor configured to generate an output image using a first image obtained by imaging a real space from a first viewpoint as an input image, based on a position and a posture of the first viewpoint in the real space, a second image obtained by virtually imaging the real space from a second viewpoint having a position and a posture different from the position and the posture of the first viewpoint in the real space as the output image.

(20)

A program causing a computer configured to generate an output image using a first image obtained by imaging a real space from a first viewpoint as an input image to realize:

a function of generating, based on a position and a posture of the first viewpoint in the real space, a second image obtained by virtually imaging the real space from a second viewpoint having a position and a posture different from the position and the posture of the first viewpoint in the real space as the output image.

REFERENCE SIGNS LIST 10 system
100 server
200, 300, 400, 500, 600, 700 client
900 device
910 processor
920 memory
930 display unit
940 manipulation unit
950 communication unit
960 imaging unit
970 sensor

The invention claimed is:

1. An image processing device comprising:
    an image processing unit configured to generate an output image using a first image obtained by imaging a real space from a first viewpoint as an input image,
    wherein, based on a position and a posture of the first viewpoint in the real space, the image processing unit generates, as the output image, a second image obtained by virtually imaging the real space from a second viewpoint having a position and a posture different from the position and the posture of the first viewpoint in the real space,
    wherein the first image is displayed together with the second image based on a relation between the position and the posture of the first viewpoint,
    wherein the image processing unit sets a restriction on a change amount of the position and the posture of the second viewpoint, based on a change of the position and the posture of the first viewpoint,
    wherein, when the display of the first image is deviated by a predetermined proportion or more from a range of the second image, the image processing unit releases the restriction, and
    wherein the image processing unit is implemented via at least one processor.

2. The image processing device according to claim 1, wherein the position and the posture of the second viewpoint are set using the position and the posture of the first viewpoint as a criterion.

3. The image processing device according to claim 2, further comprising:
    a display control unit configured to control a display unit of a terminal device to display the output image,
    wherein, based on the position and the posture of the first viewpoint in the real space, the image processing unit generates, as the output image, a third image obtained by virtually imaging the real space from a third viewpoint at which a position and a posture are freely set in the real space, and
    wherein the display control unit is implemented via at least one processor and causes the display unit to display one or both of the second and third images.

4. The image processing device according to claim 3, wherein the display control unit causes the display unit to display at least the third image, and
    wherein, when the second viewpoint is included in a range of the third image, the image processing unit displays an icon indicating the second viewpoint in the third image.

5. The image processing device according to claim 4, further comprising:
    a manipulation acquisition unit configured to acquire information based on a user manipulation on an image displayed on the display unit,
    wherein, when information based on a user manipulation of selecting the icon indicating the second viewpoint is acquired, the image processing unit presents the second image as the output image along with the third image or instead of the third image,
    wherein the manipulation acquisition unit is implemented via at least one processor.

6. The image processing device according to claim 2, wherein the second viewpoint is a viewpoint set back from the first viewpoint.

7. The image processing device according to claim 2,
    wherein the image processing unit continuously generates the second image based on the continuously captured first image, and
    wherein the position and the posture of the second viewpoint are changed to track the position and the posture of the first viewpoint.

8. The image processing device according to claim 7, wherein the image processing unit smooths a change in the position and the posture of the first viewpoint to reflect the change in the position and the posture of the second viewpoint.

9. The image processing device according to claim 1, wherein the position and the posture of the second viewpoint are set using a position and a posture of an object disposed in the real space as a criterion.

10. The image processing device according to claim 1, wherein, when the first viewpoint is included in a range of the second image, the image processing unit displays an icon indicating the first viewpoint in the second image.

11. The image processing device according to claim 10, further comprising:
   a display control unit configured to control a display unit of a terminal device to display the output image; and
   a manipulation acquisition unit configured to acquire information based on a user manipulation on an image displayed on the display unit,
   wherein, when information based on a user manipulation of selecting the icon indicating the first viewpoint is acquired, the image processing unit presents the first image as the output image along with the second image or instead of the second image,
   wherein the display control unit and the manipulation acquisition unit are each implemented via at least one processor.

12. The image processing device according to claim 1, wherein the image processing unit generates the second image using, as the second viewpoint, one viewpoint among a plurality of viewpoints at which positions and postures in the real space are different, and displays an icon indicating another viewpoint among the plurality of viewpoints in the second image when the other viewpoint is included in a range of the second image.

13. The image processing device according to claim 12, further comprising:
   a display control unit configured to control a display unit of a terminal device to display the output image; and
   a manipulation acquisition unit configured to acquire information based on a user manipulation on an image displayed on the display unit,
   wherein, when information based on a user manipulation of selecting the icon indicating the other viewpoint is acquired, the image processing unit generates the second image using the other viewpoint corresponding to the selected icon as the second viewpoint and presents the newly generated second image as the output image along with the original second image or instead of the original second image,
   wherein the display control unit and the manipulation acquisition unit are each implemented via at least one processor.

14. The image processing device according to claim 1, wherein the image processing unit displays the first image deformed based on a relation between the position and the posture of the first viewpoint and the position and the posture of the second viewpoint in the second image.

15. The image processing device according to claim 14, wherein the image processing unit continuously generates the second image based on the continuously captured first image, displays the latest first image in the second image, and generates a portion of the second image other than the latest first image based on the previous first image.

16. The image processing device according to claim 15, wherein the image processing unit generates the portion of the second image other than the latest first image by stitching between the latest first image and the previous first image or between the previous first images.

17. The image processing device according to claim 14, wherein the image processing unit generates the output image using, as input images, a plurality of the first images obtained by imaging the real space from a plurality of the first viewpoints at which positions and postures in the real space are different and displays, in the second image, the plurality of first images deformed based on a relation between the position and the posture of each of the plurality of first viewpoints and the position and the posture of the first viewpoint.

18. An image processing method executed using at least one processor, the method comprising:
   generating, by a processor configured to generate an output image using a first image obtained by imaging a real space from a first viewpoint as an input image, based on a position and a posture of the first viewpoint in the real space, a second image obtained by virtually imaging the real space from a second viewpoint having a position and a posture different from the position and the posture of the first viewpoint in the real space as the output image;
   displaying the first image together with the second image based on a relation between the position and the posture of the first viewpoint; and
   setting a restriction on a change amount of the position and the posture of the second viewpoint, based on a change of the position and the posture of the first viewpoint,
   releasing the restriction when the display of the first image is deviated by a predetermined proportion or more from a range of the second image.

19. A non-transitory computer-readable medium having embodied thereon a program, which when executed by a computer causes the computer to execute a method, the method comprising:
   generating an output image using a first image obtained by imaging a real space from a first viewpoint as an input image, based on a position and a posture of the first viewpoint in the real space, a second image obtained by virtually imaging the real space from a second viewpoint having a position and a posture different from the position and the posture of the first viewpoint in the real space as the output image,
   displaying the first image together with the second image based on a relation between the position and the posture of the first viewpoint; and
   setting a restriction on a change amount of the position and the posture of the second viewpoint, based on a change of the position and the posture of the first viewpoint,
   releasing the restriction when the display of the first image is deviated by a predetermined proportion or more from a range of the second image.

* * * * *